(12) United States Patent
Tateno et al.

(10) Patent No.: US 10,139,669 B2
(45) Date of Patent: Nov. 27, 2018

(54) ELECTRO-OPTICAL DEVICE AND ELECTRONIC INSTRUMENT

(71) Applicant: Seiko Epson Corporation, Tokyo (JP)

(72) Inventors: Yoshitake Tateno, Chitose (JP);
Daisuke Miyawaki, Chitose (JP);
Toshiki Tani, Sapporo (JP); Masashi Nakagawa, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 359 days.

(21) Appl. No.: 14/861,817

(22) Filed: Sep. 22, 2015

(65) Prior Publication Data

US 2016/0109752 A1    Apr. 21, 2016

(30) Foreign Application Priority Data

Oct. 15, 2014 (JP) .................... 2014-210520
Apr. 20, 2015 (JP) .................... 2015-085674
Jun. 2, 2015 (JP) .................... 2015-111971

(51) Int. Cl.
| | | |
|---|---|---|
| *G02F 1/1335* | (2006.01) | |
| *H04N 9/31* | (2006.01) | |
| *G02B 3/00* | (2006.01) | |
| *G02F 1/1343* | (2006.01) | |
| *G03B 21/00* | (2006.01) | |

(52) U.S. Cl.
CPC ..... *G02F 1/133526* (2013.01); *G02B 3/0056* (2013.01); *G02B 3/0068* (2013.01); *G02F 1/133512* (2013.01); *G02F 1/133514* (2013.01); *G02F 1/134336* (2013.01); *H04N 9/3105* (2013.01); *G02F 2001/133567* (2013.01); *G03B 21/006* (2013.01)

(58) Field of Classification Search
CPC ......... G02F 1/133514; G02F 1/133512; G02F 1/133526; G02B 3/0056; G02B 3/0068
See application file for complete search history.

(56) References Cited

U.S. PATENT DOCUMENTS 6,195,143 B1   2/2001  Ogawa
2010/0059844 A1   3/2010  Tanaka

FOREIGN PATENT DOCUMENTS

CN   102681236    9/2012
DE   112012006320   1/2015
(Continued)

OTHER PUBLICATIONS

European Search Report, dated Apr. 13, 2016, issued in related Patent Application No. EP-15189442.

*Primary Examiner* — Thanh-Nhan P Nguyen
(74) *Attorney, Agent, or Firm* — ALG Intellectual Property, LLC

(57) ABSTRACT

An electro-optical device of the present embodiment includes a pair of substrates, first opening components that stipulate sizes and positions of opening sections of pixels in one of the pair of substrates, and second opening components (microlenses) that stipulate sizes and positions of opening sections of the pixels in the other of the pair of substrates. Positions of the second opening components (microlenses) of the other substrate are corrected with positions of the first opening components of the one substrate set as references, so as to gradually become more shifted in a direction that runs from a core of a pixel region, in which a plurality of pixels are arranged, toward an edge section of the pixel region, in accordance with separation from a core side of the pixel region.

6 Claims, 45 Drawing Sheets

(56) References Cited

FOREIGN PATENT DOCUMENTS

| | | |
|---|---|---|
| EP | 0965875 | 12/1999 |
| JP | H2-257119 A | 10/1990 |
| JP | 2003-295170 A | 10/2003 |
| JP | 2004-061633 A | 2/2004 |
| JP | 2009-063888 | 3/2009 |
| JP | 2009-063888 A | 3/2009 |
| JP | 2009-087983 A | 4/2009 |
| JP | 2010-062438 A | 3/2010 |
| JP | 2011-022311 A | 2/2011 |

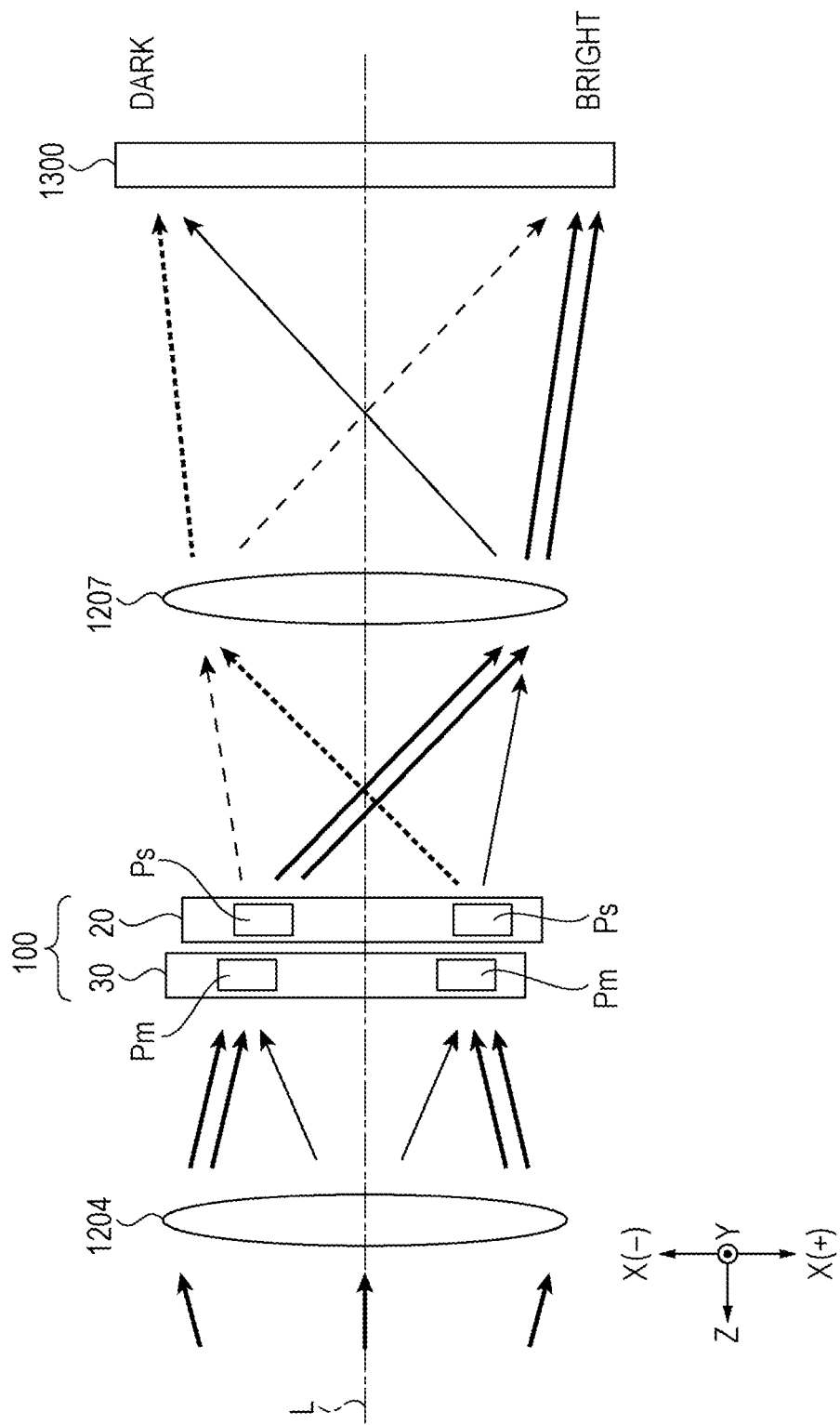

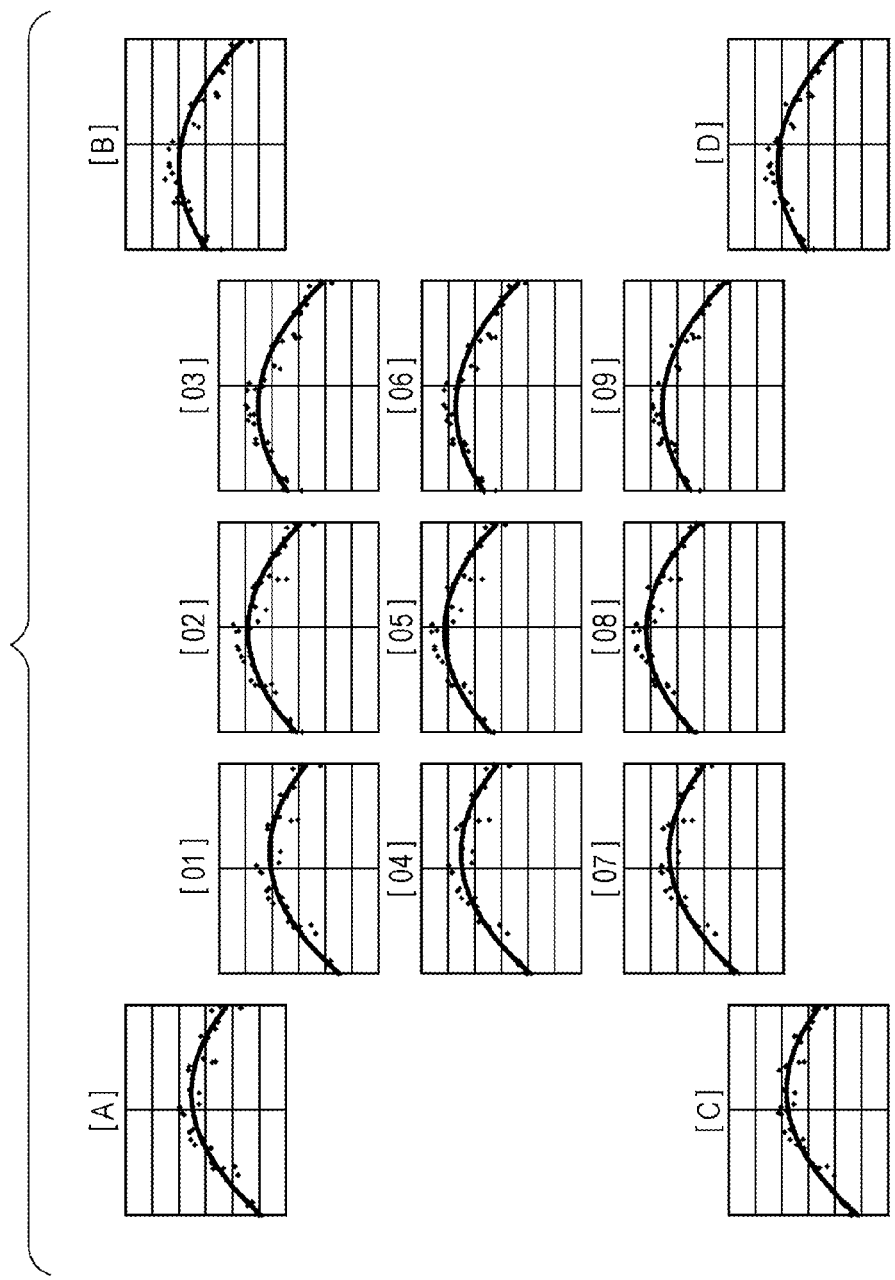

ELECTRO-OPTICAL DEVICE AND ELECTRONIC INSTRUMENT

BACKGROUND

1. Technical Field

The present invention relates to an electro-optical device and an electronic instrument.

2. Related Art

Liquid crystal display devices as electro-optical devices are capable of displaying by disposing a pair of substrates opposite to one another, interposing a liquid crystal layer in a gap therebetween, and configuring a plurality of pixels. Although the pair of substrates are pasted together at a predetermined position using a general adhesive, if the pair of substrates are bonded to the predetermined position shifted by more than is allowed, there is a problem in that it is not possible to obtain desired optical characteristics.

In response to this kind of problem, for example, JP-A-2004-61633 discloses a manufacturing method of an electro-optical device that includes pasting together substrates in which the pitch of the pixels of at least one substrate, among a pair of substrates in which pixels are configured in a matrix form by disposing the substrates opposite to one another, continuously changes toward the periphery thereof, and performing a heat treatment on the pair of substrates. In addition, a substrate in which the pitch of the pixels continuously changes toward the periphery thereof refers to a substrate that is formed by correcting pixel positions. Furthermore, a correction value calculation method that includes oppositely disposing and pasting together a pair of substrates in which pixel positions are not corrected, measuring the shift of a deformation amount of the pair of substrates after applying an adhesive to and heating the pair of substrates that are pasted together, and determining a correction value at each pixel position of pixels in the matrix form for one substrate among the pair of substrates on the basis of a measurement result of measuring the shift, is disclosed as a method for determining correction values of pixel positions.

In addition, in an electro-optical device (liquid crystal device) that is used as a light bulb of a projector or the like, a plurality of pixels are arranged in matrix form in a display region. In the pixels, only light that reaches a translucent portion (a pixel opening region), which is surrounded by wiring or the like, in an element substrate contributes to display. Therefore, configurations in which a microlens is disposed in a direction of travel of light, light is focused on the pixel opening region, and light approaches parallel light, have been suggested (JP-A-2009-63888 and JP-A-2011-22311). In addition, in JPA-2009-63888, a configuration in which a microlens with a plurality of steps is provided in a direction of travel of light in a single substrate, is suggested.

Meanwhile, when a lens array substrate is produced, a technique in which the pitch of a microlens is made more narrow at an end section than the core of the substrate, and the microlens properly faces pixel electrodes when the lens array substrate expands due to heat that is applied in the assembly of the electro-optical device, has been suggested (refer to JP-A-2004-61633).

In addition, in an electro-optical device (a liquid crystal device) that is used as a light bulb of a projection type display device, as shown in FIG. 44, an electro-optical layer such as a liquid crystal layer is provided between a first substrate 3010, in which a plurality of pixel electrodes are provided, and a second substrate 3020. Optical elements such as a lens, which is referred to as a so-called microlens, and a black matrix are provided in the second substrate 3020, and light that reaches the pixel electrodes via the optical elements contributes to display (refer to JP-A-2009-63888 and JP-A-2011-22311). Meanwhile, when a second substrate 3020 that is provided with a lens (a lens array substrate 3030), is formed, a technique in which the pitch of a lens is made more narrow at an end section than the core of the lens array substrate 3030, and the lens properly faces pixel electrodes when the lens array substrate 3030 expands due to heat that is applied in the assembly of an electro-optical device 3100, has been suggested (refer to JP-A-2004-61633).

When pixel positions are stipulated as a result of a difference in deformation amounts in thermal expansion of two substrates when a pair of substrates are bonded using a sealing member, an example that improves upon a circumstance in which each position of a light shielding film and a microlens, and each position of a light shielding area and an opening region shifts, and deteriorations in the transmittance of light that passes through an opening region occur, by correcting the pitch of pixels is shown in JP-A-2004-61633.

However, if the pitch of pixels of one substrate is corrected in consideration of amounts of shift that are caused by the thermal expansion of the pair of substrates, it is relatively easy for display unevenness to occur as a result of deteriorations in the abovementioned transmittance in a case in which there are shifts in the positioning in the pair of substrates other than deformations due to thermal expansion. In other words, there is a concern that an electro-optical device in which display unevenness occurs easily with respect to mere shifts in assembly, will be formed.

In addition, in a case of a light reception type electro-optical device, illumination light is not necessarily incident from a fixed direction (for example, a normal vector direction of a substrate that configures the electro-optical device), and there are cases in which illumination light has an intensity distribution as a result of incidence angles with which illumination light is incident to the electro-optical device. Therefore, even if the manufacturing method of the electro-optical device of JP-A-2004-61633 is used, it is not possible to effectively improve the abovementioned deterioration in transmittance, and therefore, there is a concern that display unevenness will become significant.

In addition, when the electro-optical device that is disclosed in JP-A-2009-63888 and JP-A-2011-22311 is mounted in a projection type display device, as shown in FIG. 27A, an electro-optical device 2100 is irradiated with light that is emitted from a light source via a polarized light conversion element 2164, a condenser lens 2165 and the like. At this time, the intensity of light that is incident to the electro-optical device 2100 in an oblique manner from an outer side is higher than that of light that is incident to the electro-optical device 2100 in an oblique manner from an inner side. Even in such a case, since the light that is incident in an oblique manner from the outer side and the light that is incident in an oblique manner from the inner side are synthesized into light that is projected onto a screen 2111 or the like through a projection optical system 2118, it is difficult for luminance unevenness to occur in images that are projected onto the screen 2111 or the like.

However, as shown in FIG. 27B, if an element substrate 2010 is pasted together with a lens array substrate 2030 (an opposing substrate 2020) in a state of being shifted to one side, it becomes difficult for light that is incident in an oblique manner from the outer side toward one side of the electro-optical device 2100 to be emitted from the electro-optical device 2100. As a result of this, the luminance of portions in images that are projected onto the screen 2111 or the like, which correspond to the one side of the electro-optical device 2100, deteriorates. The abovementioned problem is difficult to solve using the technology that is disclosed in JPA-2004-61633.

SUMMARY

An advantage of some aspects of the invention is to provide an electro-optical device that can suppress luminance unevenness of images even if positional shifts occur when pasting a lens array substrate and an element substrate together, and an electronic instrument that is provided with the electro-optical device.

In addition, when the electro-optical device 3100 that is disclosed in JP-A-2009-63888 and JP-A-2011-22311 is mounted in a projection type display device, as shown in FIG. 44, the electro-optical device 3100 is irradiated with light that is emitted from a light source via a polarized light conversion element 3164, a condenser lens 3165 and the like. At this time, the intensity of light that is incident to the electro-optical device 3100 in an oblique manner from an outer side is higher than that of light that is incident to the electro-optical device 3100 in an oblique manner from an inner side. Even in such a case, since the light that is incident in an oblique manner from the outer side and the light that is incident in an oblique manner from the inner side are synthesized into light that is projected onto a screen 3111 or the like through a projection optical system 3118, it is difficult for luminance unevenness to occur in images that are projected onto the screen 3111 or the like.

However, as shown in FIG. 45, if the second substrate 3020 (the lens array substrate 3030) is pasted together with the first substrate 3010 in a shifted state, it becomes difficult for light that is incident in an oblique manner from the outer side toward one end side of the electro-optical device 3100 to be emitted from the electro-optical device 3100. As a result of this, the luminance of portions in images that are projected onto the screen 3111 or the like, which correspond to the one end side of the electro-optical device 3100, deteriorates. The abovementioned problem is difficult to solve using the technology that is disclosed in JP-A-2004-61633.

An advantage of some aspects of the invention is to provide an electro-optical device that can suppress luminance unevenness of images even if positional shifts occur when pasting a first substrate, on which pixel electrodes are formed, and a second substrate, on which optical elements such as a lens are formed, together, and an electronic instrument that is provided with the electro-optical device.

The invention can be realized as the following aspects or application examples.

Application Example

According to this application example, there is provided an electro-optical device including: a pair of substrates; first opening components that stipulate sizes and positions of opening sections of pixels in one of the pair of substrates; and second opening components that stipulate sizes and positions of opening sections of the pixels in the other of the pair of substrates, in which positions of the second opening components of the other substrate are corrected with positions of the first opening components of the one substrate set as references, so as to gradually become more shifted in a direction that runs from a core of a pixel region, in which a plurality of pixels are arranged, toward an edge section of the pixel region, in accordance with separation from a core side of the pixel region.

In this case, since the positions of the second opening components of the other substrate are corrected with the positions of the first opening components of the one substrate set as references, in comparison with a case in which correction is not carried out, it is possible to set an allowable amount of relative positional shift of both substrates to be larger when configuring an electro-optical device by pasting the one substrate and the other substrate together. In addition, even if incidence light, which is incident to the pixel region, has an intensity distribution as a result of incidence angles, in a case in which an optical axis of the incidence light is set so as to pass through a core of the pixel region, it is possible to provide an electro-optical device in which it is difficult for display unevenness to occur as an effect of the intensity distribution of the incidence light.

In the electro-optical device according to the application example, the pixel region may be divided into a plurality of correction regions, and correction values, in which correction amounts of positions of the second opening components of predetermined pixels, which are in positions that are most separated from the core of the pixel region, are distributed to positions of a plurality of correction regions, may be applied to the second opening components of pixels that are included in the correction regions, in the one direction.

In this case, since the correction values are set for each of the plurality of correction regions in each of the plurality of pixels, the correction of positions of the second opening components is easily performed in comparison with a case that is applied by determining correction values.

In the electro-optical device according to the application example, among the plurality of correction regions, a correction value of the second opening components of pixels in a correction region that includes the core of the pixel region may be zero.

In this case, in a case in which the optical axis of incidence light is set to pass through the core of the pixel region, since it is difficult for the intensity as a result of incidence angles of incidence light that is incident to the pixel region to fluctuate about the optical axis, it is difficult for display unevenness to occur even if correction values in a correction region that includes the core of the pixel region are set to be zero. In other words, the realization of still simpler correction of the positions of the second opening components is possible.

In the electro-optical device according to the application example, the first opening components and the second opening components may be respectively any one of microlenses, prisms, color filters, and black matrixes.

In this case, it is possible to provide an electro-optical device in which it is difficult for display unevenness to occur even if any one of microlenses, prisms, color filters, and black matrixes are included as the opening component.

Application Example

According to this application example, there is provided an electro-optical device including: an element substrate in which a plurality of pixel electrodes, which are arranged along a first direction and a second direction that intersects the first direction, are provided on one surface side; a lens array substrate, which includes a first lens array that is provided with a plurality of first lenses arranged so as to respectively oppose each of the plurality of pixel electrodes, and which is disposed so as to face the one surface of the element substrate; an electro-optical layer that is provided between the element substrate and the lens array substrate; and a second lens array that is provided with a plurality of second lenses, which arranged so as to respectively oppose each of the plurality of pixel electrodes, in which, among the plurality of first lenses, a distance between cores of two first lenses that are mutually adjacent in the first direction and are positioned on a side of a first end section, which is an end section in the first direction of a region in which the plurality of pixel electrodes are arranged, is a first inter-core distance, and in which, among the plurality of first lenses, a distance between cores of two first lenses that are mutually adjacent in the first direction and are positioned further on a central side of the region in which the plurality of pixel electrodes are arranged than the first end section, is shorter than the first inter-core distance.

In this case, the plurality of first lenses and the plurality of second lenses oppose the plurality of pixel electrodes with a one-to-one relationship, but the cores of the first lenses are shifted to an outer side in the first direction with respect to the cores of the pixel electrodes at end section sides in the first direction of a region in which the pixel electrodes are arranged. Therefore, when the electro-optical device is irradiated with light, even in a case in which the intensity of light that is incident to the electro-optical device in an oblique manner from an outer side is higher than that of light that is incident to the electro-optical device in an oblique manner from an inner side, the light is condensed at substantial centers of the pixel electrodes. Accordingly, when an electro-optical device is produced, it is even possible to suppress the occurrence of a circumstance in which the luminance of an image is partially reduced when the element substrate is pasted together with the lens array substrate in a state that is shifted in the first direction.

In the electro-optical device according to the application example, it is preferable that, among the plurality of first lenses, a distance between cores of two first lenses that are mutually adjacent in the second direction and are positioned on a side of a second end section, which is an end section in the second direction of the region in which the plurality of pixel electrodes are arranged, is a second inter-core distance, and that, among the plurality of first lenses, a distance between cores of two first lenses that are mutually adjacent in the second direction and are positioned further on a central side of the region in which the plurality of pixel electrodes are arranged than the second end section, is shorter than the second inter-core distance. In this case, the cores of the second lenses are shifted to an outer side in the second direction with respect to the cores of the pixel electrodes at end section sides in the second direction of the region in which the pixel electrodes are arranged. Therefore, when the electro-optical device is irradiated with light, even in a case in which the intensity of light that is incident to the electro-optical device in an oblique manner from an outer side is higher than that of light that is incident to the electro-optical device in an oblique manner from an inner side, the light is condensed at substantial centers of the pixel electrodes. Accordingly, when an electro-optical device is produced, it is even possible to suppress the occurrence of a circumstance in which the luminance of an image is partially reduced when the element substrate is pasted together with the lens array substrate in a state that is shifted in the second direction.

In the electro-optical device according to the application example, among the plurality of first lenses, in first lenses that are between the first end section and a center of the region in which the plurality of pixel electrodes are arranged, distances between cores of two first lenses that are mutually adjacent in the first direction gradually may become shorter in accordance with movement from the first end section toward the central side of the region in which the plurality of pixel electrodes are arranged, and that, among the plurality of first lenses, in first lenses that are between the second end section and the center of the region in which the plurality of pixel electrodes are arranged, distances between cores of two first lenses that are mutually adjacent in the second direction gradually may become shorter in accordance with movement from the second end section toward the central side of the region in which the plurality of pixel electrodes are arranged. In this case, it is possible to rectify the positions of the first lenses in the first direction for each first lens.

In the electro-optical device according to the application example, among the plurality of first lenses, in first lenses that are between the first end section and the center of the region in which the plurality of pixel electrodes are arranged, distances between cores of two first lenses that are mutually adjacent in the first direction gradually may become shorter in units of a plurality of lenses in accordance with movement from the first end section toward the central side of the region in which the plurality of pixel electrodes are arranged, and that, among the plurality of first lenses, in first lenses that are between the second end section and a center of the region in which the plurality of pixel electrodes are arranged, distances between cores of two first lenses that are mutually adjacent in the second direction gradually may become shorter in units of a plurality of lenses in accordance with movement from the second end section toward the central side of the region in which the plurality of pixel electrodes are arranged. In this case, it is possible to rectify the positions of the first lenses in the first direction with a plurality of first lenses set as units.

In the electro-optical device according to the application example, it is preferable that, the lens array substrate includes the second lens array, which is positioned between the first lens array and the electro-optical layer, that, among the plurality of second lenses, a distance between cores of two second lenses that are mutually adjacent in the first direction and are positioned on a side of a first end section, which is an end section in the first direction of a region in which the plurality of pixel electrodes are arranged, is a third inter-core distance, that, among the plurality of second lenses, a distance between cores of two second lenses that are mutually adjacent in the first direction and are positioned further on a central side of the region in which the plurality of pixel electrodes are arranged than the first end section, is shorter than the third inter-core distance, that, among the plurality of first lenses, two first lenses that are mutually adjacent in the first direction and in which the distance between cores thereof is the first inter-core distance, overlap with two second lenses that are mutually adjacent in the first direction and in which the distance between cores thereof is the third inter-core distance, and that the third inter-core distance is a length that is less than or equal to the first inter-core distance. In this case, the cores of the second lenses are shifted to an outer side in the first direction with respect to the cores of the pixel electrodes at end section sides in the first direction of the region in which the pixel electrodes are arranged. Therefore, when the electro-optical device is irradiated with light, even in a case in which the intensity of light that is incident to the electro-optical device in an oblique manner from an outer side is higher than that of light that is incident to the electro-optical device in an oblique manner from an inner side, the light is condensed at substantial centers of the pixel electrodes. Accordingly, when an electro-optical device is produced, it is even possible to suppress the occurrence of a circumstance in which the luminance of an image is partially reduced when the element substrate is pasted together with the lens array substrate in a state that is shifted in the first direction.

In the electro-optical device according to the application example, it is preferable that, among the plurality of second lenses, a distance between cores of two second lenses that are mutually adjacent in the second direction and are positioned on a side of a second end section, which is an end section in the second direction of the region in which the plurality of pixel electrodes are arranged, is a fourth inter-core distance, that, among the plurality of second lenses, a distance between cores of two second lenses that are mutually adjacent in the second direction and are positioned further on a central side of the region in which the plurality of pixel electrodes are arranged than the second end section, is shorter than the fourth inter-core distance, that, among the plurality of first lenses, two first lenses that are mutually adjacent in the second direction and in which the distance between cores thereof is the second inter-core distance, overlap with two second lenses that are mutually adjacent in the second direction and in which the distance between cores thereof is the fourth inter-core distance, and that the fourth inter-core distance is a length that is less than or equal to the second inter-core distance. In this case, the cores of the second lenses are shifted to an outer side in the second direction with respect to the cores of the pixel electrodes at end section sides in the second direction of the region in which the pixel electrodes are arranged. Therefore, when the electro-optical device is irradiated with light, even in a case in which the intensity of light that is incident to the electro-optical device in an oblique manner from an outer side is higher than that of light that is incident to the electro-optical device in an oblique manner from an inner side, the light is condensed at substantial centers of the pixel electrodes. Accordingly, when an electro-optical device is produced, it is even possible to suppress the occurrence of a circumstance in which the luminance of an image is partially reduced when the element substrate is pasted together with the lens array substrate in a state that is shifted in the second direction.

In the electro-optical device according to the application example, among the plurality of second lenses, in second lenses that are between the first end section and a center of the region in which the plurality of pixel electrodes are arranged, distances between cores of two second lenses that are mutually adjacent in the first direction gradually may become shorter in accordance with movement from the first end section toward the central side of the region in which the plurality of pixel electrodes are arranged, and that, among the plurality of second lenses, in second lenses that are between the second end section and the center of the region in which the plurality of pixel electrodes are arranged, distances between cores of two second lenses that are mutually adjacent in the second direction gradually may become shorter in accordance with movement from the second end section toward the central side of the region in which the plurality of pixel electrodes are arranged. In this case, it is possible to rectify the positions of the second lenses in the first direction for each second lens.

In the electro-optical device according to the application example, among the plurality of second lenses, in second lenses that are between the first end section and the center of the region in which the plurality of pixel electrodes are arranged, distances between cores of two second lenses that are mutually adjacent in the first direction gradually may become shorter in units of a plurality of lenses in accordance with movement from the first end section toward the central side of the region in which the plurality of pixel electrodes are arranged, and that, among the plurality of second lenses, in second lenses that are between the second end section and a center of the region in which the plurality of pixel electrodes are arranged, distances between cores of two second lenses that are mutually adjacent in the second direction gradually may become shorter in units of a plurality of lenses in accordance with movement from the second end section toward the central side of the region in which the plurality of pixel electrodes are arranged. In this case, it is possible to rectify the positions of the second lenses in the first direction with a plurality of second lenses set as units.

In the electro-optical device according to the application example, among the plurality of pixel electrodes, a core of a pixel electrode that overlaps with a first lens, among the plurality of first lenses, may be positioned on a line that connects a core of the first lens and a core of a second lens, among the plurality of second lenses, that overlaps with the first lens.

In the electro-optical device according to the application example, the element substrate may include the second lens array.

In the electro-optical device according to the application example, the element substrate may include a third lens array that is provided with a plurality of third lenses, which arranged so as to respectively oppose each of the plurality of pixel electrodes.

Application Example

According to this application example, there is provided an electro-optical device including a first substrate in which a plurality of pixel electrodes are arranged along a first direction, and a second substrate in which a plurality of optical elements are arranged so as to correspond to each of the plurality of pixel electrodes, in which the plurality of pixel electrodes are arranged so that distances in the first direction between cores of two pixel electrodes that are mutually adjacent in the first direction are all a first pitch, the plurality of optical elements are arranged so that distances in the first direction between cores of two optical elements that are mutually adjacent in the first direction are all a second pitch, the second pitch is longer than the first pitch, and, among the plurality of optical elements, the cores of optical elements that are positioned in an end section in the first direction are positioned further on an outer side than the cores of the pixel electrodes, among the plurality of pixel electrodes, that correspond to the optical elements that are positioned in the end section in the first direction.

In this case, the plurality of optical elements of the second substrate each oppose the plurality of pixel electrodes of the first substrate, but the distances between cores of the optical elements in the first direction (the second pitch) is longer than the distance between cores of the pixel electrodes in the first direction (the first pitch). Therefore, the cores of the optical elements are positioned further on an outer side in the first direction than the cores of the pixel electrodes at end sections in the first direction. Therefore, when the electro-optical device is irradiated with light, light that is incident in an oblique manner from an outer side in the first direction is incident to substantial centers of the pixel electrodes via the optical elements. For this reason, it is even possible to suppress the occurrence of a circumstance in which luminance is partially reduced in a projected image when the second substrate is pasted together with the first substrate in a state that is shifted in the first direction in a case in which the intensity of light that is incident in an oblique manner from an outer side in the first direction is higher than that of light that is incident to the electro-optical device in an oblique manner from an inner side.

In the electro-optical device according to the application example, it is preferable that, the plurality of pixel electrodes are arranged along a second direction that intersects the first direction, that the plurality of pixel electrodes are arranged so that distances in the second direction between cores of two pixel electrodes that are mutually adjacent in the second direction are all a third pitch, that the plurality of optical elements are arranged so that distances in the second direction between cores of two optical elements that are mutually adjacent in the second direction are all a fourth pitch, that the fourth pitch is longer than the third pitch, and that, among the plurality of optical elements, the cores of optical elements that are positioned in an end section in the second direction are positioned further on an outer side than the cores of the pixel electrodes, among the plurality of pixel electrodes, that correspond to the optical elements that are positioned in the end section in the second direction. In this case, the cores of the optical elements are positioned further on an outer side in the second direction than the cores of the pixel electrodes at end sections in the second direction. Therefore, when the electro-optical device is irradiated with light, light that is incident in an oblique manner from an outer side in the second direction is incident to substantial centers of the pixel electrodes via the optical elements. For this reason, it is even possible to suppress the occurrence of a circumstance in which luminance is partially reduced in a projected image when the second substrate is pasted together with the first substrate in a state that is shifted in the second direction in a case in which the intensity of light that is incident in an oblique manner from an outer side in the second direction is higher than that of light that is incident to the electro-optical device in an oblique manner from an inner side.

In the electro-optical device according to the application example, each of the plurality of optical elements may be a lens that condenses light that is respectively incident thereto.

In the electro-optical device according to the application example, it is preferable that, each of the plurality of optical elements is a first lens that condenses light that is respectively incident thereto, that the first substrate is provided with plurality of second lenses that are arranged so as to correspond to each of the plurality of pixel electrodes, that the plurality of second lenses are arranged so that distances in the first direction between cores of two second lenses that are mutually adjacent in the first direction are all a fifth pitch, and that the fifth pitch is longer than the first pitch and shorter than the second pitch.

In the electro-optical device according to the application example, each of the plurality of optical elements may be a black matrix that shields a portion of light that is respectively incident thereto.

In the electro-optical device according to the application example, each of the plurality of optical elements may be a color filter that transmits light of light of a portion of wavelengths among light that is respectively incident thereto.

In the electro-optical device according to the application example, it is preferable that a width along the first direction of each of the plurality of optical elements is greater than a width along the first direction of each of the plurality of pixel electrodes. In this case, light that is incident from the front of and from an inner side of the electro-optical device is transmitted through the optical elements and is likely to be incident to the pixel electrodes at end sections in the first direction in the same manner as the center in the first direction.

In the electro-optical device according to the application example, it is preferable that, among the plurality of optical elements, widths along the first direction of optical elements that are positioned in an end section in the first direction are greater than widths along the first direction of optical elements that are positioned further on a central side than the end section in the first direction. In this case, light that is incident from the front of and from an inner side of the electro-optical device is transmitted through the optical elements and is likely to be incident to the pixel electrodes at end sections in the first direction in the same manner as the center in the first direction.

Application Example

According to this application example, there is provided an electronic instrument such as a projection type display device or a direct viewing type display device, for example, in which an electro-optical device to which the invention is applied is used. In a case of using the electro-optical device according to the invention in a projection type display device, a light source section that emits light that is supplied to the electro-optical device and a projection optical system that projects light that is modulated by the electro-optical device, are provided in the projection type display device.

BRIEF DESCRIPTION OF THE DRAWINGS

The invention will be described with reference to the accompanying drawings, wherein like numbers reference like elements.

FIG. 7 is a schematic diagram for describing display unevenness in the projection type display device.

FIG. 11A is a graph that shows a relationship between assembly shift and brightness (transmittance) in each region on a screen.

DESCRIPTION OF EXEMPLARY EMBODIMENTS

Hereinafter, specific embodiments of the invention will be described in accordance with the drawings. Additionally, the drawings that are used are displayed enlarged or reduced as appropriate so that portions to be described are in recognizable states.

Embodiment 1

In the present embodiment, description is given using an active matrix type liquid crystal device as an example of an electro-optical device that is provided with a thin film transistor (TFT) as a switching element of a pixel. It is possible to use the liquid crystal device suitably as an optical modulation element (a liquid crystal light bulb) of a projection type display device (a liquid crystal projector) that will be described below.

Electronic Instrument

Figure 1:
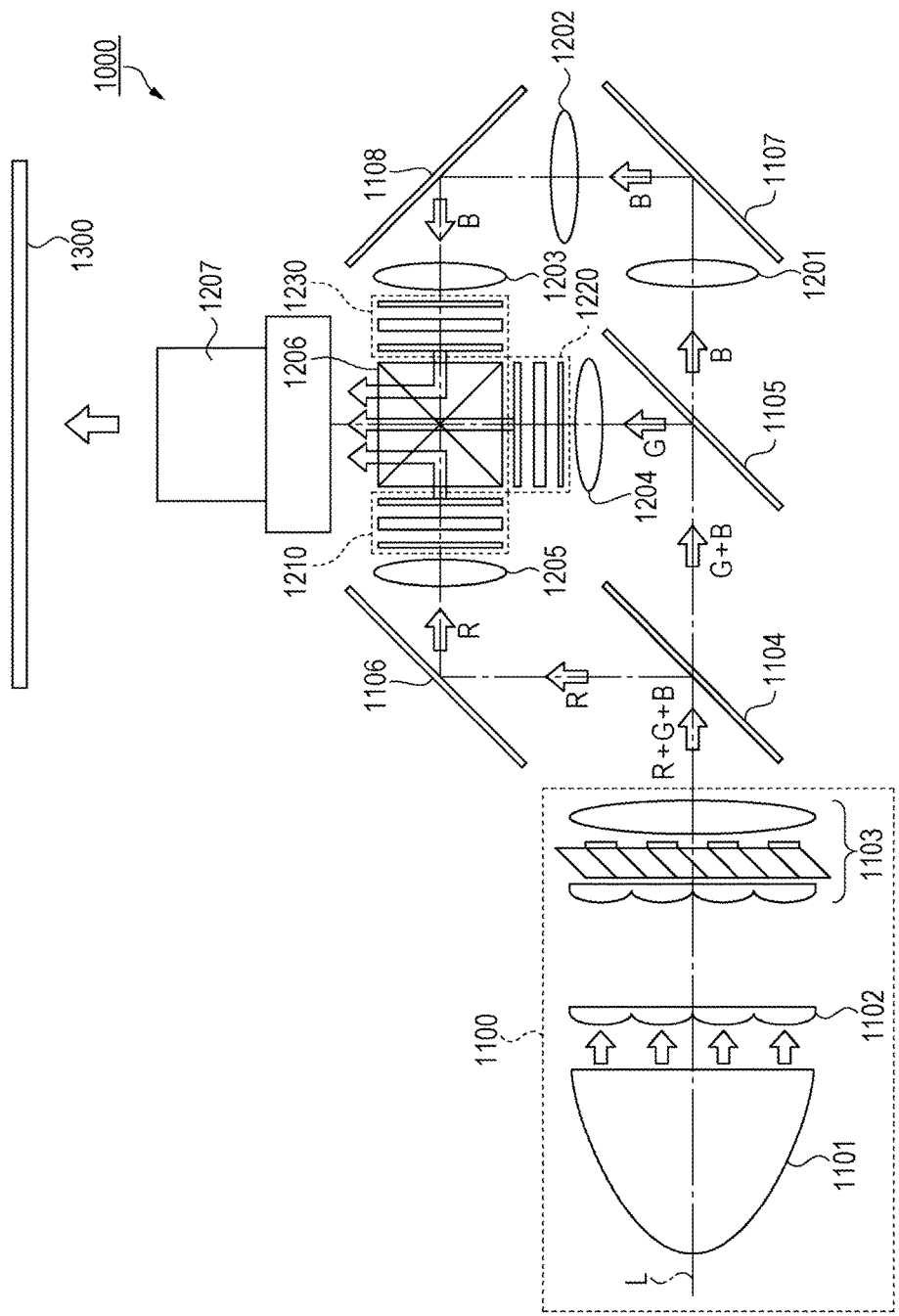
FIG. 1 is a schematic diagram that shows a configuration of a projection type display device.

Firstly, a projection type display device will be described with reference to FIG. 1 as an electronic instrument in which a liquid crystal device is adopted as the electro-optical device of the present embodiment. FIG. 1 is a schematic diagram that shows a configuration of a projection type display device.

As shown in FIG. 1, a projection type display device 1000, as the electronic instrument of the present embodiment, is provided with a polarized light illumination device 1100 that is disposed along a system optical axis L, two dichroic mirrors 1104 and 1105 as optical separation elements, three reflective mirrors 1106, 1107, and 1108, five relay lenses 1201, 1202, 1203, 1204 and 1205, three transmissive type liquid crystal light bulbs 1210, 1220 and 1230 as optical modulation means, a cross dichroic prism 1206 as an optical synthesis element, and a projection lens 1207.

The polarized light illumination device 1100 is schematically configured from a lamp unit 1101 as a light source that is formed from a white light source such as an ultrahigh pressure mercury lamp or a halogen lamp, an integrator lens 1102, and a polarized light conversion element 1103.

Among polarized light beams that are emitted from the polarized light illumination device 1100, the dichroic mirror 1104 reflects red light (R), and transmits green light (G) and blue light (B). Another dichroic mirror 1105 reflects the green light (G) that is transmitted by the dichroic mirror 1104, and transmits the blue light (B).

The red light (R) that is reflected by the dichroic mirror 1104 is incident to the liquid crystal light bulb 1210 via the relay lens 1205 after being reflected by the reflective mirror 1106.

The green light (G) that is reflected by the dichroic mirror 1105 is incident to the liquid crystal light bulb 1220 via the relay lens 1204.

The blue light (B) that is transmitted by the dichroic mirror 1105 is incident to the liquid crystal light bulb 1230 via an optical guiding system that is formed from the three relay lenses 1201, 1202 and 1203 and the two reflective mirrors 1107 and 1108.

The liquid crystal light bulbs 1210, 1220 and 1230 are respectively disposed opposite to incidence surfaces of each color of light of the cross dichroic prism 1206. The color of light that is incident to the liquid crystal light bulbs 1210, 1220 and 1230 is modulated on the basis of image information (an image signal) and is emitted toward the cross dichroic prism 1206. In the prism, four right angle prisms are pasted together, and a dielectric multilayer that reflects red light and a dielectric multilayer that reflects blue light are formed in cross form on the inside thereof. The three colors of light are synthesized by these dielectric multilayers, and light that represents a color image is synthesized. Synthesized light is projected on a screen 1300 by the projection lens 1207, which is a projection optical system, and an image is enlarged and displayed.

The liquid crystal light bulb 1210 uses a liquid crystal device 100 (refer to FIG. 2), which will be described later. A pair of polarization elements, which are disposed in crossed Nichol form, are disposed on an incidence side and an emission side of colored light of the liquid crystal device 100 with a gap. The same applies to the other liquid crystal light bulbs 1220 and 1230.

According to this kind of projection type display device 1000, since the liquid crystal device 100, which will be described later, is used as the liquid crystal light bulbs 1210, 1220 and 1230, it is possible to provide a projection type display device 1000 that is capable of bright display, in which it is difficult for display unevenness to occur as a result of relative positional shift between the pair of substrates.

Electro-Optical Device

Figure 2:
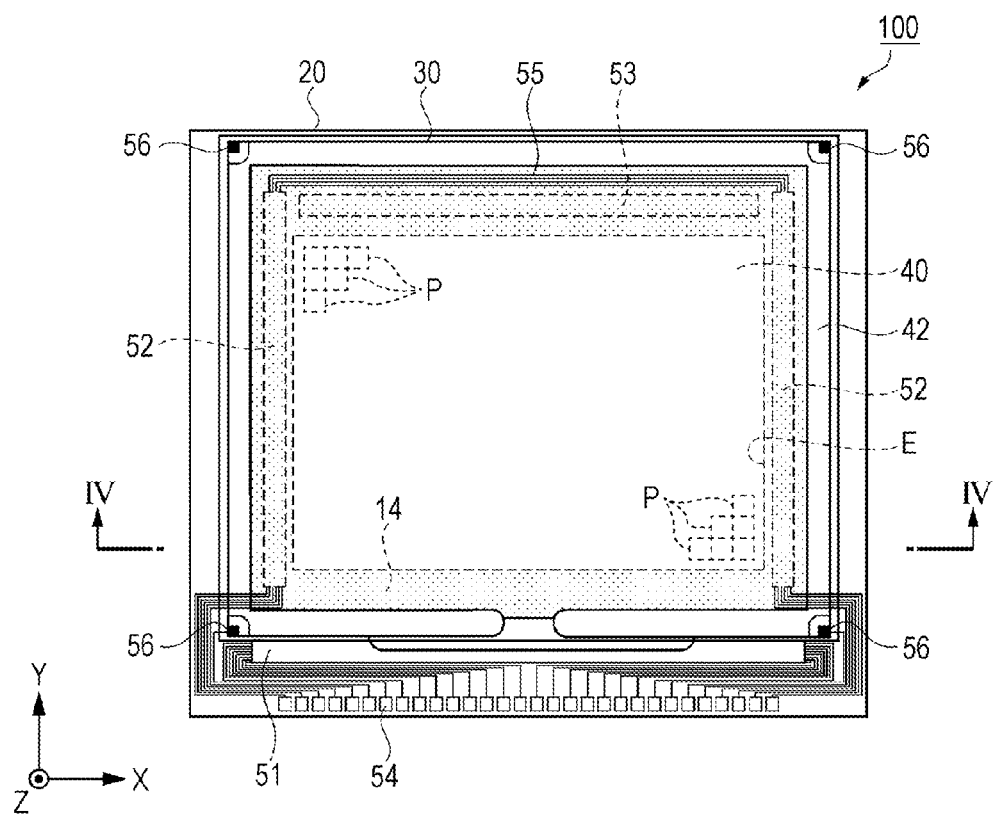
FIG. 2 is a schematic plan view that shows a configuration of a liquid crystal device.
Figure 3:
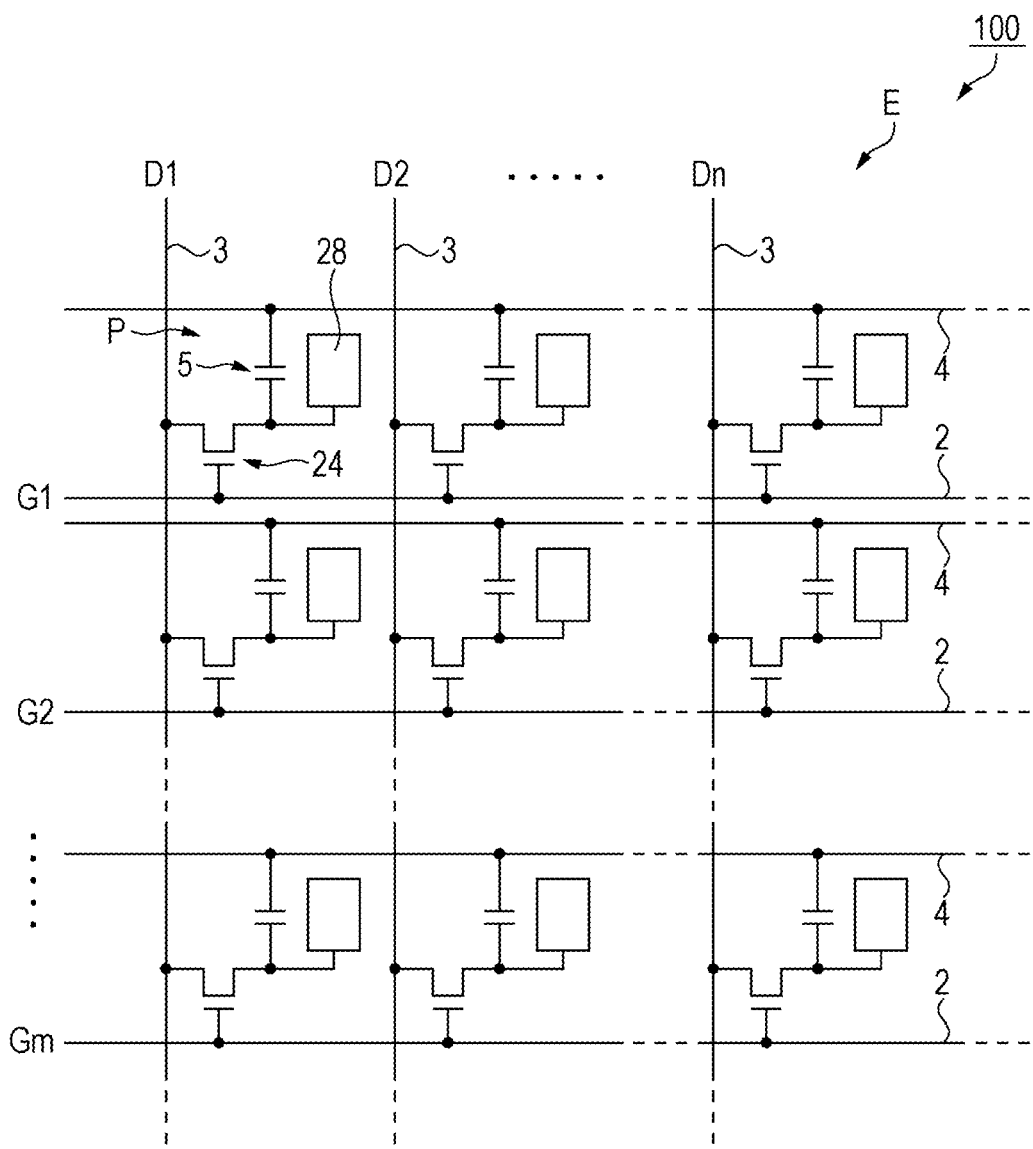
FIG. 3 is an equivalent circuit diagram that shows an electrical configuration of the liquid crystal device.

Next, the liquid crystal device 100 will be described with reference to FIGS. 2 to 4 as an electro-optical device of the present embodiment. FIG. 2 is a schematic plan view that shows a configuration of a liquid crystal device, FIG. 3 is an equivalent circuit diagram that shows an electrical configuration of the liquid crystal device, and FIG. 4 is a schematic cross-sectional view that shows a structure of the liquid crystal device along a IV-IV line in FIG. 2.

Figure 4:
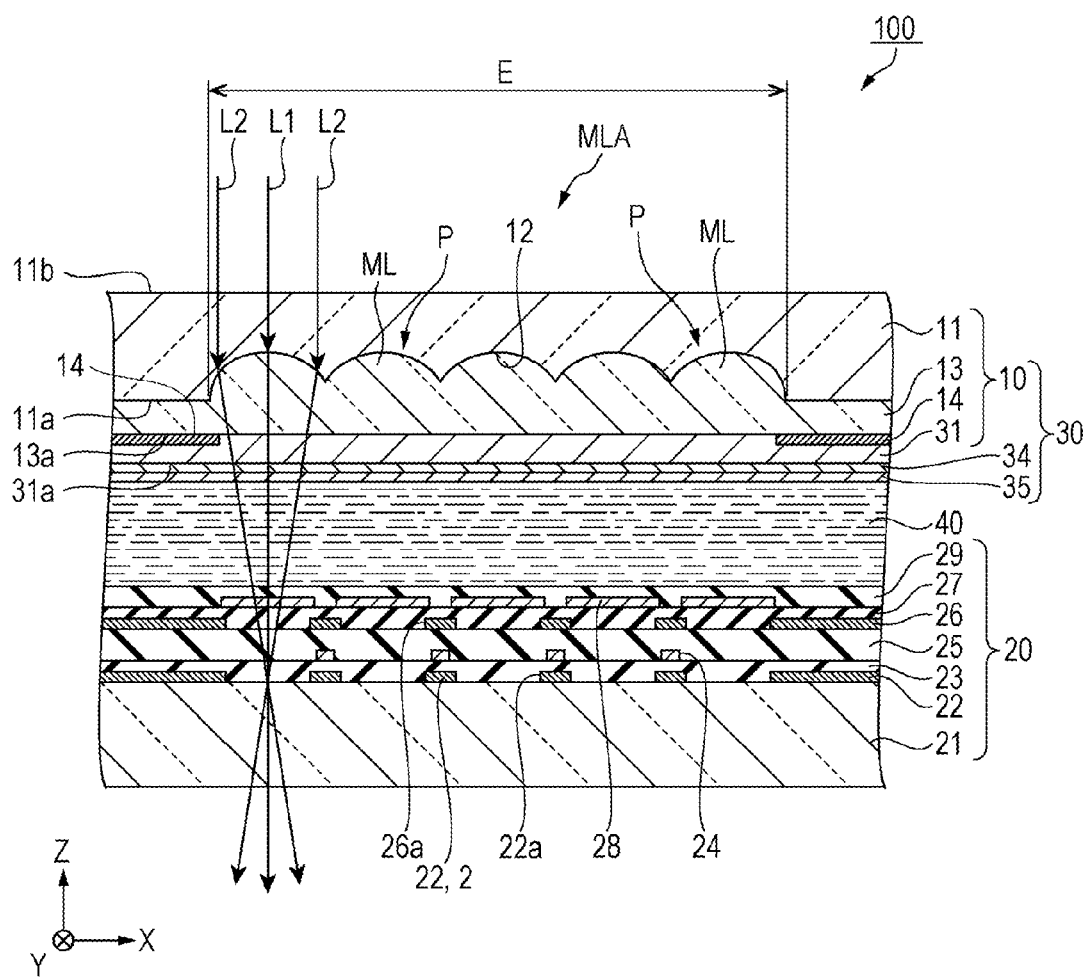
FIG. 4 is a schematic cross-sectional view that shows a structure of the liquid crystal device along a IV-IV line in FIG. 2.

As shown in FIGS. 2 and 4, the liquid crystal device 100 as the electro-optical device of the present embodiment includes an element substrate 20 and an opposing substrate 30 as a pair of substrates that are disposed opposite to one another, and a liquid crystal layer 40, as an electro-optical element that is interposed between the element substrate 20 and the opposing substrate 30. As shown in FIG. 2, the element substrate 20 is larger than the opposing substrate 30, and both substrates are pasted together using a sealing material 42 that is disposed in frame form along an outer edge of the opposing substrate 30.

The liquid crystal layer 40 is configured by liquid crystal molecules, which have either positive or negative dielectric anisotropy, and is sealed into a space that is surrounded by the element substrate 20, the opposing substrate 30 and the sealing material 42. The sealing material 42 is, for example, formed from an adhesive such as a thermosetting or an ultraviolet curable epoxy resin. A spacer (not illustrated) for retaining an interval between the element substrate 20 and the opposing substrate 30 as uniform is mixed in the sealing material 42.

A pixel region E in which a plurality of pixels P are arranged in matrix form is provided on an inner side of the sealing material 42 which is disposed in frame form. In addition, a boundary section 14 is provided between the sealing material 42 and the pixel region E surrounding the pixel region E. The boundary section 14 is, for example, formed from a light shielding metal or a metal compound. Additionally, in addition to the plurality of pixels P that contribute to display, the pixel region E may include dummy pixels, which are disposed so as to surround the plurality of pixels P. In addition, although this will be described in more detail later, in the pixel region E, opening components, which stipulate sizes and positions of opening sections of the plurality of pixels P are respectively provided on the element substrate 20 and the opposing substrate 30.

A terminal section in which a plurality of external connection terminals 54 are arranged, is provided on the element substrate 20. A data line driving circuit 51 is provided between a first side section along the terminal section of the element substrate 20 and the sealing material 42. In addition, an inspection circuit 53 is provided between the sealing material 42 along a second side section, which opposes the first side section, and the pixel region E. Furthermore, scanning line driving circuits 52 are provided between the sealing material 42 along third and fourth side sections, which are respectively orthogonal to the first side section and oppose one another, and the pixel region E. A plurality of wiring 55 that connects the two scanning line driving circuits 52 is provided between the sealing material 42 of the second side section and the inspection circuit 53. Additionally, the disposition of the inspection circuit 53 is not limited to this, and the inspection circuit 53 may be provided in a position along an inner side of the sealing material 42 between the data line driving circuit 51 and the pixel region E.

Wiring that connects the data line driving circuit 51 and the scanning line driving circuits 52 is connected to the plurality of external connection terminals 54, which are arranged along the first side section. Hereinafter, description will be given with a direction along the first side section set as an X direction, and a direction along the third side section set as a Y direction. The X direction is a direction along a IV-IV line in FIG. 2. In addition, a direction that is orthogonal to the X direction and the Y direction and runs along the top in FIG. 2 is set as a Z direction. In the present specification, viewing from a normal vector direction (the Z direction) of a surface 11*b* (refer to FIG. 4) of the opposing substrate 30 of the liquid crystal device 100 will be referred to as "plan view".

Next, an electrical configuration of the liquid crystal device 100 will be described with reference to FIG. 3. In at least the pixel region E, the liquid crystal device 100 includes a plurality of scanning lines 2 and a plurality of data lines 3 as signal wiring, which are orthogonal and mutually isolated from one another, and capacity lines 4, which are disposed in parallel along the scanning lines 2. A direction in which the scanning lines 2 extend is the X direction and a direction in which the data lines 3 extend is the Y direction.

The scanning lines 2, the data lines 3, the capacity lines 4, and a pixel electrode 28, a TFT 24 and an accumulation capacity 5, which are provided in a region that is divided by the abovementioned signal lines configure a pixel circuit of the pixels P.

The scanning line 2 is electrically connected to a gate of the TFT 24, and the data line 3 is electrically connected to a source of the TFT 24. The pixel electrode 28 is electrically connected to a drain of the TFT 24.

The data lines 3 are connected to the data line driving circuit 51 (refer to FIG. 2), and image signals D1, D2, . . . , and Dn that are supplied from the data line driving circuit 51 are supplied to the pixels P. The scanning lines 2 are connected to the scanning line driving circuits 52 (refer to FIG. 2), and scanning signals G1, G2, . . . , and Gm that are supplied from the scanning line driving circuits 52 are supplied to the pixels P.

The image signals D1 to Dn that are supplied to the data lines 3 from the data line driving circuit 51 may be supplied sequentially to each line in this order, or may be supplied to each group of a plurality of adjacent data lines 3. The scanning line driving circuits 52 supply the scanning signals G1 to Gm sequentially to the scanning lines 2 at a predetermined timing in pulses.

As a result of the TFT 24, which is a switching element, only being in an on state for a fixed period of time due to the input of the scanning signals G1 to Gm, the liquid crystal device 100 has a configuration in which the image signals D1 to Dn, which are supplied from the data lines 3, are written into the pixel electrode 28 at a predetermined timing. Further, image signals D1 to Dn of a predetermined level that are written into the liquid crystal layer 40 through the pixel electrode 28 are maintained between the pixel electrode 28 and a common electrode 34 (refer to FIG. 4), which is disposed opposite to the pixel electrode 28 through the liquid crystal layer 40 for a fixed period of time. The frequency of the image signals D1 to Dn is, for example, 60 Hz.

In order to prevent the maintained image signals D1 to Dn from leaking, a liquid crystal capacity that is formed between the pixel electrode 28 and the common electrode 34 is connected to the accumulation capacity 5 in parallel. The accumulation capacity 5 is provided between the drain of the TFT 24 and the capacity lines 4.

Additionally, the data lines 3 are connected to the inspection circuit 53 that is shown in FIG. 2, and in a manufacturing process of the liquid crystal device 100, a configuration that is capable of confirming operational defects and the like of the liquid crystal device 100 by detecting the abovementioned image signals is set, but illustration of the inspection circuit 53 has been omitted from the equivalent circuit diagram of FIG. 3.

In the present embodiment, a peripheral circuit, which performs driving control of the pixel circuits, includes the data line driving circuit 51, the scanning line driving circuits 52, and the inspection circuit 53. In addition, the peripheral circuit may be set to include a sampling circuit, which samples and supplies the image signals to the data lines 3, and a precharging circuit, which supplies a precharging signal of a predetermined level to the data lines 3 prior to the abovementioned image signals.

Next, a configuration of the liquid crystal device 100 will be described with reference to FIG. 4. As shown in FIG. 4, the element substrate 20 is provided with a substrate main body 21, and a first light shielding layer 22, an insulation film 23, the TFT 24, a first interlayer insulation film 25, a second light shielding layer 26, a second interlayer insulation film 27, the pixel electrode 28, and an alignment film 29, which are provided on top of the substrate main body 21. The substrate main body 21 uses, for example, a translucent material such as glass or quartz with a transmittance of light in the visible light wavelength region of greater than or equal to 90%.

The first light shielding layer 22 and the second light shielding layer 26 can, for example, use a metal simple substance, an alloy, a metal silicide, a polysilicide, or a nitride that includes at least one of metals such as aluminum (Al), titanium (Ti), chromium (Cr), tungsten (W), tantalum (Ta) and molybdenum (Mo), or a substance in which these are laminated, and have a light shielding property and conductivity.

The first light shielding layer 22 is formed in lattice form so as to overlap with the second light shielding layer 26 of an upper layer in plan view, and is disposed so as to interpose the TFT 24 between the first light shielding layer 22 and the second light shielding layer 26 in a thickness direction (the Z direction) of the element substrate 20. The incidence of light to the TFT 24 is suppressed by the first light shielding layer 22 and the second light shielding layer 26. Regions (inside opening sections 22a and 26a) that are surrounded by the first light shielding layer 22 and the second light shielding layer 26 form opening regions in which light is transmitted through the element substrate 20.

The insulation film 23 is provided so as to cover the substrate main body 21 and the first light shielding layer 22. The insulation film 23 is, for example, formed from an inorganic material such as $SiO_2$. The TFT 24 is provided on the insulation film 23. Although illustration has been omitted from the drawings, the TFT 24 includes a semiconductor layer, a gate electrode, a source electrode and a drain electrode.

The gate electrode is disposed in the element substrate 20 opposite a region that overlaps with a channel region of the semiconductor layer in plan view through a portion of the first interlayer insulation film 25 (a gate insulation film).

A portion of the first light shielding layer 22 is patterned so as to function as the scanning line 2 (refer to FIG. 3). The gate electrode is electrically connected to the scanning lines 2 that are disposed on a lower layer side through contact holes that penetrate through the gate insulation film and the insulation film 23.

The first interlayer insulation film 25 is provided so as to cover the insulation film 23 and the TFT 24. The first interlayer insulation film 25 is, for example, formed from an inorganic material such as $SiO_2$. The first interlayer insulation film 25 includes a gate insulation film which insulates between the semiconductor layer and the gate electrode of the TFT 24. Unevenness in the surface that is caused by the TFT 24 is alleviated by the first interlayer insulation film 25.

The second light shielding layer 26 is provided on the first interlayer insulation film 25. The second light shielding layer 26 is electrically connected to the TFT 24, and for example, is patterned so as to function as any one of the data lines 3, the capacity lines 4, or the electrodes of the accumulation capacity 5. Further, the second interlayer insulation film 27, which is formed from an inorganic material, is provided so as to cover the first interlayer insulation film 25 and the second light shielding layer 26.

The pixel electrode 28 is, for example, formed from a transparent conductive film such as Indium Tin Oxide (ITO) or Indium Zinc Oxide (IZO), and is provided on the second interlayer insulation film 27 to correspond to the pixels P.

The alignment film 29, which covers the pixel electrode 28, can use an organic resin material such as a polyimide, for example, that is capable of causing liquid crystal (liquid crystal molecules) which has positive dielectric anisotropy to have a substantially horizontal alignment, or an inorganic material such as silicon oxide, for example, that is capable of causing liquid crystal (liquid crystal molecules) which has negative dielectric anisotropy to have a substantially vertical alignment.

The liquid crystal molecules that configure the liquid crystal layer 40 modulate light that is incident to the liquid crystal layer 40 as a result of an alignment state thereof changing due to the a voltage level that is applied between the pixel electrode 28 and the common electrode 34, and are set to be capable of gradation display. For example, in a case of a normally white mode, the transmittance with respect to incidence light is decreased depending on a voltage that is input in units of each pixel P. In a case of a normally black mode, the transmittance with respect to incidence light is increased depending on a voltage that is input in units of each pixel P, and light that has a contrast that depends on image signals is emitted from the liquid crystal device 100 as a whole. In the present embodiment, the liquid crystal device 100 is configured on the premise that light is incident from an opposing substrate 30 side, is transmitted through the liquid crystal layer 40, and is emitted from an element substrate 20 side.

The opposing substrate 30 is provided with a microlens array substrate 10, the common electrode 34, and an alignment film 35. The microlens array substrate 10 includes a substrate main body 11, a lens layer 13, which includes microlenses ML, which are respectively provided to correspond to the plurality of pixels P, boundary sections 14 as a light shielding film, and a path layer 31, which is an optical path length adjustment layer. Additionally, the microlens array substrate 10 may have a configuration which includes the common electrode 34, and may have a configuration which includes the common electrode 34 and the alignment film 35.

The common electrode 34 is at least formed across the pixel region E, and is electrically connected to the wiring of the element substrate 20 side through an upper and lower conductive members 56 (refer to FIG. 2), which are provided in four corner sections of the opposing substrate 30.

The substrate main body 11 includes a plurality of concave sections 12, which are formed on a surface 11a on a liquid crystal layer 40 side which is an opposite side to the surface 11b. Each concave section 12 is provided to correspond to each pixel P. The concave sections 12 are formed in a curved surface shape which tapers away toward a bottom section thereof, and configures a convex lens surface in the microlens ML. Therefore, hereinafter, the concave sections 12 may be referred to as the lens surfaces 12. The substrate main body 11 uses, for example, a translucent material such as glass or quartz.

The lens layer 13 includes a plurality of the microlenses ML that are formed buried in the plurality of concave sections 12, which are respectively formed to correspond to the plurality of pixels P, on the surface 11a side of the substrate main body 11. The lens layer 13 is translucent, and is formed from an inorganic lens material in which the refractive index n is higher than that of the substrate main body 11. For example, if the substrate main body 11 is a quartz substrate with a refractive index n of approximately 1.46, SiON (refractive index n=1.55 to 1.64), and $Al_2O_3$ (refractive index n=1.76) can be given as examples of lens materials that configure the lens layer 13. Additionally, the refractive index n is dependent on the wavelength of light that is transmitted through the substrate main body 11 and the lens layer 13.

The lens layer 13 forms the concave sections 12 through selective etching of one surface 11a of the substrate main body 11, and includes convex-shaped microlenses ML that are formed by burying the concave sections 12 with the abovementioned lens material. In addition, a microlens array MLA is configured by the plurality of microlenses ML.

Boundary sections 14 are provided on a flat surface 13a that is on an opposite side of the lens layer 13 to the microlenses ML. The boundary section 14 is provided in a peripheral region that surrounds the pixel region E, in which the plurality of microlenses ML are provided. In addition, although this will be described in more detail later, light shielding films, which correspond to the arrangement of the microlenses ML are provided in the pixel region E in the same layer as the boundary section 14. Therefore, for convenience of description, the boundary section 14 may merely be referred to as the light shielding films 14.

The boundary section 14 can, for example, be configured by a material that has light shielding property such as aluminum (Al), molybdenum (Mo), tungsten (W), titanium (Ti), titanium nitride (TiN), or chromium (Cr), or a laminated body of at least two materials selected from these materials. Detailed illustration has been omitted from FIG. 4, but in the present embodiment, the boundary section 14 has a two-layered structure of aluminum (Al) and titanium nitride (TiN) which are laminated in order from a surface 13a side of the lens layer 13.

The path layer 31 is provided covering the boundary section 14 and the surface 13a of the lens layer 13. The path layer 31 is translucent and is, for example, formed from an inorganic material that has substantially the same refractive index n as the substrate main body 11. The path layer 31 is provided in order to planarize the surface of the microlens array substrate 10 on the side that faces the liquid crystal layer 40, and to match focus of the microlenses ML with desired positions. Therefore, a film thickness of the path layer 31 is set as appropriate on the basis of optical conditions such as a focal length of the microlenses ML, which corresponds to a wavelength of light.

The common electrode 34 is provided covering the path layer 31. The common electrode 34 is an opposing electrode, which is formed to extend over the plurality of pixels P, and which opposes the pixel electrode 28 with the liquid crystal layer 40 interposed therebetween. The common electrode 34 uses, for example, a transparent conductive film such as Indium Tin Oxide (ITO) or Indium Zinc Oxide (IZO). Since the common electrode 34 is disposed opposing the plurality of pixel electrodes 28 with the liquid crystal layer 40 interposed therebetween, in order to realize desired optical characteristics for each pixel P, it is preferable that that the surface of the common electrode 34 is flat.

The alignment film 35 is provided covering the common electrode 34. In the same manner as the alignment film 29 on the element substrate 20 side, the alignment film 35 is, for example, formed using an organic resin material such as a polyimide, or an inorganic material such as silicon oxide. In the abovementioned manner, the material selection and a method of an alignment process of the alignment films 29 and 35 depend on a selection of liquid crystal and a display mode on the basis of the optical design of the liquid crystal device 100.

In the liquid crystal device 100, light (illumination light) is incident from the opposing substrate 30 (the surface 11b of the substrate main body 11) side, which is provided with the microlenses ML, and is concentrated for each pixel P by the microlenses ML. For example, among light that is incident to the convex-shaped microlenses ML from the surface 11b of the substrate main body 11, incidence light L1, which is incident along an optical axis and transmitted through a flat core of the pixels, proceeds directly through the microlenses ML without change, is transmitted through the liquid crystal layer 40 and is emitted to the element substrate 20 side.

Incidence light L2, which is incident in a peripheral section of the microlenses ML further on an outer side than the incidence light L1, is refracted to a flat core side of the pixels P by a difference in the refractive index n of the substrate main body 11 and the lens layer 13. If the incidence light L2 proceeds directly without change, there is a concern that the incidence light L2 will be slightly refracted as a result of being transmitted through the liquid crystal layer 40 and the element substrate 20, incident to the second light shielding layer 26 (or the first light shielding layer 22) and shielded.

In the liquid crystal device 100, as a result of a condensing action of the microlenses ML, it is also possible for incidence light L2, for which there is a concern of being shielded by the second light shielding layer 26 (or the first light shielding layer 22) to be transmitted through the liquid crystal layer 40 and incident within the opening section 26a of the second light shielding layer 26 (or the opening section 22a of the first light shielding layer 22). As a result of this, since an amount of light that is emitted from the element substrate 20 side is larger, it is possible to improve a usage efficiency of light.

Opening Components of Pixels

Figure 5:
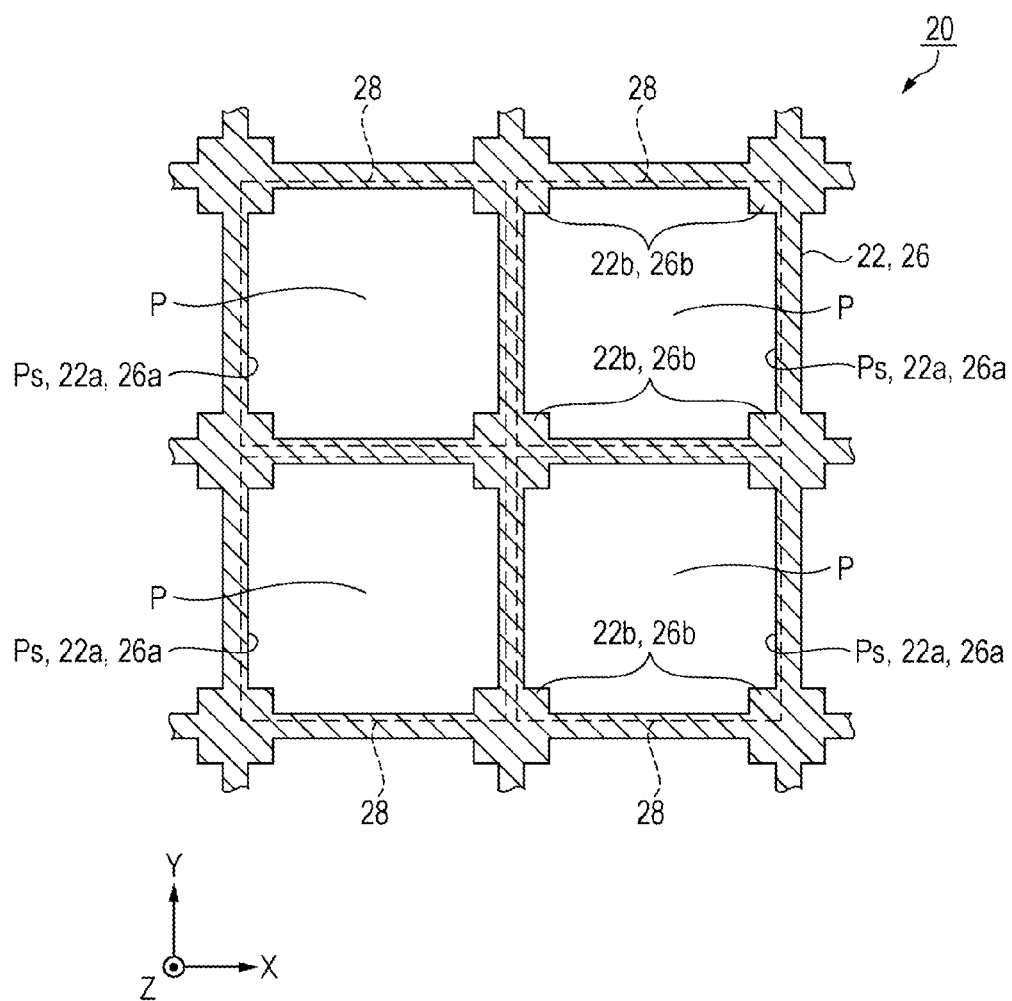
FIG. 5 is a schematic cross-sectional view that shows the disposition of pixels in an element substrate.
Figure 6A:
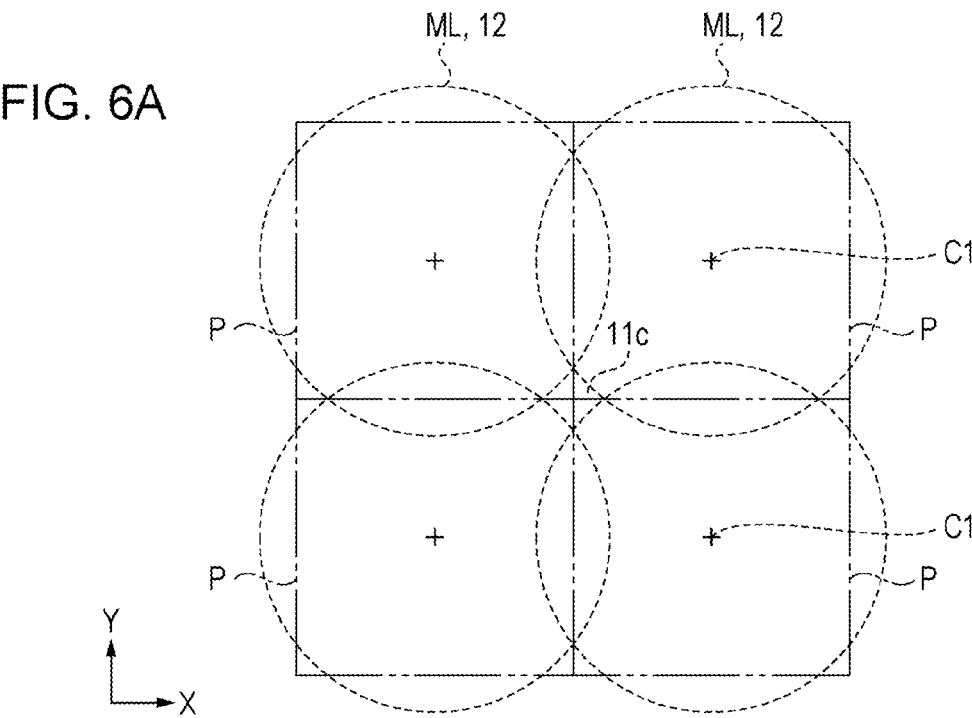
FIG. 6A is a schematic plan view that shows the disposition of microlenses that correspond to pixels in an opposing substrate.
Figure 6B:
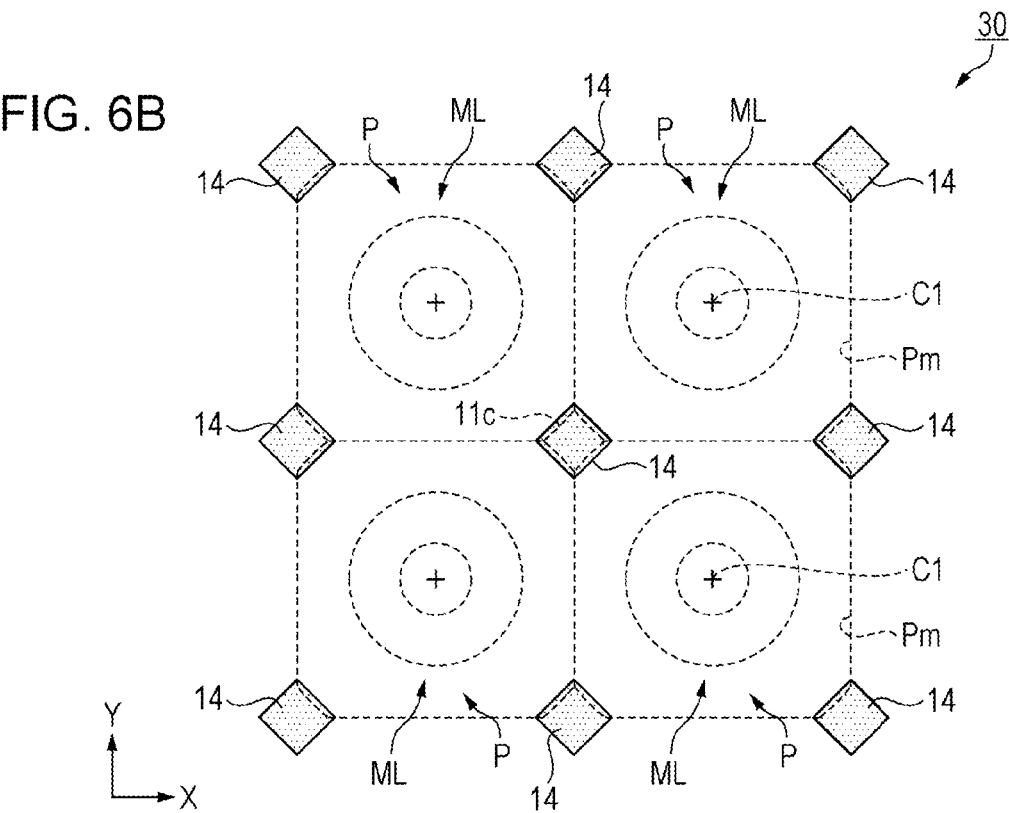
FIG. 6B is a schematic plan view that shows the disposition of microlenses that correspond to pixels in an opposing substrate.

Next, respective opening components in the element substrate 20 and the opposing substrate 30, which define sizes and positions of opening sections of the pixels P will be described with reference to FIGS. 5, 6A, and 6B. FIG. 5 is a schematic cross-sectional view that shows the disposition of pixels in an element substrate, FIGS. 6A and 6B are schematic plan views that show the disposition of microlenses that correspond to pixels in an opposing substrate.

As shown in FIG. 5, light shielding sections are provided in the element substrate 20 as first opening components that respectively stipulate sizes and positions of opening sections Ps in the plurality of pixels P that are disposed in matrix form in the X direction and the Y direction. The light shielding sections are provided in lattice form as a result of the first light shielding layer 22, which mainly extends in the X direction, and the second light shielding layer 26, which mainly extends in the Y direction, overlapping with one another in plan view. Accordingly, the symbols 22 and 26 will be applied thereto and the light shielding sections will be referred to as the light shielding sections 22 and 26. The widths of intersecting sections 22b and 26b of the lattice form light shielding sections 22 and 26 are greater than those of other portions that extend in the X direction and the Y direction. The shape of the intersecting sections 22b and 26b in plan view is square, and corner sections thereof are in a state of protruding on an opening section Ps side.

The opening sections Ps, which are stipulated by the light shielding sections 22 and 26 are opening regions that are stipulated as a result of the opening sections 22a of the first light shielding layer 22 and the opening sections 26a of the second light shielding layer 26 overlapping with one another, and are substantially square in plan view.

The pixel electrode 28 is a square which is larger than the opening section Ps in plan view, and is disposed so as to overlap with the opening sections Ps. In addition, the pixel electrode 28 is disposed so that an outer edge thereof overlaps with the light shielding sections 22 and 26 in plan view.

As shown in FIG. 6A, the microlenses ML in the opposing substrate 30 are disposed in matrix form in the X direction and the Y direction to correspond to the arrangement of the pixels P. In the abovementioned manner, the microlenses ML are configured burying the concave sections 12 (refer to FIG. 4) of the substrate main body 11 with a lens material, and the concave section 12 is formed in a hemispherical surface form that tapers away toward a bottom section thereof. Therefore, a position of the bottom section of the concave section 12, that is, a core C1 of the microlens ML substantially coincides with a planar core of the pixel P. This kind of concave section 12 may be referred to as a lens surface 12.

In the present embodiment, the microlenses ML, which are circular in plan view, are disposed so that portions thereof overlap in the X direction and the Y direction in a manner in which as much light as possible is captured in the pixels P. Therefore, boundaries of microlenses ML that are adjacent in the X direction and the Y direction have linear hills. Meanwhile, the microlens array substrate 10 includes portions 11c in which the microlenses ML are not present in opposing corner directions that intersect the X direction and the Y direction.

In the present embodiment, the diameter of the microlenses ML is, for example, set so as to be 95% of the length of opposing corner lines of the pixels P.

Additionally, the diameter of the microlenses ML may be set so as to be 100% of the length of opposing corner lines of the pixels P.

As shown in FIG. 6B, the light shielding films 14 are provided so as to overlap with the portions 11c in which the microlenses ML are not present. The shape of the light shielding films 14 is square.

Additionally, in FIG. 6B, concentric circles are used in order to show the shapes of the microlenses ML, but these concentric circles show contour lines of the heights in the Z direction of the microlenses ML.

Light that is incident to regions that are covered by the light shielding films 14, except for the portions in which the microlenses ML are not present, is condensed by the microlenses ML, and guided to the opening sections Ps (the opening sections 22a and the opening sections 26a) of the element substrate 20 through the liquid crystal layer 40 (refer to FIG. 4). In other words, second opening components that stipulate the sizes and positions of opening sections Pm, which incidence light to each pixel in the opposing substrate 30, are the microlenses ML and the light shielding films 14.

Additionally, in the microlenses ML, the shape of the lens surfaces 12 is not limited to hemispherical, and may be an aspherical surface lens in which a linear side surface and a hemispherical surface are combined, a flat bottom lens in which a flat bottom section and a hemispherical surface are combined, or a gradation lens in which a condensing position changes in a stepwise manner.

Figure 8:
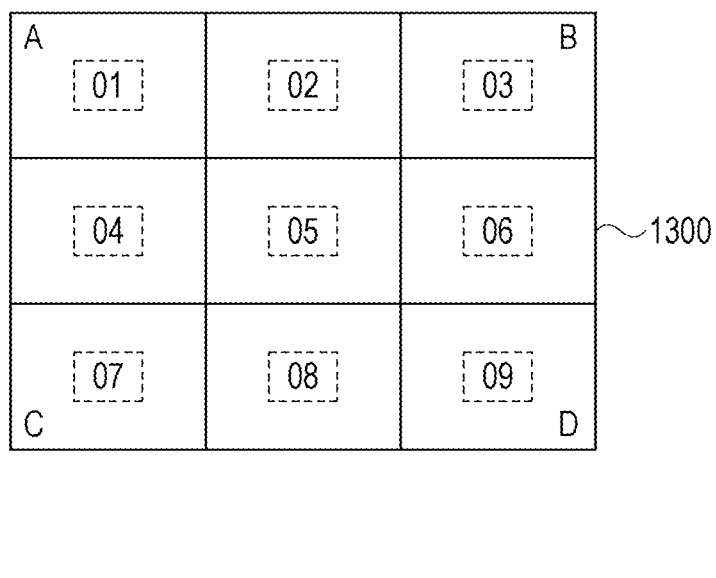
FIG. 8 is a plan view for describing a method that measures brightness of a projection image.
Figure 9A:
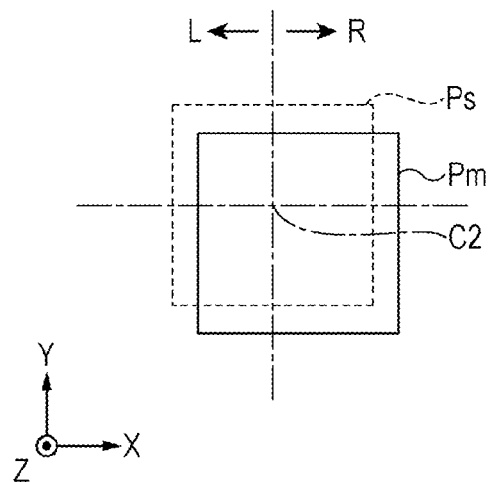
FIG. 9A is a plan view that describes positional shift of an opening sections of an element substrate side and an opening sections of an opposing substrate side.
Figure 9B:
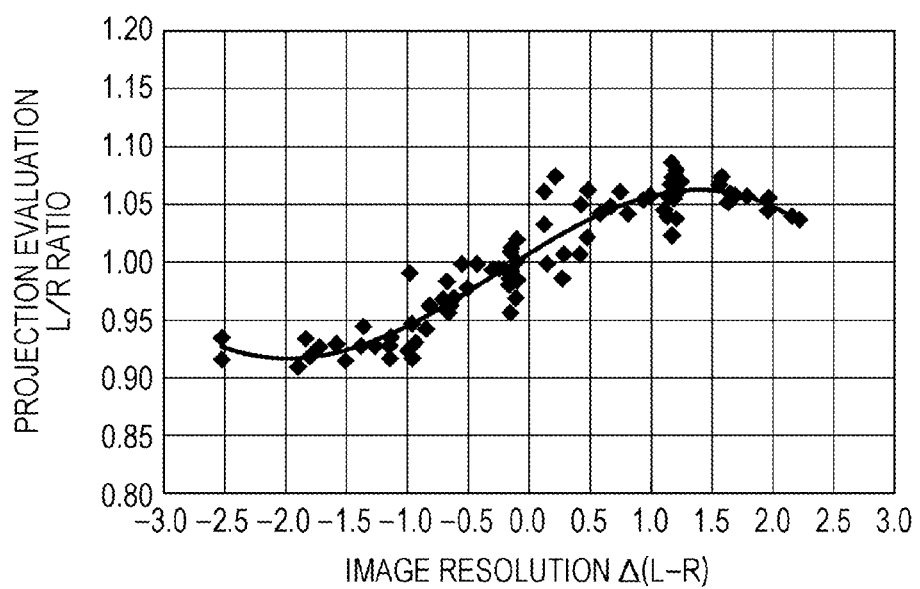
FIG. 9B is a graph that shows a relationship between the positional shift of the opening sections and the opening sections and the brightness of a projection image.

Next, display unevenness that is caused by relative positional shift of the pair of substrates (the element substrate 20 and the opposing substrate 30) in the liquid crystal device 100 that is used as the liquid crystal light bulb, will be described with reference to FIGS. 7 to 9B. FIG. 7 is a schematic diagram for describing display unevenness in the projection type display device, FIG. 8 is a plan view for describing a method that measures the brightness of a projection image, FIG. 9A is a plan view that describes positional shift of an opening section Ps of an element substrate side and an opening section Pm of an opposing substrate side, and FIG. 9B is a graph that shows a relationship between the positional shift of the opening section Ps and the opening section Pm and the brightness of a projection image.

Additionally, FIG. 7 is a schematic diagram in which a projection optical system, which includes the liquid crystal light bulb 1220 that causes green (G) colored light to be incident in the projection type display device 1000 that is shown in FIG. 1, is viewed from the Y direction. In FIG. 7, solid line or broken line arrows show incidence light to the liquid crystal device 100 or emission light (display light) from the liquid crystal device 100, the width of the arrow shows an intensity of the light, and the wider the width of the arrow is, the higher the intensity. In addition, the solid line arrows show that the intensity is higher than that of the broken line arrows.

As shown in FIG. 7, in the liquid crystal device 100, which functions as a liquid crystal light bulb, positions of the opening sections Ps of the pixels P in the element substrate 20 are set as a reference, and for example, positions of the opening sections Pm of the pixels P in the opposing substrate 30 are in a state of being slightly shifted to a (−) side in the X direction. At this time, the system optical axis L in the projection optical system is set so as to pass through the core of the pixel region E of the element substrate 20. The "state of being slightly shifted" in this case is a state in which the element substrate 20 and the opposing substrate 30 are pasted together with an allowable limit of positional shift. A value of the allowable limit is, for example, a value of approximately 8% to 13% of a pixel pitch.

As shown in FIG. 1, light that is emitted from the polarized light illumination device 1100 is converted into green (G) colored light (polarized light), condensed by the relay lens 1204, and incident from the opposing substrate 30 side of the liquid crystal device 100. Therefore, in comparison with a case in which completely parallel light is incident to the opposing substrate 30, the intensity of the colored light that is incident to an outer peripheral side of the pixel region E is stronger than that of the colored light that is incident to a central section of the pixel region E as shown by the solid line arrow. In the abovementioned manner, since the opposing substrate 30 is slightly shifted to the (−) side in the X direction with respect to the element substrate 20, colored light that passes through the opening sections Pm of the opposing substrate 30, which are positioned at an end of the (−) side in the X direction in FIG. 7, and runs toward the projection lens 1207 is transmitted through the opening sections Ps of the element substrate 20 more easily as the colored light is incident from the (−) side in the X direction, and therefore, an amount of colored light that is transmitted through the pixels P is greater. Meanwhile, colored light that passes through the opening sections Pm of the opposing substrate 30, which are positioned at an end of a (+) side in the X direction in FIG. 7, and runs toward the projection lens 1207 is transmitted through the opening sections Ps of the element substrate 20 with more difficulty as the colored light is incident from the (+) side in the X direction, and therefore, an amount of colored light that is transmitted through the pixels P is less. Therefore, images that are projected onto the screen 1300 through the projection lens 1207 have a tendency to be brighter toward the (+) side in the X direction and darker toward the (−) side in the X direction.

As display unevenness of a single color image (a green image) on this kind of screen 1300, brightness unevenness, for example, as shown in FIG. 8, can be quantified by respectively dividing a region of the single color image that is projected onto the screen 1300 in three in the X direction and the Y direction, and measuring the brightness of the single color image in a total of nine regions (ANSI 9 points) of No. 01 to No. 09. In addition, brightness unevenness in this kind of single color image is recognized as color unevenness. If, in the abovementioned manner, the opening sections Pm of the opposing substrate 30 are set in a state of being slightly shifted to the (−) side in the X direction with positions of the opening sections Ps of the element substrate 20 as a reference, on the screen 1300 that is shown in FIG. 8, each region of No. 01, No. 04, and No. 07, which is positioned on a left side with respect to each region of No. 02, No. 05, and No. 08 on a central side in the X direction, is recognized as dark. In addition, each region of No. 03, No. 06, and No. 09, which is positioned on a right side with respect to each region of No. 02, No. 05, and No. 08 on the central side, is recognized as bright. Meanwhile, in the up-down direction (the Y direction), for example, the brightness of the regions of No. 01 and No. 07 is recognized as substantially equivalent to that of the region of No. 04. The brightness between regions in the up-down direction (the Y direction) of other columns is also recognized as substantially equivalent. In other words, there is a circumstance in which it is easy to recognize brightness unevenness in a left-right direction (X direction), but it is difficult to recognize brightness unevenness in the up-down direction (the Y direction).

Additionally, FIG. 8 shows a green image as an example of a projected single color image, but other blue images and red images are also images in which light and dark stand out in the X direction (the left-right direction), and it is difficult to recognize brightness unevenness in the Y direction (the up-down direction). In addition, depending on the color of a projected single color image, the occurrence of light and dark in the X direction (the left-right direction) in an optical arrangement relationship (in an arrangement relationship of cross dichroic prisms and liquid crystal light bulbs) may be reversed. For example, in the abovementioned projection type display device 1000, the left side is bright and the right side is dark in projected blue and red single color images, and the left side is dark and the right side is bright in green single color images.

In practice, the positional shift (hereinafter, referred to as assembly shift) that occurs when pasting the element substrate 20 and the opposing substrate 30 together is not limited to the simply shifting in the X direction that is mentioned above. In assembly shift of the opening sections Ps of the element substrate 20 side (simply shown by a broken line), and the opening sections Pm of the opposing substrate 30 side (simply shown by a solid line), for example, as shown in FIG. 9A, a state of being slightly shifted in the X direction and the Y direction is conceivable. In such an instance, a plurality of samples of the liquid crystal device 100 were prepared to analyze assembly shift and left-right brightness unevenness.

A difference in area Δ (L-R) between the left and the right of a region in which the opening sections Ps and the opening sections Pm do not overlap (or a region in which the opening sections Ps and the opening sections Pm do overlap), was determined using image analysis with a central line that passes through cores C2 of the opening sections Ps of the element substrate 20 side set as a boundary. In addition, a ratio (L/R) of the brightness of a left side (an average value) and the brightness of a right side (an average value) was determined by respectively performing illumination measurement of the brightness of the regions of No. 01, No. 04, and No. 07, which are regions of a left side on the screen 1300 of FIG. 8, and the brightness of the regions of No. 03, No. 06, and No. 09, which are regions of a right side on the screen 1300. When the left-right difference in area Δ (L-R) was set as a horizontal axis, and the left-right brightness ratio (L/R) was set as a vertical axis, a fitted curve that draws a gentle S-shaped curve such as that shown in FIG. 9B was obtained. More specifically, when the difference Δ (L-R) was "0.0", that is, when the opening sections Ps and the opening sections Pm are not shifted, the left-right brightness ratio (L/R) is "1.0". If the difference Δ (L-R) is shifted to a (+) side, the left-right brightness ratio (L/R) becomes greater than "1.0", and the left side becomes brighter than the right side. If the difference Δ (L-R) is shifted to a (−) side, the left-right brightness ratio (L/R) becomes smaller than "1.0", and the right side becomes brighter than the left side. In other words, left-right brightness unevenness (color unevenness) changes according to a direction of assembly shift and an amount of assembly shift.

In the related art, in a case in which left-right brightness unevenness due to this kind of assembly shift is recognized, a method that resolves the brightness unevenness by adjusting a driving voltage for pixels P in the liquid crystal device 100 on a side that is displayed brightly on the screen 1300, is adopted. For example, in a case in which the optical design of the liquid crystal device 100 is normally black, the brightness unevenness is resolved by lowering the driving voltage of pixels P on a side that is displayed brightly, and therefore, reducing the transmittance thereof while ON. In other words, there is a technical problem in that a step (a process) for resolving this kind of brightness unevenness is necessary in order to realize uniform display quality. In addition, there is a technical problem in that adjusting the driving voltage means that it is not possible to sufficiently exhibit the optical characteristics that the liquid crystal device 100 is originally provided with. Furthermore, since it is difficult to dramatically reduce assembly shift, there is a technical problem in that brightness unevenness that is caused by assembly shift occurs more easily in proportion with decreases in pixel pitch.

Since left-right brightness unevenness (color unevenness) that is caused by assembly shift can be considered as receiving the effect of design conditions (an F value or the like) of an illumination optical system that illuminates liquid crystal light bulbs using a light source, the present inventors achieved improvements in the abovementioned technical problems by developing a correction method of the positions of opening components that correspond to incidence angle dependent intensity distribution of incidence light that is incident to the pixel region E. Hereinafter, an example of the correction method of the positions of the second opening components that are positioned on an incidence side of light in the plurality of pixels P of the present embodiment is described.

Correction Method of Positions of Opening Components

Figure 10A:
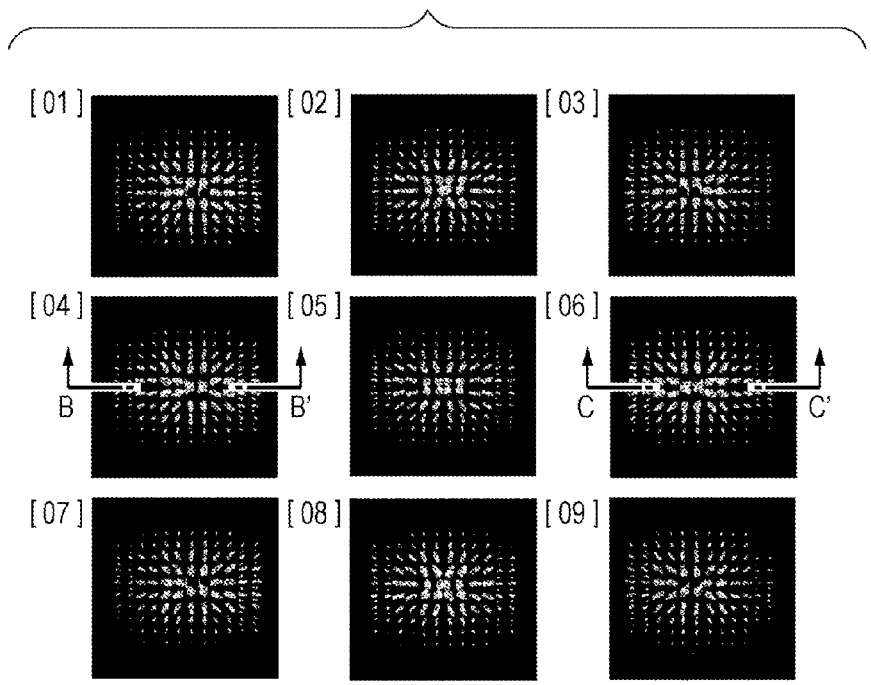
FIG. 10A is a diagram that shows results of determining an incidence angle dependent intensity distribution of incidence light that is incident to a pixel region using an optical simulation.
Figure 10B:
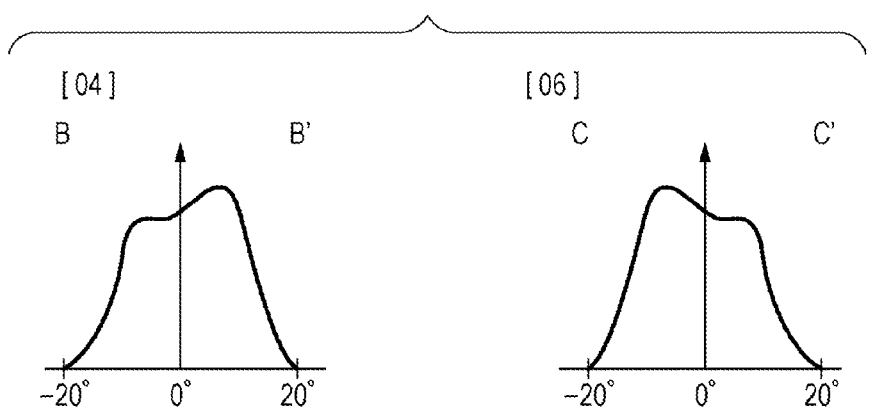
FIG. 10B is a graph that shows an incidence angle dependent intensity in a directions of pixel regions that correspond to a region of No. 04 and a region of No. 6 on a screen.
Figure 11B:
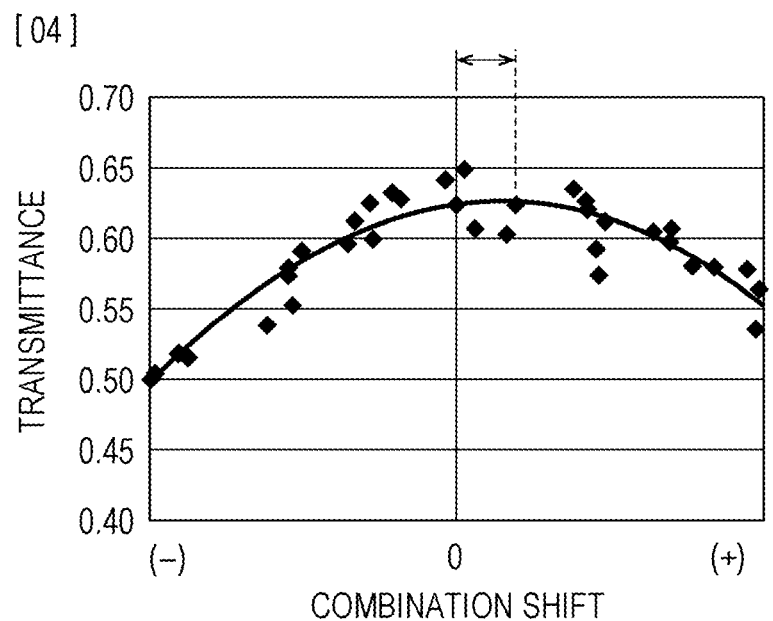
FIG. 11B is a graph that shows a relationship between assembly shift and brightness (transmittance) in the region of No. 04 on the screen in FIG. 11A.
Figure 11C:
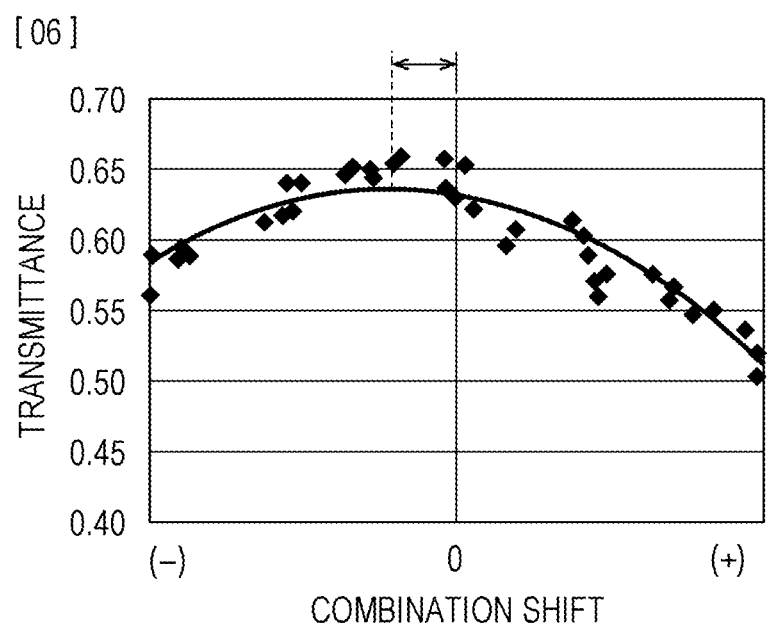
FIG. 11C is a graph that shows a relationship between assembly shift and brightness (transmittance) in the region of No. 06 on the screen in FIG. 11A.
Figure 12A:
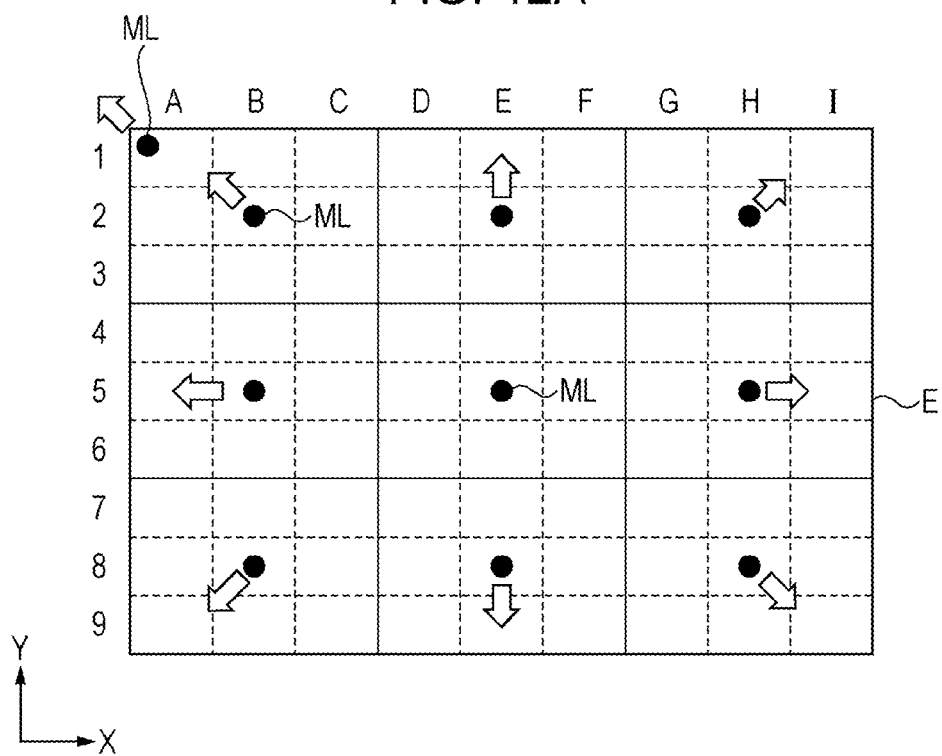
FIG. 12A is a drawing that shows a method of correction of the positions of opening components of pixels in a pixel region.
Figure 12B:
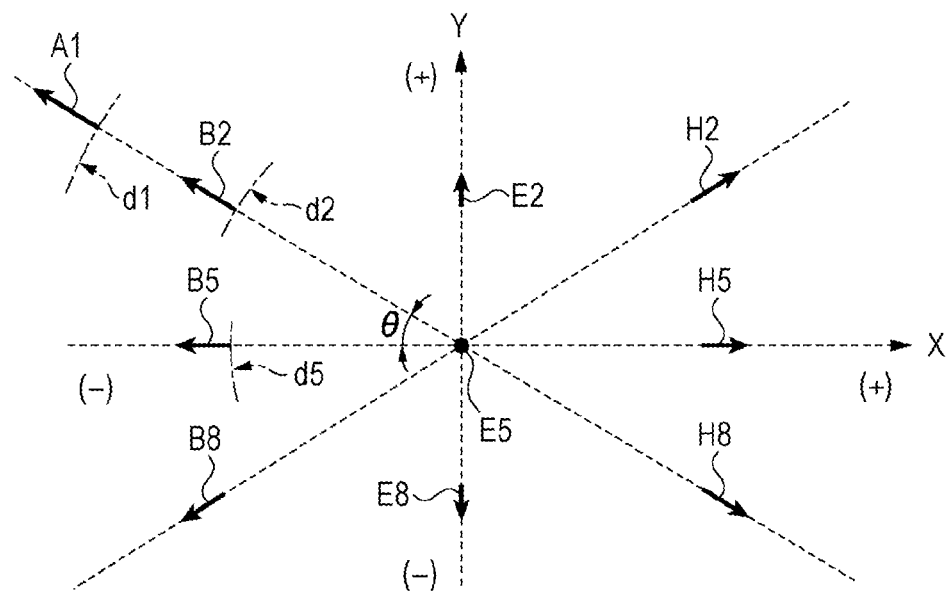
FIG. 12B is a drawing that shows a method of correction of the positions of opening components of pixels in a pixel region.

A correction method of the positions of opening components of the present embodiment will be described with reference to FIGS. 10A to 12B. FIG. 10A is a drawing that shows results of determining an incidence angle dependent intensity distribution of incidence light that is incident to a pixel region using an optical simulation, and FIG. 10B is a graph that shows an incidence angle dependent intensity in directions of pixel regions that correspond to a region of No. 04 and a region of No. 06 on a screen. FIG. 11A is a graph that shows a relationship between assembly shift and brightness (transmittance) in each region on a screen, FIG. 11B is a graph that shows a relationship between assembly shift and brightness (transmittance) in the region of No. 04 on the screen in FIG. 11A, and FIG. 11C is a graph that shows a relationship between assembly shift and brightness (transmittance) in the region of No. 06 on the screen in FIG. 11A. FIGS. 12A and 12B are drawings that show a method of correction of the positions of opening components of pixels in a pixel region.

The correction method of the positions of opening components in a plurality of pixels of the present embodiment is provided with Step S1 of determining an incidence angle dependent intensity distribution of incidence light in predetermined pixels that are in positions that are most separated from the core of the pixel region E in a direction that passes through the core of the pixel region E, in which the plurality of pixels P are arranged, Step S2 of determining shift directions and correction values of the positions of the second opening components (the opening sections Pm) of predetermined pixels for which the brightness of the predetermined pixels is at a maximum from the results of Step S1 with the positions of the first opening components (the opening sections Ps) of predetermined pixels set as a reference, and Step S3 of determining shift directions and correction values of the positions of the second opening components (the opening sections Pm) depending on coordinates in the pixel region E for each of the plurality of pixels P on the basis of the shift directions and correction values of the positions of the second opening components (the opening sections Pm) of the predetermined pixels.

In addition, in Step S3, the pixel region E is divided into a plurality of correction regions (divided into 9×9=81 in the present embodiment, refer to FIG. 12A) in terms of design, correction values, in which correction amounts of positions of second opening components (the opening sections Pm) of predetermined pixels, which are in positions that are most separated from the core of the pixel region E in one of the abovementioned directions, are distributed for each of the plurality of correction regions according to positions in the pixel region E are obtained, and the correction values are applied to the pixels P that are included in the correction regions. Hereinafter, each step will be described more specifically.

Firstly, a method for determining incidence angle dependent intensity distribution of the incidence light that is incident to the pixel region E will be described with reference to FIGS. 10A and 10B. For example, a method that uses ODIS, which is an illumination optical system evaluation and design software that is provided by Yoshida Research Institute for Optics, can be given as an example of a method for determining incidence angle dependent intensity distribution of the incidence light that is incident to the pixel region E.

FIG. 10A is a drawing in which incidence angle dependent intensity of the incidence light that is incident to the pixel region E was determined using ODIS for each region (of No. 01 to No. 09) that corresponds to the ANSI 9 point that is shown in FIG. 8. To explain in further detail, the drawing shows incidence angle dependent intensity of the incidence light on the system optical axis L in FIG. 7 when viewed from the element substrate 20 side. As a result of this, for example, as shown in FIG. 10B, if the incidence angle of light along the system optical axis L is set to 0° in pixels P of the region of No. 04 and the region of No. 06, light in a range of ±20° in the X direction, which is one direction, is input. In the pixels P of the region of No. 04, a peak in intensity was visible when the incidence angle was shifted to the (+) side from 0°. Meanwhile, in the pixels P of the region of No. 06, a peak in intensity was visible when the incidence angle was shifted to the (−) side from 0°. In other words, it was understood that the intensity of incidence light that is incident toward the system optical axis L that passes through the core of the pixel region E was respectively becoming higher in the pixels P of the region of No. 04 of the left side and the pixels P of the region of No. 06 of the right side.

FIG. 11A is a graph in which the relationship between assembly shift and transmittance (brightness) was determined in pixels P that correspond to the ANSI 9 point that is shown in FIG. 8, and pixels P that correspond to the four corner section (A to D) of the pixel region E. As shown in FIG. 11B, in the pixels P of the region of No. 04 of the left side, for example, the transmittance changes depending on assembly shift in the X direction, which is one direction, and a peak in transmittance occurred when assembly shift was shifted to the (+) side from 0. In addition, the transmittance deteriorated if assembly shift was shifted to the (+) side or the (−) side from 0. Meanwhile, as shown in FIG. 11C, in the pixels P of the region of No. 06 of the right side, for example, the transmittance changes depending on assembly shift in the X direction, which is one direction, and a peak in transmittance occurred when assembly shift was shifted to the (−) side from 0. In addition, the transmittance deteriorated if assembly shift was shifted to the (+) side or the (−) side from 0. In other words, in the pixels P of the region of No. 04 of the left side and the pixels P of the region of No. 06 of the right side, since a position of a peak in transmittance and a position in which assembly shift is 0 deviate from one another, the condition of deteriorations in transmittance differs depending on the direction of assembly shift.

Meanwhile, as shown in FIG. 11A, in the pixels P of each region of No. 02, No. 05, and No. 08 of the central side in the X direction during projection, a position of a peak in transmittance substantially coincided with a position at which assembly shift was 0. In other words, the transmittance deteriorated by substantially the same amount if regardless of whether a direction of assembly shift was the (+) side or the (−) side. In the pixels P of each region of No. 01, No. 04, No. 07, corner section A and the corner section C of the (−) side, that is, the left side in the X direction during projection, a peak in transmittance was on the (+) side from where assembly shift was 0, and transmittance deteriorated in accordance with movement to the (−) side. In the pixels P of each region of No. 03, No. 06, No. 09, corner section B and the corner section D of the (+) side, that is, the right side in the X direction during projection, a peak in transmittance was on the (−) side from where assembly shift was 0, and transmittance deteriorated in accordance with movement to the (+) side. In addition, it was understood that the peak in transmittance were more separated from the positions at which assembly shift was 0 with movement to the corner sections A, B, C and D that are most separated from a central section of No. 05. Therefore, in a case in which the positions of the opening sections Pm of the opposing substrate 30 are not corrected to correspond to with respect to the positions of the opening sections Ps of the element substrate 20, there is a concern that left-right brightness unevenness will be significant if simple assembly shift occurs.

In such an instance, in Step S1, as predetermined pixels P, which are in positions that are most separated from the core of the pixel region E, for example, the incidence angle dependent intensity distribution of incidence light is determined in the pixels P of the corner section A using ODIS. Further, the method proceeds to Step S2.

In Step S2, the shift directions and correction values of the positions of the second opening components (the opening sections Pm) for which the brightness (transmittance) of the pixels P of the corner section A is at a maximum are determined from the results of Step S1 with the positions of the first opening components (the opening sections Ps) of the corner section A set as a reference. In other words, in the graph of assembly shift and transmittance in the pixels P of the corner section A that is shown in FIG. 11A, a value of assembly shift that shows the peak in transmittance that corresponds to the value of assembly shift being 0 is the correction value of the positions of the second opening components (the opening sections Pm). In addition, the shift direction of the second opening components (the opening sections Pm) in the pixels P of the corner section A is a direction of the peak in transmittance when the assembly shift is 0, or a direction that approaches the peak, and in this case, is the (−) side in the X direction, that is, a direction that runs toward an edge section of the pixel region E with respect to the core of the pixel region E. Further, the method proceeds to Step S3.

In Step S3, shift directions and correction values of the positions of the second opening components (the opening sections Pm) of the pixels P are determined depending on the coordinates of each of the plurality of pixels P in the pixel region E on the basis of the abovementioned shift directions and correction values of the positions of the second opening components (the opening sections Pm) of the pixels P of the corner section A that are obtained in Step S2. More specifically, as shown in FIGS. 12A and 12B, for example, the pixel region E is divided into nine (A-I) in the X direction, is divided into nine (1 to 9) in the same manner in the Y direction, and a plurality of correction regions that correct the positions of the second opening components (the opening sections Pm) and in which the pixels P are included, are defined. The corner section A is positioned inside a correction region of the pixel region E that is given the coordinates (A, 1). The core of the pixel region E is positioned in a correction region that is given the coordinates (E, 5). The direction shift directions and correction values of the positions of the second opening components (the opening sections Pm) in the pixels P of the corner section A can be represented by a vector A1 that is given to correction amounts in the X direction and correction amounts in the Y direction depending on a distance d1 from the core of the pixel region E to the corresponding pixels P. The shift directions and correction values of the positions of the second opening components (the opening sections Pm) in the pixels P of the correction region that is given the coordinates (B, 2) can be represented by a vector B2 that is given to correction values in the X direction and correction values in the Y direction, in which the vector A1 has been distributed depending on a distance d2 from the core of the pixel region E to the corresponding pixels P.

In the same manner, for example, the shift directions and correction values of the positions of the second opening components (the opening sections Pm) in the pixels P of the correction region that is given the coordinates (B, 5) can be represented by a vector B5 in which the vector A1 has been distributed depending on a distance d5 from the core of the pixel region E to the corresponding pixels P and an angle θ. For example, the shift directions and correction values of the positions of the second opening components (the opening sections Pm) in the pixels P of the correction regions that are given the coordinates (B, 8), the coordinates (E, 2), the coordinates (E, 8), the coordinates (H, 2), the coordinates (H, 5), and the coordinates (H, 8), can also be represented by a vector B8, a vector E2, a vector E5, a vector H2, a vector H5, and a vector H8 which are distributed on the basis of the vector A1. Each vector A1, B2, B5, B8, E2, E5, H2, H5, and H8 is on a radial line that extends from the core of the pixel region E, and runs toward the edge sections of the pixel region E.

In this manner, the pixel region E is divided into 9×9=81 correction regions, and the shift directions and correction values of the positions of the second opening components (the opening sections Pm) are given on the basis of the vectors that correspond to the pixels P that are included in the correction regions.

As a result of this, the positions of second opening components (the opening sections Pm) of the opposing substrate 30 (or in other words, the positions of the cores C1 of the microlenses ML) are corrected so as to gradually become more shifted in a direction that runs from the core of a pixel region E to the edge sections in accordance with separation from a core side of the pixel region E with the positions of first opening components (the opening sections Ps) of the element substrate 20 (or in other words, the positions of the cores C2 of the opening sections Ps) set as a reference.

In the present embodiment, the shifting (correcting) of the positions of the second opening components (the opening sections Pm) with the positions of first opening components (the opening sections Ps) set as a reference is not performed in pixels P that are included in the correction region that is given the coordinates (E, 5), which includes the core of the pixel region E. In other words, the correction values of the positions of the second opening components (the opening sections Pm) of the corresponding pixels P is "0 (zero)". For this reason, as shown in FIG. 11A, in a projection region of No. 05, which includes the core of the pixel region E, the peak in transmittance is formed when the assembly shift is "0". In other words, it is not necessary to correct the positions of the second opening components (the opening sections Pm).

In the present embodiment, the positions of the second opening components (the opening sections Pm) are corrected to correspond to the first opening components (the opening sections Ps) of the pixels P in each correction region by dividing the pixel region E into 9×9=81 correction regions, but the method of division of the correction regions is not limited to this. It is preferable that the division number is larger as an area that corresponds to the practical area of the pixel region E increases.

In addition, the pixel region E is divided into 3×3=9 correction regions to reflect the measurement of the brightness (the luminance) of the ANSI 9 point that is shown in FIG. 8. Further, the positions of the second opening components (the opening sections Pm) of the pixels P that are included in the correction regions of the left side and the right side in the X direction in which it is easy to recognize left-right brightness unevenness, may be corrected, and the correction values in correction regions of the central side are may be set to "0 (zero)".

Manufacturing Method of Electro-Optical Device

Next, a manufacturing method of the liquid crystal device 100 will be described as a manufacturing method of the electro-optical device of the present embodiment. The manufacturing method of the liquid crystal device 100 of the present embodiment is provided with a step of forming the opposing substrate 30, as the other substrate by correcting the positions of the second opening components (the opening sections Pm) with the positions of the first opening components (the opening sections Ps) of the element substrate 20 set as references, as the one substrate, using the correction method of the positions of opening components that is mentioned above, and a step of oppositely disposing and pasting together the element substrate 20 and the opposing substrate 30 through the liquid crystal layer 40 as the electro-optical element. In the process that forms the opposing substrate 30, formation is performed by correcting the positions of the second opening components (the opening sections Pm) of pixels P that are included in a plurality of correction regions in the pixel region E, that is, the positions of the cores C1 of the microlenses ML and the positions of the light shielding films 14, depending on the coordinates of the corresponding correction regions.

According to the abovementioned embodiment, the following effects are obtained.

(1) A relationship between assembly shift and transmittance of the pixels P that are included in the corner section A, which is in a position that is most separated from the core of the pixel region E in a direction that passes through the core of the pixel region E, is determined, and shift directions and correction values of the positions of the second opening components (the opening sections Pm) with respect to the first opening components (the opening sections Ps) in which the transmittance (the brightness) of the corresponding pixels P is at a maximum, are determined. Shift directions and correction values of positions, in which the shift directions and correction amounts of the positions of the second opening components (the opening sections Pm) of the pixels P that are included in the corner section A are distributed depending on coordinates of the plurality of pixels P of the pixel region E, are determined, and the positions of the second opening components (the opening sections Pm) are corrected by applying the abovementioned shift directions and correction values of the positions to the corresponding pixels P. As a result of this, it is possible to set an allowable amount of relative assembly shift of both substrates to be larger when pasting the element substrate 20 and the opposing substrate 30 together through the liquid crystal layer 40 in comparison with a case in which the correction of the positions of the second opening components (the opening sections Pm) is not performed in the opposing substrate 30. In other words, it is possible to provide or manufacture a liquid crystal device 100 that is resistant to assembly shift. In addition, the correction values of the positions of the second opening components (the opening sections Pm) are set for each of the plurality of pixels P so as to become larger with movement in a direction that runs from the core of the pixel region E to the edge sections of the pixel region E. Therefore, even if incidence light, which is incident to the pixel region E, includes an intensity distribution as a result of incidence angles, in a case in which the system optical axis L of the incidence light is set so as to pass through the core of the pixel region E, it is possible to provide or manufacture a liquid crystal device 100 in which it is difficult for brightness unevenness (display unevenness and color unevenness) to occur as an effect of the intensity distribution of the incidence light.

(2) Since the pixel region E is divided into a plurality of correction regions, the shift directions and correction values of the positions are determined for each correction region, and applied to pixels P that are included in the correction regions, the correction is easily performed in comparison with a case that is applied by respectively determining the shift directions and correction values of the positions of the second opening components (the opening sections Pm) for all of the pixels P.

(3) By applying the liquid crystal device 100 in which the positions of the second opening components (the opening sections Pm) are corrected to a liquid crystal light bulb, even if the correction of the driving voltage of the liquid crystal device 100 is not performed in order to resolve left-right brightness unevenness, it is possible to provide a projection type display device 1000 in which a bright display is possible, and that has excellent display properties in which brightness unevenness is reduced.

The invention is not limited to the abovementioned embodiment, may be changed as appropriate within a range that is not contrary to the fundamentals or idea of the invention that can be understood from the claims and the specification as a whole, and electro-optical devices that accompany such changes and correction method of the positions of opening components in the electro-optical devices, and electronic instrument to which the electro-optical devices are applied are also included in the technical range of the invention. Various Modification Examples other than the abovementioned embodiment can also be considered. Modification examples will be described below.

Modification Example 1

Figure 13:
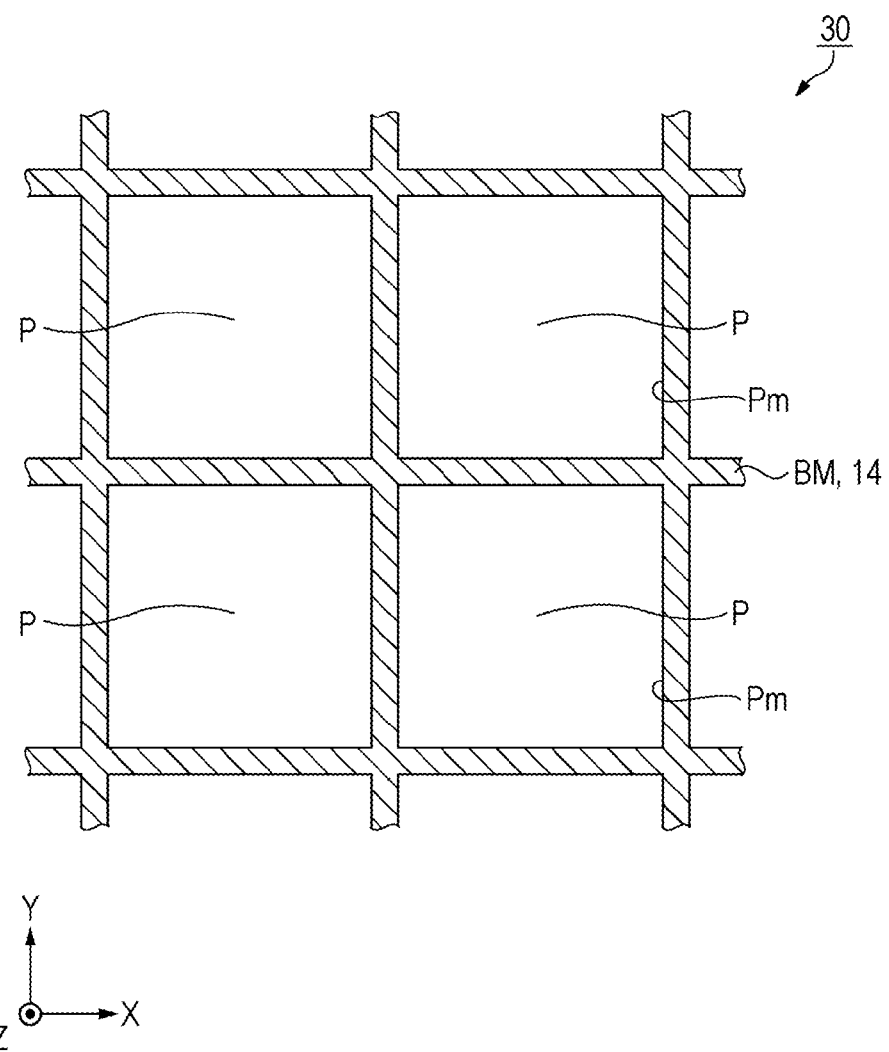
FIG. 13 is a schematic plan view that shows second opening components (the opening sections) of a Modification Example.

The second opening components in the pixels P are not limited to opening sections Pm that are stipulated by the microlenses ML and the light shielding films 14. FIG. 13 is a schematic plan view that shows second opening components (opening sections Pm) of a Modification Example. As shown in FIG. 13, the second opening components (the opening sections Pm) in the opposing substrate 30 need not have the microlenses ML, and may be black matrices (BM) that extend in a lattice from in the X direction and the Y direction. In addition, the second opening components may be prisms that condense incidence light into an opening region of the pixels P, or color filters that convert incidence light into colored light. Furthermore, the second opening components may be configured to combine the microlenses ML, prisms, or color filters with the abovementioned black matrices (BM).

Modification Example 2

In the abovementioned embodiment, an example in which the microlenses ML that configure the opening components were provided on the opposing substrate 30 side was shown, but it is also possible to apply the correction method of the positions of opening components of the present application in a case in which the microlenses ML or prisms that configure the opening components are provided on the element substrate 20 side, and light is incident from the element substrate 20 side. In addition, a configuration in which the microlenses ML and prisms are respectively provided on the element substrate 20 and the opposing substrate 30 is also possible. In either case, the opening components that are positioned on an incidence side of light are set as the second opening components.

Modification Example 3

In the abovementioned embodiment, the opening sections Ps as the first opening components of the element substrate 20 were substantially square, and in the design, it was set so that the cores C2 of the opening sections Ps of the element substrate 20 side and the cores C1 of the opening sections Pm of the opposing substrate 30 side coincided. However, there are cases in which the planar shape of the opening sections Ps is not necessarily point symmetrical or linearly symmetrical. In such a case, the cores of the opening sections Ps are set as planar centers of gravity of the opening sections Ps. Therefore, there are also cases in which the positions of the cores C1 of the opening sections Pm of the opposing substrate 30 side are corrected with the centers of gravity of the opening sections Ps of the element substrate 20 side set as a reference.

Modification Example 4

The electronic instrument to which the liquid crystal device 100 as the electro-optical device of the present embodiment is applied is not limited to the projection type display device 1000. For example, the projection type display device may be set to a single plate configuration by having color filters that correspond to at least red (R), green (G) and blue (B) on the opposing substrate 30 of the liquid crystal device 100. In addition, for example, it is possible to suitably apply the liquid crystal device 100 that is provided with color filters as a display unit of an information terminal device such as a projection type heads-up display (HUD), a head mounted display (HMD), an electronic book, a personal computer, a digital still camera, a liquid crystal television, a viewfinder type or monitor direct-view type video recorder, a car navigation system, an electronic organizer, or a POS.

Embodiment 2

Configuration of Projection Type Display Device

Figure 14:
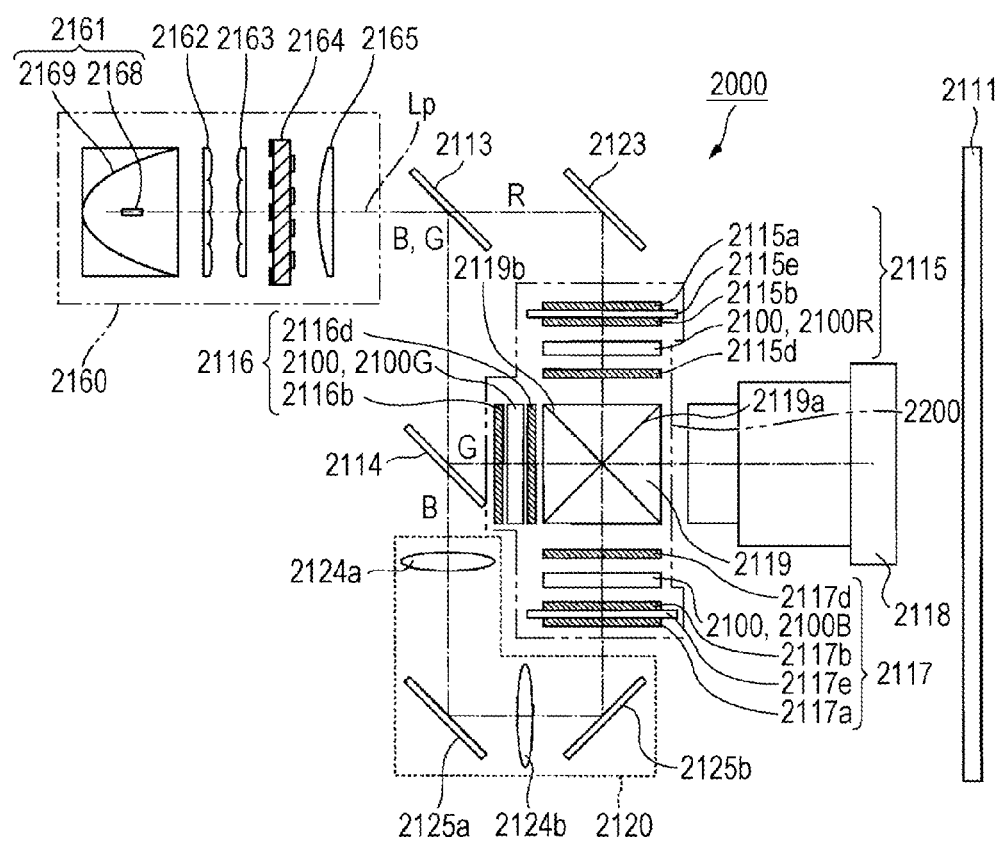
FIG. 14 is a schematic configuration diagram of an aspect of a projection type display device (an electronic instrument) that uses an electro-optical device in which the present invention is applied.

FIG. 14 is a schematic configuration diagram of an aspect of a projection type display device 2000 (an electronic instrument) that uses an electro-optical device 2100 in which the present invention is applied. Additionally, a plurality of electro-optical devices 2100 to which mutually different wavelengths of light are supplied, are used in the following description, but the electro-optical device 2100 in which the invention is applied is used in all of the electro-optical devices 2100.

The projection type display device 2000 that is shown in FIG. 14 is a liquid crystal projector that uses a transmission type electro-optical device 2100, and displays images by irradiating a target projection member that is formed from the screen 2111 or the like, with light. The projection type display device 2000 includes an illumination device 2160, a plurality of electro-optical devices 2100 (liquid crystal light bulbs 2115 to 2117) to which light that is emitted from the illumination device 2160 is provided, a cross dichroic prism 2119 (a color synthesis optical system) that emits by synthesizing light that is emitted from the plurality of electro-optical devices 2100, and the projection optical system 2118, which projects light that is synthesized by the cross dichroic prism 2119, along a device optical axis Lp. In addition, the projection type display device 2000 is provided with dichroic mirrors 2113 and 2114, and a relay system 2120. In the projection type display device 2000, the electro-optical devices 2100 and the cross dichroic prism 2119 configure an optical unit 2200.

In the illumination device 2160, a light source section 2161, a first integrator lens 2162 that is formed from a lens array such as a fly-eye lens, a second integrator lens 2163 that is formed from a lens array such as a fly-eye lens, the polarized light conversion element 2164 and the condenser lens 2165 are arranged in order along the device optical axis Lp. The light source section 2161 is provided with a light source 2168 that emits white light that includes red light R, green light G and blue light B, and a reflector 2169. The light source 2168 is configured by an ultrahigh pressure mercury lamp or the like, and the reflector 2169 has a parabolic cross section. The first integrator lens 2162 and the second integrator lens 2163 homogenize an illumination distribution of light that is emitted from the light source section 2161. The polarized light conversion element 2164 converts light that is emitted from the light source section 2161 into polarized light that has a specific vibration direction such as s polarized light, for example.

The dichroic mirror 2113 transmits red light R that is included in the light that is emitted from the illumination device 2160, and reflects green light G and blue light B. The dichroic mirror 2114 transmits blue light B among the green light G and the blue light B that is reflected by the dichroic mirror 2113, and reflects green light G. In this manner, the dichroic mirrors 2113 and 2114 configure a color separation optical system that separates light that is emitted from the illumination device 2160 into red light R, green light G, and blue light B.

The liquid crystal light bulb 2115 is a transmission type liquid crystal device that modulates the red light R that is transmitted through the dichroic mirror 2113 and reflected by a reflective mirror 2123 depending on an image signal. The liquid crystal light bulb 2115 is provided with a λ/2 phase difference plate 2115a, a first polarized light plate 2115b, the electro-optical device 2100 (a red electro-optical device 2100R), and a second polarized light plate 2115d. In this instance, since polarized light of light does not change even if transmitted through the dichroic mirror 2113, the red light R that is incident to the liquid crystal light bulb 2115 is still s polarized light.

The λ/2 phase difference plate 2115a is an optical element that converts the s polarized light that is incident to the liquid crystal light bulb 2115 into p polarized light. The first polarized light plate 2115b is a polarized light plate that blocks the s polarized light and transmits the p polarized light. The electro-optical device 2100 (the red electro-optical device 2100R) has a configuration that converts the p polarized light into s polarized light (circular polarization light or elliptical polarized light if halftone) depending on modulation that corresponds to an image signal. The second polarized light plate 2115d is a polarized light plate that blocks the p polarized light and transmits the s polarized light. Therefore, the liquid crystal light bulb 2115 modulates red light R depending on an image signal, and emits modulated red light R toward the cross dichroic prism 2119. The λ/2 phase difference plate 2115a and the first polarized light plate 2115b are disposed in states of coming into contact with a translucent glass substrate 2115e, which does not convert polarized light, and therefore, it is possible to avoid distortion due to the λ/2 phase difference plate 2115a and the first polarized light plate 2115b emitting heat.

The liquid crystal light bulb 2116 is a transmission type liquid crystal device that modulates the green light G that is reflected by the dichroic mirror 2114 after being reflected by the dichroic mirror 2113 depending on an image signal. In a similar manner to the liquid crystal light bulb 2115, the liquid crystal light bulb 2116 is provided with a first polarized light plate 2116b, the electro-optical device 2100 (a green electro-optical device 2100G), and a second polarized light plate 2116d. The green light G that is incident to the liquid crystal light bulb 2116 is the incident s polarized light that is reflected by the dichroic mirrors 2113 and 2114. The first polarized light plate 2116b is a polarized light plate that blocks the p polarized light and transmits the s polarized light. The electro-optical device 2100 (the green electro-optical device 2100G) has a configuration that converts the s polarized light into p polarized light (circular polarization light or elliptical polarized light if halftone) depending on modulation that corresponds to an image signal. The second polarized light plate 2116d is a polarized light plate that blocks the s polarized light and transmits the p polarized light. Therefore, the liquid crystal light bulb 2116 modulates green light G depending on an image signal, and emits modulated green light G toward the cross dichroic prism 2119.

The liquid crystal light bulb 2117 is a transmission type liquid crystal device that modulates the blue light B that has passed the relay system 2120 depending on the image signal after being reflected by the dichroic mirror 2113 and transmitted through the dichroic mirror 2114. In a similar manner to the liquid crystal light bulbs 2115 and 2116, the liquid crystal light bulb 2117 is provided with a λ/2 phase difference plate 2117a, a first polarized light plate 2117b, the electro-optical device 2100 (a blue electro-optical device 2100B), and a second polarized light plate 2117d. Since the blue light B that is incident to the liquid crystal light bulb 2117 is reflected by two reflective mirrors 2125a and 2125b of the relay system 2120 after being reflected by the dichroic mirror 2113 and transmitted through the dichroic mirror 2114, the blue light B is s polarized light.

The λ/2 phase difference plate 2117a is an optical element that converts the s polarized light that is incident to the liquid crystal light bulb 2117 into p polarized light. The first polarized light plate 2117b is a polarized light plate that blocks the s polarized light and transmits the p polarized light. The electro-optical device 2100 (the blue electro-optical device 2100B) has a configuration that converts the p polarized light into s polarized light (circular polarization light or elliptical polarized light if halftone) depending on modulation that corresponds to an image signal. The second polarized light plate 2117d is a polarized light plate that blocks the p polarized light and transmits the s polarized light. Therefore, the liquid crystal light bulb 2117 modulates blue light B depending on an image signal, and emits modulated blue light B toward the cross dichroic prism 2119. Additionally, the λ/2 phase difference plate 2117a and the first polarized light plate 2117b are disposed in states of coming into contact with a glass substrate 2117e.

The relay system 2120 is provided with relay lenses 2124a and 2124b, and the reflective mirrors 2125a and 2125b. The relay lenses 2124a and 2124b are provided in order to prevent optical loss that is caused by an optical path of the blue light B being long. The relay lens 2124a is disposed between the dichroic mirror 2114 and the reflective mirror 2125a. The relay lens 2124b is disposed between the reflective mirrors 2125a and 2125b. The reflective mirror 2125a reflects blue light B that is transmitted through the dichroic mirror 2114 and emitted from the relay lens 2124a, toward the relay lens 2124b. The reflective mirror 2125b reflects blue light B that is emitted from the relay lens 2124b, toward the liquid crystal light bulb 2117.

The cross dichroic prism 2119 is a color synthesis optical system in which two dichroic films 2119a and 2119b are orthogonally arranged in an X shape. The dichroic film 2119a is a film that reflects blue light B and transmits green light G, and the dichroic film 2119b is a film the reflects red light R and transmits green light G. Therefore, the cross dichroic prism 2119 synthesizes the red light R, the green light G and the blue light B that was respectively modulated in the liquid crystal light bulbs 2115 to 2117, and emits to the projection optical system 2118.

Additionally, light that is incident to the cross dichroic prism 2119 from the liquid crystal light bulbs 2115 and 2117 is s polarized light, and light that is incident to the cross dichroic prism 2119 from the liquid crystal light bulb 2116 is p polarized light. In this manner, by configuring so that light that is incident to the cross dichroic prism 2119 is different kinds of polarized light, it is possible to synthesize light that is incident from each of the liquid crystal light bulbs 2115 to 2117 in the cross dichroic prism 2119. In this instance, normally, the dichroic films 2119a and 2119b have excellent reflective characteristics of s polarized light. Therefore, the red light R and the blue light B that is reflected by the dichroic films 2119a and 2119b is set as s polarized light, and the green light G that is transmitted through the dichroic films 2119a and 2119b is set as p polarized light. The projection optical system 2118 includes a projection lens (not illustrated), and light that is synthesized by the cross dichroic prism 2119 is projected onto a target projection member such as the screen 2111.

Incidence Angle Characteristics of Illumination Light to Electro-Optical Devices 2100

Figure 15A:
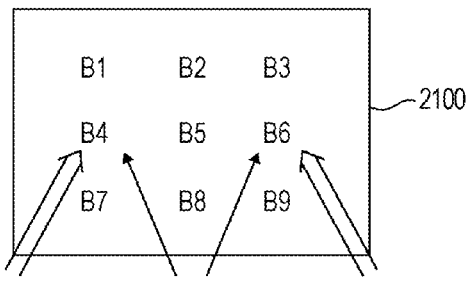
FIG. 15A is an explanatory diagram that shows an example of incidence angle characteristics of illumination light to the electro-optical devices in the projection type display device that is shown in FIG. 14.
Figure 15B:
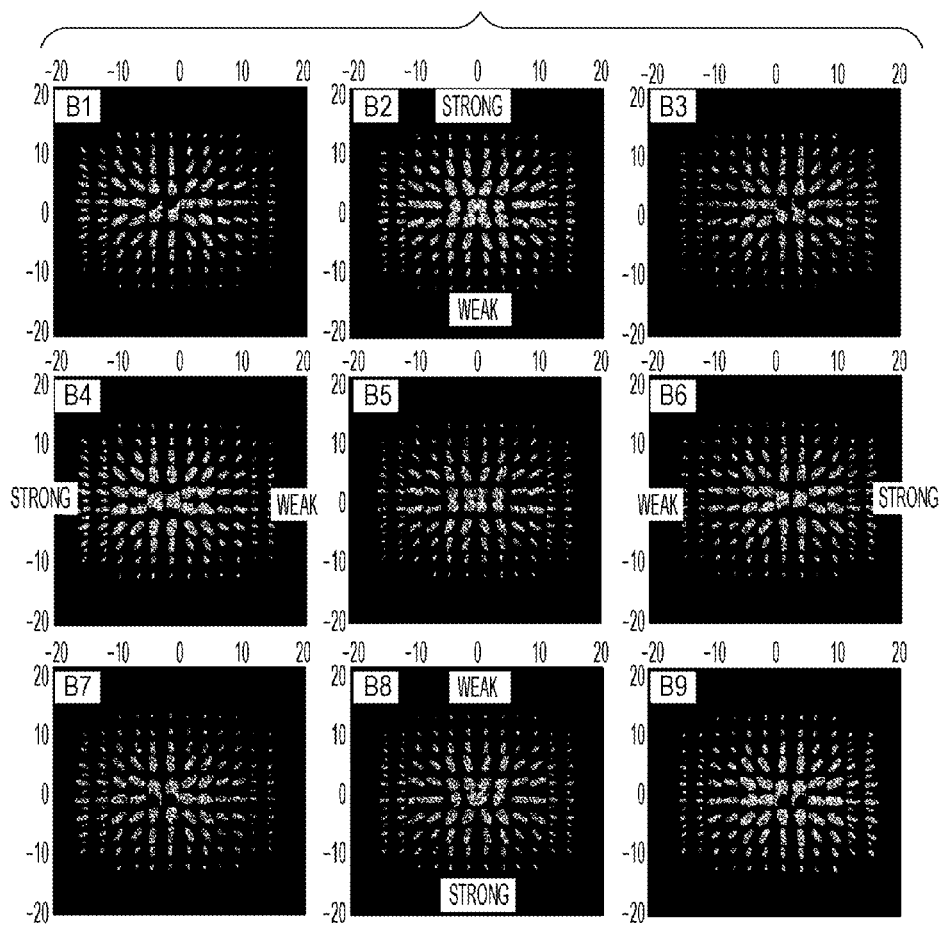
FIG. 15B is an explanatory diagram that shows an example of incidence angle characteristics of illumination light to the electro-optical devices in the projection type display device that is shown in FIG. 14.

FIGS. 15A and 15B are explanatory diagrams that show an example of incidence angle characteristics of illumination light to the electro-optical devices 2100 in the projection type display device 2000 that is shown in FIG. 14. Additionally, in FIG. 15B, in each incidence direction, a direction in which optical intensity is high is shown with a larger white region.

Figure 27A:
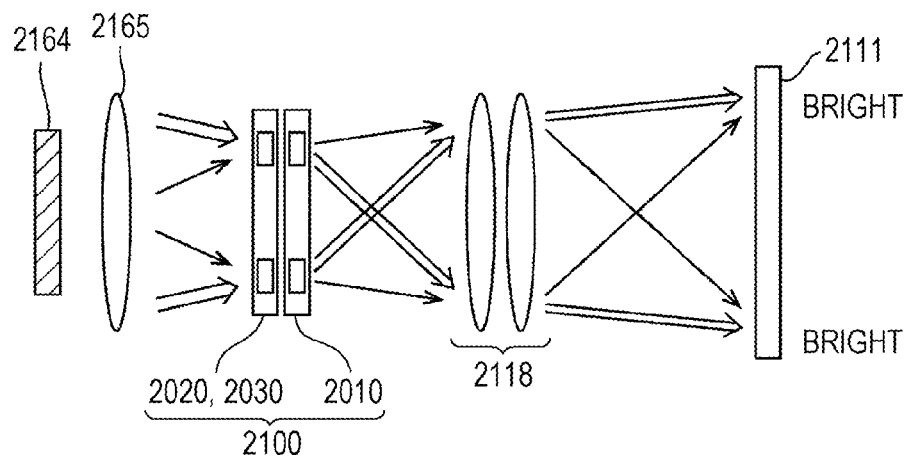
FIG. 27A is an explanatory diagram that shows an effect of positional shift between a lens array substrate and an element substrate.

In the projection type display device 2000 that is shown in FIG. 14, in the manner described with reference to FIG. 27A, among the light that the electro-optical devices 2100 are irradiated with, the intensity of light that is incident to the electro-optical devices 2100 in an oblique manner from the outer side is higher than that of light that is incident in an oblique manner from the inner side of the electro-optical devices 2100. For example, as shown in FIGS. 15A and 15B, there is a deviation in the incidence angle distribution of the incidence light to each position B1 to B9 of the electro-optical devices 2100, and the intensity of light that is incident to the electro-optical devices 2100 in an oblique manner from the outer side is higher than that of light that is incident to the electro-optical devices 2100 in an oblique manner from the inner side. Therefore, at a position B5 in the center of the electro-optical device 2100, illumination light is incident with an intensity that has lateral symmetry and vertical symmetry toward the drawing, but at positions B1 to B4 and B6 to B9 that are close to end sections, the intensity of light that is incident from the outer side is higher than the intensity of light that is incident from the inner side in a left-right and up-down manner toward the drawing.

Figure 27B:
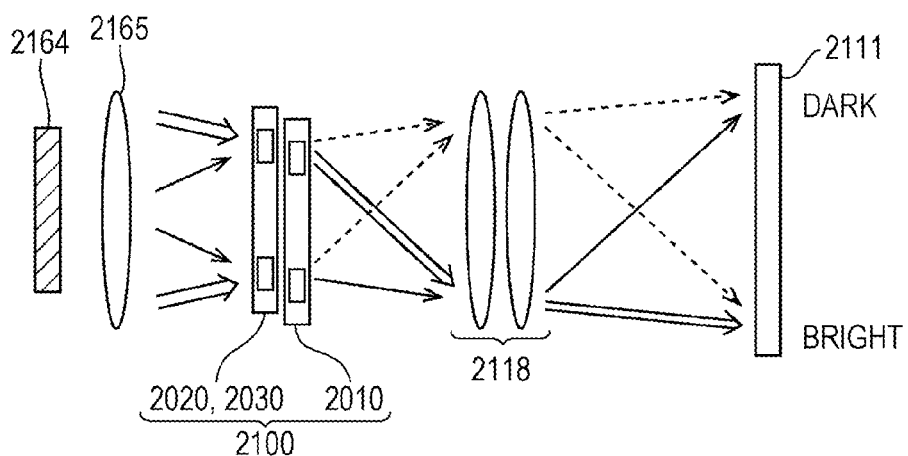
FIG. 27B is an explanatory diagram that shows an effect of positional shift between a lens array substrate and an element substrate.

In such an instance, the electro-optical devices 2100 are configured in the manner described below with the aim of suppressing the luminance unevenness of images that is caused by positional shift between a lens array substrate and an element substrate that was described with reference to FIG. 27B.

Overall Configuration of Electro-Optical Devices 2100

Figure 16A:
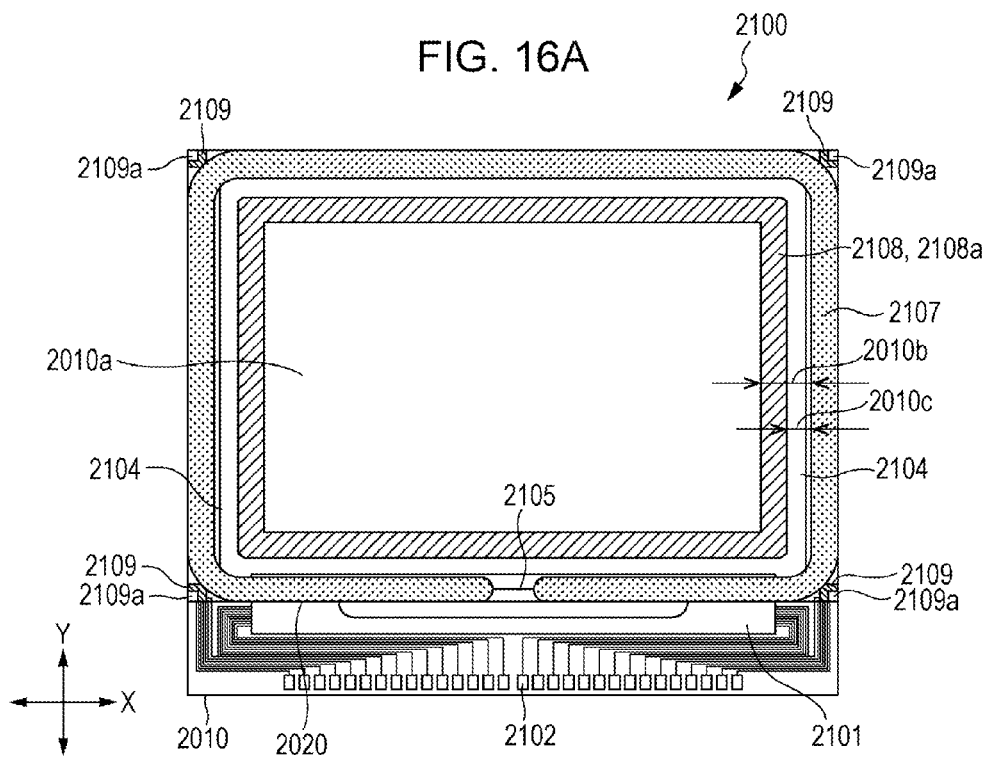
FIG. 16A is an explanatory diagram of an aspect of an electro-optical device according to Embodiment 2 of the invention.
Figure 16B:
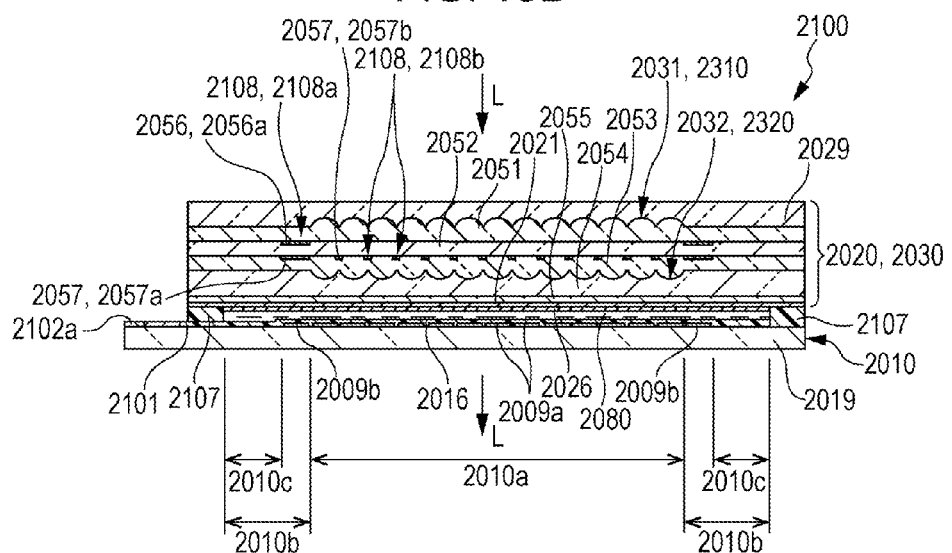
FIG. 16B is an explanatory diagram of an aspect of an electro-optical device according to Embodiment 2 of the invention.

FIGS. 16A and 16B are explanatory diagrams of an aspect of an electro-optical device 2100 according to Embodiment 2 of the invention, and FIGS. 16A and 16B are respectively a plan view in which the electro-optical device 2100 is viewed together with each constituent element thereof from a side of the opposing substrate, and a cross-sectional view thereof.

As shown in FIGS. 16A and 16B, in the electro-optical device 2100, the translucent element substrate 2010 and the translucent opposing substrate 2020 are pasted together with a predetermined interval using a sealing material 2107, and an electro-optical layer 2080 that is formed from a liquid crystal layer is disposed between the element substrate 2010 and the opposing substrate 2020 in a region that is surrounded by the sealing material 2107. The sealing material 2107 is provided in frame form so as to run along the outer edge of the opposing substrate 2020. The sealing material 2107 is an adhesive that has a photosetting property or an adhesive that has a photosetting property and a thermosetting property, and a gap material such as glass fiber or glass beads for setting a distance between the substrates to a predetermined value is mixed in with the sealing material 2107. As the sealing material 2107, it is possible to use a photosetting adhesive (an ultraviolet light curable adhesive or a UV curable adhesive) such as an acrylic resin-based photosetting adhesive, an epoxy resin-based photosetting adhesive, an acrylic-modified resin-based photosetting adhesive, or an epoxy-modified-based photosetting adhesive.

The element substrate 2010 and the opposing substrate 2020 are both rectangular, and a display region 2010a is provided in a substantial center of the electro-optical device 2100 as a rectangular region. The sealing material 2107 is also provided in a substantially rectangular form to correspond to the abovementioned shape, and a rectangular frame form peripheral region 2010b is provided between an inner peripheral edge of the sealing material 2107 and an outer peripheral edge of the display region 2010a.

A data line driving circuit 2101 and a plurality of terminals 2102 are formed along a side of the element substrate 2010 on an outer side of the display region 2010a on a surface of an opposing substrate 2020 side of the element substrate 2010, and a scanning line driving circuit 2104 is formed along other sides that are adjacent to the side. A flexible wiring substrate (not illustrated) is connected to the terminals 2102, and various potentials and various signals are input to the element substrate 2010 through the flexible wiring substrate.

In addition, translucent pixel electrodes 2009a that are formed from an ITO (Indium Tin Oxide) film or the like, and pixel transistors (not illustrated), which are electrically connected to the pixel electrodes 2009a, are formed in matrix form in the display region 2010a on a surface of the opposing substrate 2020 side of the element substrate 2010, and an alignment film 2016 is formed on a opposing substrate 2020 side to correspond to the pixel electrodes 2009a. In addition, a dummy pixel electrode 2009b, which is formed at the same time as the pixel electrodes 2009a, is formed on the element substrate 2010 in the peripheral region 2010b.

A translucent common electrode 2021 that is formed from an ITO film or the like is formed on a surface side of the opposing substrate 2020 that is opposite to the element substrate 2010, and an alignment film 2026 is formed on the element substrate 2010 side to correspond to the common electrode 2021. In the present embodiment, the common electrode 2021 is formed over substantially the entire surface of the opposing substrate 2020.

The alignment films 2016 and 2026 are formed from a resin film such as a polyimide or an oblique vapor deposition film such as a silicon oxide film. In the present embodiment, the alignment films 2016 and 2026 are inorganic alignment films (vertical alignment films) that are formed from oblique vapor deposition films such as SiOx (x<2), $SiO_2$, $TiO_2$, MgO, $Al_2O_3$, $In_2O_3$, $Sb_2O_3$, and $Ta_2O_5$, and cause the electro-optical device 2100 to act as a VA (Vertical Alignment) mode liquid crystal device by performing inclined alignment of liquid crystal molecules, which have negative dielectric anisotropy, and are used in the electro-optical layer 2080.

An inter-substrate conduction electrode 2109 for electrically conducting between the element substrate 2010 and the opposing substrate 2020, is formed on the element substrate 2010 further on the outer side than the sealing material 2107 in a region that overlaps with a corner portion of the opposing substrate 2020. An inter-substrate conduction material 2109a, which includes conductive particles, is disposed in the inter-substrate conduction electrode 2109, and the common electrode 2021 of the opposing substrate 2020 is electrically connected to the element substrate 2010 side through the inter-substrate conduction material 2109a and the inter-substrate conduction electrode 2109. Therefore, in the common electrode 2021, a common potential is applied from the element substrate 2010 side.

In the electro-optical device 2100 of the present embodiment, the pixel electrode 2009a and the common electrode 2021 are formed by translucent conductive films, and the electro-optical device 2100 is configured as a transmission type liquid crystal device. In the electro-optical device 2100, images are displayed as a result of light that is incident from a substrate of one side, among the element substrate 2010 and the opposing substrate 2020, being modulated in a period between being transmitted through the substrate of the other side and emitted. In the present embodiment, as shown by an arrow L, images are displayed as a result of light that is incident from the opposing substrate 2020 being modulated by the electro-optical layer 2080 for each pixel in a period between being transmitted through the element substrate 2010 and emitted.

Configuration of Opposing Substrate 2020

Figure 17A:
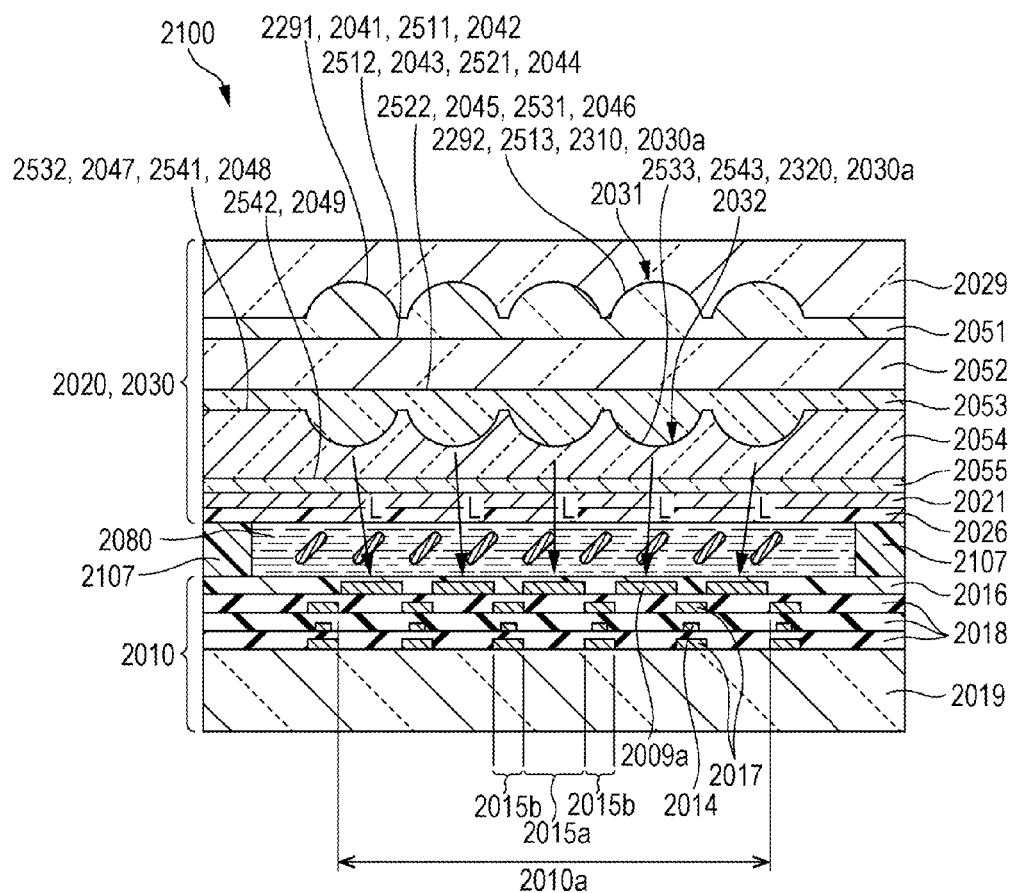
FIG. 17A is an explanatory diagram that shows a configuration example of microlenses and the like in the electro-optical device that is shown in FIGS. 16A and 16B.
Figure 17B:
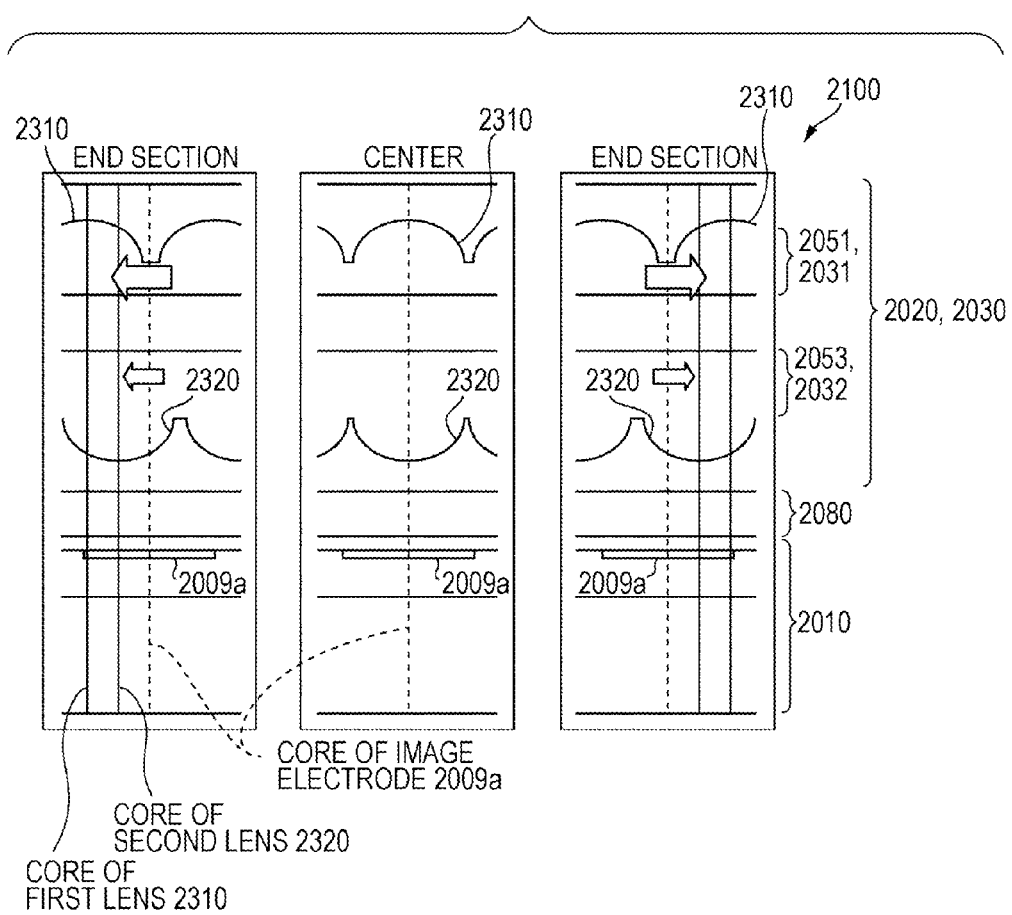
FIG. 17B is an explanatory diagram that shows a configuration example of microlenses and the like in the electro-optical device that is shown in FIGS. 16A and 16B.
Figure 18:
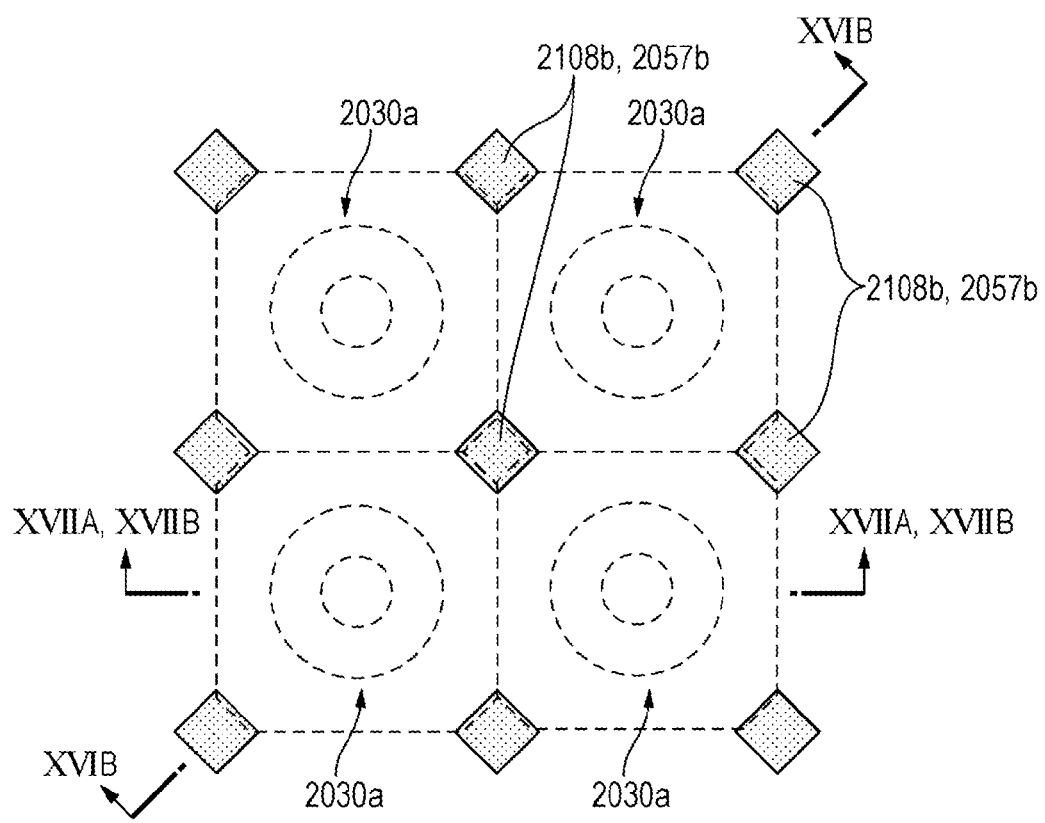
FIG. 18 is an explanatory diagram that shows an example of a planar positional relationship between microlenses and light shielding layers in the electro-optical device that is shown in FIG. 16B.

FIGS. 17A and 17B are explanatory diagrams that show a configuration example of microlenses and the like in the electro-optical device 2100 that is shown in FIGS. 16A and 16B, and FIGS. 17A and 17B are respectively an explanatory diagram that schematically shows cross sectional configuration of the electro-optical device 2100, and an explanatory diagram that schematically shows positions of the microlenses and the like. FIG. 18 is an explanatory diagram that shows an example of a planar positional relationship between microlenses 2030a and light shielding layers 2108b in the electro-optical device 2100 that is shown in FIG. 16B. Additionally, in FIGS. 17A and 17B, illustration of a light shielding layer 2108 is omitted.

As shown in FIG. 16B, in the electro-optical device 2100 of the present embodiment, the light shielding layer 2108 that has a light shielding property and is formed from a metal or a metal compound is formed on the opposing substrate 2020 on an opposite side to the element substrate 2010 to correspond to the common electrode 2021. The light shielding layer 2108 is, for example, formed as frame form boundaries 2108a that extend along the outer peripheral edge of the display region 2010a. In addition, the light shielding layer 2108 is formed as the light shielding layers 2108b in regions that overlap in plan view with regions that are interposed between adjacent pixel electrodes 2009a.

As shown in FIG. 17A, the element substrate 2010 includes a translucent substrate 2019 and a plurality of interlayer insulation films 2018 are laminated onto a surface of the opposing substrate 2020 side of the translucent substrate 2019. In addition, in the element substrate 2010, wiring 2017, which extends along a region that overlaps with space between adjacent pixel electrodes 2009a, and a pixel transistor 2014 are formed using space between the translucent substrate 2019 and the interlayer insulation films 2018, and space between the interlayer insulation films 2018, and the wiring 2017 and pixel transistor 2014 do not transmit light. Therefore, in the element substrate 2010, among regions that overlap with the pixel electrodes 2009a in plan view, regions that overlap with the wiring 2017 and the pixel transistor 2014 in plan view, and regions that overlap with regions that are interposed between adjacent pixel electrodes 2009a in plan view form light shielding regions 2015b, which do not transmit light, and among regions that overlap with the pixel electrodes 2009a in plan view, regions that do not overlap with the wiring 2017 and the pixel transistor 2014 in plan view form opening regions 2015a, which transmit light. Therefore, only light that is transmitted through the opening regions 2015a contributes to the display of images, and light that runs toward the light shielding regions 2015b does not contribute to the display of images.

In such an instance, in the present embodiment, the opposing substrate 2020 is configured as the lens array substrate 2030 in which a plurality of microlenses 2030a are formed with a one-to-one relationship to oppose a plurality of pixel electrodes 2009a in plan view, and the lens array substrate 2030 focuses light from a light source onto the opening regions 2015a. A lens array with a plurality of steps along a direction of travel of light is configured in the lens array substrate 2030 of the present embodiment. To explain in further detail, a first lens array 2031, which is provided with a plurality of first lenses 2310 that are positioned on an incidence side of light, and a second lens array 2032, which is provided with a plurality of second lenses 2320 on a side of the element substrate 2010 with respect to the first lens array 2031, are configured in the lens array substrate 2030, and the plurality of first lenses 2310 and the plurality of second lenses 2320 respectively oppose the plurality of pixel electrodes 2009a with a one-to-one relationship. Therefore, in the electro-optical device 2100 of the present embodiment, as a result of the first lenses 2310 of the first lens array 2031 and the second lenses 2320 of the second lens array 2032, light from a light source is focused onto the opening regions 2015a, and light that is incident to the electro-optical layer 2080 is collimated. For this reason, since inclination in an optical axis of light that is incident to the electro-optical layer 2080 is small, it is possible to reduce phase shift in the electro-optical layer 2080, and therefore, it is possible to suppress deteriorations in transmittance and contrast. In particular, in the present embodiment, since the electro-optical device 2100 is configured as a VA (Vertical Alignment) mode liquid crystal device, it is easy for deteriorations in contrast and the like to be generated as a result of inclinations in the optical axis of light that is incident to the electro-optical layer 2080, but according to the present embodiment, it is difficult for deteriorations in contrast and the like to be generated.

In this instance, as shown in FIG. 18, the microlenses 2030a are arranged so that adjacent microlenses 2030a come into contact with one another, and the light shielding layers 2108b that are shown in FIG. 16B are formed in regions that overlap in plan view with regions that are surrounded by four microlenses 2030a. Therefore, in FIG. 16B, the light shielding layers 2108b are illustrated as being a cross-section on a XVIB-XVIB line in FIG. 18, but in FIGS. 17A and 17B, the light shielding layers 2108b are not illustrated as being a cross-section on a XVIIAB-XVIIAB line in FIG. 18. Additionally, there are cases in which the light shielding layers 2108b overlap with end sections of the microlenses 2030a in plan view, but the light shielding layers 2108b are formed so as to not overlap with the centers of the microlenses 2030a in plan view.

As shown in FIG. 17A, when configuring the lens array substrate 2030 (the opposing substrate 2020), a plurality of first concave sections 2292 that are formed from concave curved surfaces are formed on a first surface 2041 that is formed from a substrate surface 2291 of a translucent substrate 2029. In addition, a translucent first lens layer 2051, a first translucent layer 2052, a translucent second lens layer 2053, a second translucent layer 2054, and a translucent protective layer 2055, which will be described below are laminated in order on the substrate surface 2291 (the first surface 2041) of the translucent substrate 2029. The plurality of first concave sections 2292 oppose the plurality of pixel electrodes 2009a overlapping therewith in plan view with a one-to-one relationship. Among the plurality of translucent films, the first lens layer 2051 is provided with a surface 2511 (a second surface 2042) that covers the substrate surface 2291 (the first surface 2041) of the translucent substrate 2029, and a flat surface 2512 (a third surface 2043) that is positioned on an opposite side to the surface 2511 (the second surface 2042). In addition, the surface 2511 (the second surface 2042) of the first lens layer 2051 includes hemispherical first convex sections 2513 that are buried in the first concave sections 2292 of the translucent substrate 2029.

In this instance, a refractive index differs between the translucent substrate 2029 and the first lens layer 2051, and the first concave sections 2292 and the first convex sections 2513 configure the first lenses 2310 (the microlenses 2030a) of the first lens array 2031. In the present embodiment, the refractive index of the first lens layer 2051 is greater than the refractive index of the translucent substrate 2029. For example, in contrast to the translucent substrate 2029 being formed from a quartz substrate (a silicon oxide film, $SiO_2$), and having a refractive index of 1.48, the first lens layer 2051 is formed from a silicon oxynitride film (SiON), and has a refractive index of 1.58 to 1.68. For this reason, the first lenses 2310 have a power of focusing light from a light source.

The first translucent layer 2052 is provided with a surface 2521 (a fourth surface 2044) that covers the flat surface 2512 (the third surface 2043) of the first lens layer 2051, and a surface 2522 (a fifth surface 2045) that is positioned on an opposite side to the surface 2521 (the fourth surface 2044). In the present embodiment, the first translucent layer 2052 is formed from a silicon oxide film ($SiO_x$), and has a refractive index of 1.48. The first translucent layer 2052 is a first optical path length adjustment layer that adjusts the optical path length from the first lens array 2031 to the second lens array 2032.

The second lens layer 2053 includes a surface 2531 (a sixth surface 2046) that covers the surface 2522 (the fifth surface 2045) of the first translucent layer 2052, and a surface 2532 (a seventh surface 2047) on an opposite side to surface 2531 (the sixth surface 2046), and convex sections, which protrude toward an opposite side to the translucent substrate 2029, or concave sections, which are hollowed out toward the translucent substrate 2029, are formed on the surface 2532 (the seventh surface 2047) in positions that overlap with the first concave sections 2292 in plan view.

In the present embodiment, second convex sections 2533, which protrude in hemispherical form toward an opposite side to the translucent substrate 2029, are formed on the surface 2532 (the seventh surface 2047) of the second lens layer 2053 in positions that overlap with the first concave sections 2292 in plan view. Therefore, in the second translucent layer 2054, second concave sections 2543, which are formed from concave curved surfaces in which the second convex sections 2533 of the second lens layer 2053 are positioned on an inner side thereof, are formed on a surface 2541 (an eighth surface 2048) that covers the surface 2532 (the seventh surface 2047) of the second lens layer 2053. The second translucent layer 2054 is provided with a flat surface 2542 (a ninth surface 2049) on the opposite side to the surface 2541 (the eighth surface 2048).

In this instance, a refractive index differs between the second lens layer 2053 and the second translucent layer 2054, and the second concave sections 2543 and the second convex sections 2533 configure the second lenses 2320 (the microlenses 2030a) of the second lens array 2032. In the present embodiment, the refractive index of the second lens layer 2053 is greater than the refractive index of the second translucent layer 2054. For example, in contrast to the second lens layer 2053 being formed from a silicon oxynitride film (SiON), and having a refractive index of 1.58 to 1.68, the second translucent layer 2054 is formed from a silicon oxide film (SiO$_x$), and has a refractive index of 1.48. For this reason, the second lenses 2320 have a power of focusing light from a light source. In the present embodiment, the second translucent layer 2054 is a second optical path length adjustment layer that adjusts the optical path length from the second lens array 2032 to the element substrate 2010.

The protective layer 2055 of a silicon oxide film (SiO$_x$), a silicon oxynitride film (SiON) or the like is formed on the flat surface 2542 (the ninth surface 2049) of the second translucent layer 2054, and the common electrode 2021 is formed on an opposite side to the second translucent layer 2054 and the translucent substrate 2029 with respect to the protective layer 2055. In addition, the alignment film 2026 is formed on an opposite side to the protective layer 2055 and the translucent substrate 2029 with respect to the common electrode 2021.

Detailed Configuration of Light Shielding Layer 2108

As shown in FIG. 16B, in the lens array substrate 2030, the light shielding layer 2108 (the boundaries 2108a and the light shielding layers 2108b) is, for example, configured by a first metal layer 2056 and a second metal layer 2057 that are formed between layers of the abovementioned translucent films.

More specifically, in the lens array substrate 2030, as the frame shaped boundaries 2108a that extend along the outer peripheral edge of the display region 2010a, boundaries 2056a, which are formed from the first metal layer 2056, are formed between the flat surface 2512 (the third surface 2043) of the first lens layer 2051 and the surface 2521 (the fourth surface 2044) of the first translucent layer 2052, and boundaries 2057a, which are formed from the second metal layer 2057, are formed between the surface 2522 (the fifth surface 2045) of the first translucent layer 2052 and the surface 2531 (the sixth surface 2046) of the second lens layer 2053. In addition, as the light shielding layers 2108b, light shielding layers 2057b, which are formed from the second metal layer 2057, are formed in the display region 2010a. There are cases in which the light shielding layers 2057b overlap with end sections of the microlenses 2030a in plan view, but the light shielding layers 2057b do not overlap with the centers of the microlenses 2030a in plan view.

In the present embodiment, the light shielding layer 2108 (the first metal layer 2056 and the second metal layer 2057) is respectively formed from a metal film of titanium (Ti), aluminum (Al), chromium (Cr), tungsten (W), tantalum (Ta), molybdenum (Mo), palladium (Pd) or the like, or a metal compound film of a nitride film or the like of one of these. In addition, the light shielding layer 2108 may be a single layered film or a multilayered film of the abovementioned metal films or metal compound films.

Scaling of the First Lenses 2310

Figure 19A:
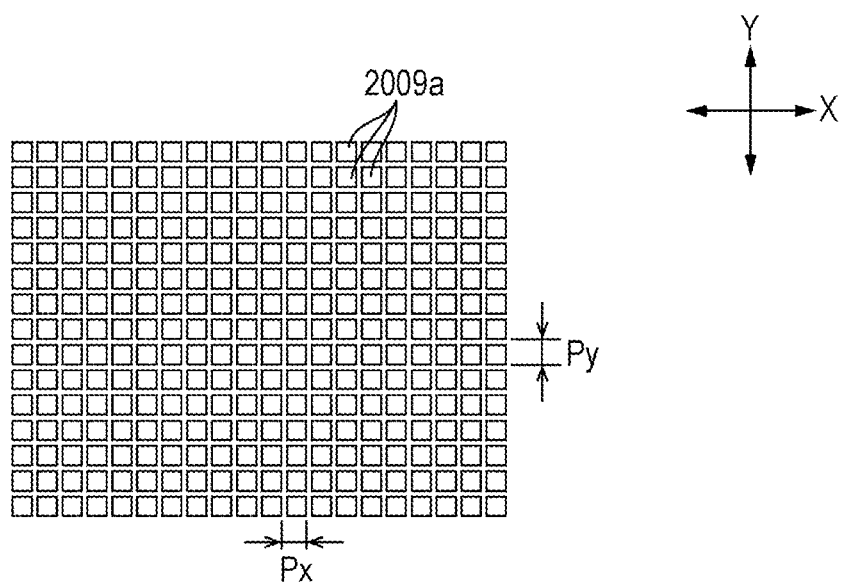
FIG. 19A is an explanatory diagram that shows an aspect of scaling of microlenses in the electro-optical device according to Embodiment 2 of the invention.
Figure 19B:
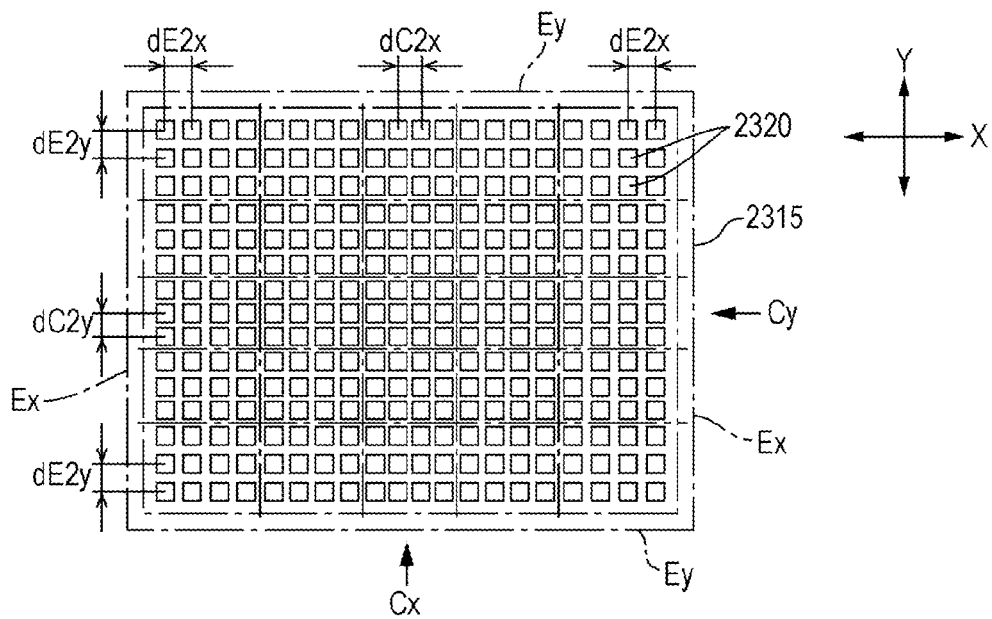
FIG. 19B is an explanatory diagram that shows an aspect of scaling of microlenses in the electro-optical device according to Embodiment 2 of the invention.
Figure 19C:
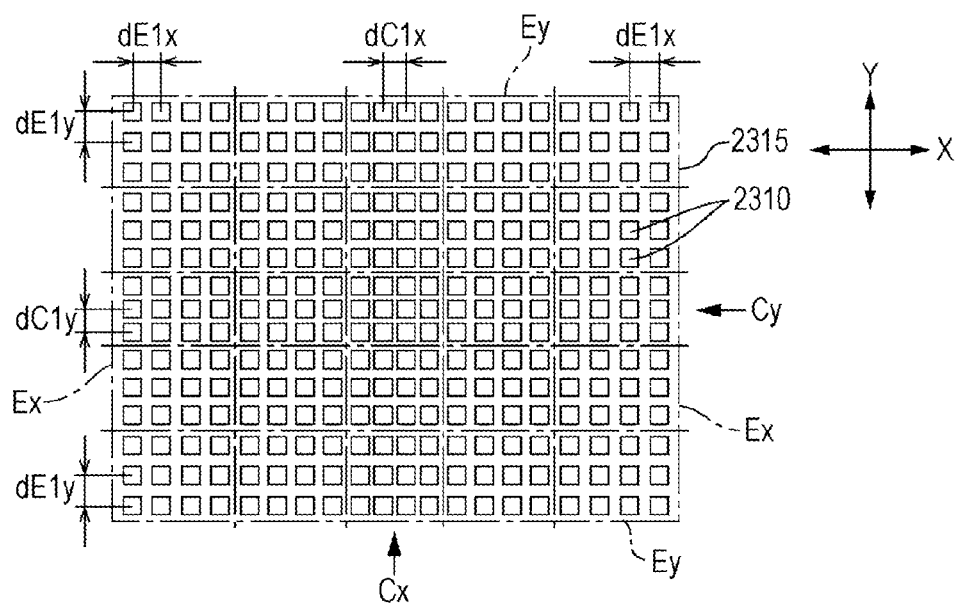
FIG. 19C is an explanatory diagram that shows an aspect of scaling of microlenses in the electro-optical device according to Embodiment 2 of the invention.
Figure 20A:
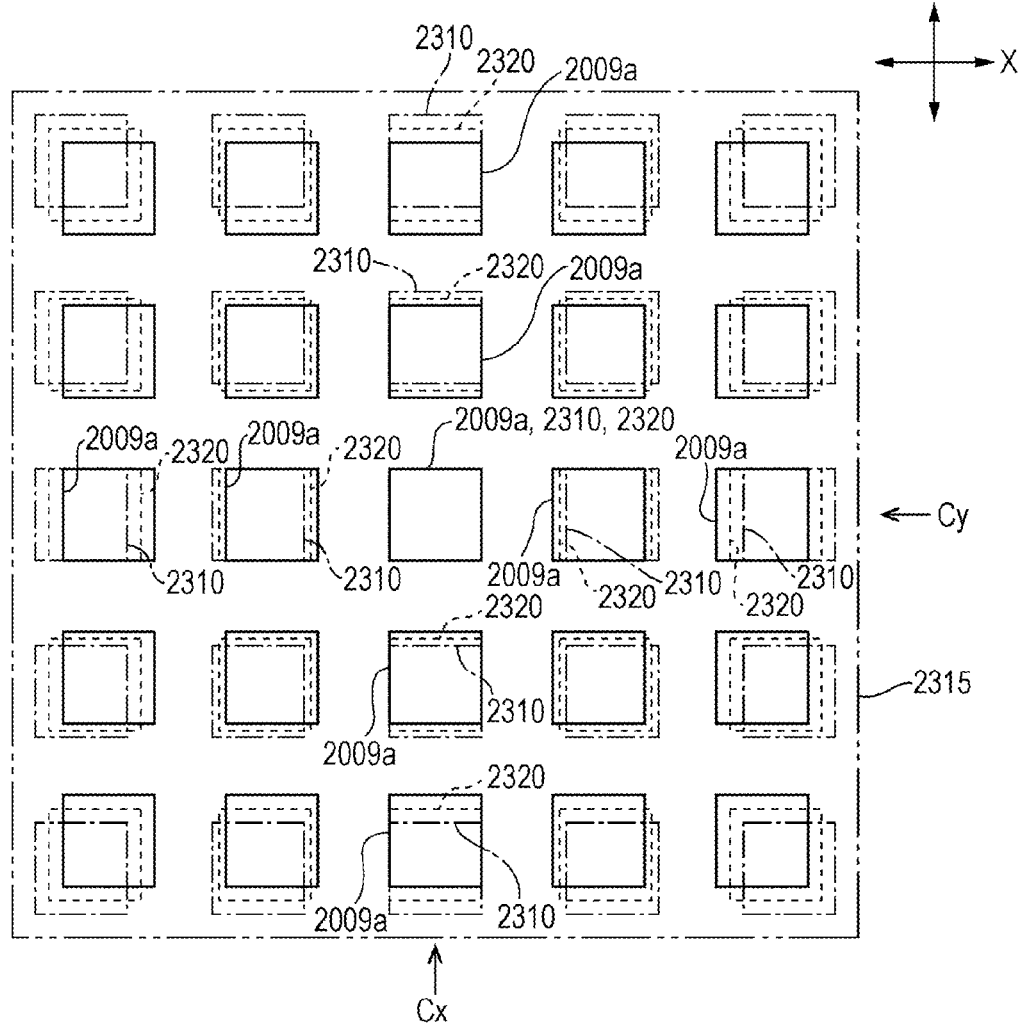
FIG. 20A is an explanatory diagram that shows a state in which a core of first lenses and a core of second lenses are shifted with respect to cores of pixel electrodes as a result of the scaling that is shown in FIGS. 19A, 19B and 19C.
Figure 20B:
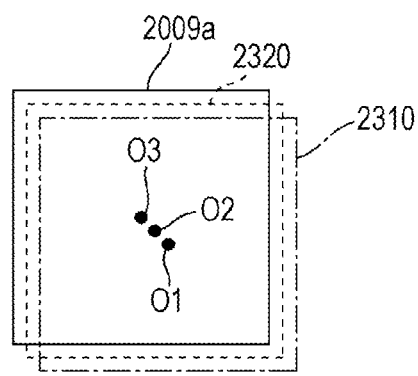
FIG. 20B is an explanatory diagram that shows a state in which a core of first lenses and a core of second lenses are shifted with respect to core of pixel electrodes as a result of the scaling that is shown in FIGS. 19A, 19B and 19C.

FIGS. 19A, 19B and 19C are explanatory diagrams that show an aspect of scaling of the microlenses 2030a in the electro-optical device 2100 according to Embodiment 2 of the invention, and FIGS. 19A, 19B and 19C are respectively explanatory diagrams that show a layout of the pixel electrodes 2009a, an explanatory diagram that shows a layout of the second lenses 2320, and an explanatory diagram that shows a layout of the first lenses 2310. FIGS. 20A and 20B are explanatory diagrams that show a state in which a core of the first lenses 2310 and a core of the second lenses 2320 are shifted with respect to cores of pixel electrodes 2009a as a result of the scaling that is shown in FIGS. 19A, 19B and 19C. Additionally, in FIGS. 19A, 19B and 19C, a shift amount during scaling of the first lenses 2310 and the second lenses 2320 is shown in an exaggerated manner, and even after scaling of the first lenses 2310 and the second lenses 2320, the plurality of first lenses 2310 and the plurality of second lenses 2320 oppose the plurality of pixel electrodes 2009a with a one-to-one relationship.

As shown in FIG. 19A, in the electro-optical device 2100 of the present embodiment, the pixel electrodes 2009a are disposed at regular intervals in a first direction X with a first pitch Px, and are disposed at regular intervals in a second direction Y, which intersects the first direction X, with a second pitch Py.

In contrast to this, the plurality of first lenses 2310 and the plurality of second lenses 2320 oppose the plurality of pixel electrodes 2009a with a one-to-one relationship, but as shown in FIGS. 19B and 19C, inter-core distances of the first lenses 2310 and inter-core distance of the second lenses 2320 differ depending on position. In the invention, the cores of the first lenses 2310 and the cores of the second lenses 2320 refer to cores of summit sections of convex sections that configure lens surfaces, and cores of bottom sections of concave sections, and the inter-core distance refers to a distance between the cores of adjacent first lenses 2310 and a distance between the cores of adjacent second lenses 2320.

In this instance, the inter-core distance in the first direction X of the first lenses 2310 may adopt either a configuration of differing for each single first lens 2310 in the first direction X, or a configuration of differing every plurality of first lenses 2310 in units of a plurality of first lenses 2310 in the first direction X, but in the present embodiment, a case in which 20×15 first lenses 2310 are equally divided into five regions in the first direction X, and the inter-core distance of the first lenses 2310 changes for each region, is illustrated by way of example. That is, in the first direction X, four first lenses 2310 are set as a unit, and the inter-core distance changes per unit (per four first lenses 2310). In addition, the inter-core distance in the second direction Y of the first lenses 2310 may adopt either a configuration of differing for each single first lens 2310 in the second direction Y, or a configuration of differing every plurality of first lenses 2310 in units of a plurality of first lenses 2310 in the second direction Y, but in the present embodiment, a case in which 20×15 first lenses 2310 are equally divided into five regions in the second direction Y, and the inter-core distance of the first lenses 2310 changes for each region, is illustrated by way of example. That is, in the second direction Y, three first lenses 2310 are set as a unit, and the inter-core distance changes per unit (per three first lenses 2310).

To explain in further detail, as shown in FIG. 19C, in a region 2315 (a region in which the pixel electrodes 2009$a$ are arranged), in which the first lenses 2310 are arranged, the inter-core distance of the first lenses 2310 in the first direction X is shorter on a side of the center (a first core Cx) in the first direction X, and the inter-core distance of the first lenses 2310 in the first direction X becomes longer in accordance with movement toward an end section (a first end section Ex) in the first direction X. Therefore, on a side of the first end section Ex, an inter-core distance (a first inter-core distance dE1$x$) between adjacent first lenses 2310 in the first direction X is longer than an inter-core distance dC1$x$ between adjacent first lenses 2310 in the first direction X on a side of the first core Cx of the first lenses 2310. In addition, among the plurality of first lenses 2310, in first lenses 2310 that are between the first end section Ex and the center in the first direction X (the first core Cx), the inter-core distance between two adjacent first lenses 2310 in the first direction X gradually becomes shorter in units of a plurality of first lenses 2310 in accordance with movement from the first end section Ex to the first core Cx side. Additionally, in a case in which the inter-core distance of the first lenses 2310 in the first direction X differs for each single first lens 2310, in first lenses 2310 that are between the first end section Ex and the center in the first direction X (the first core Cx), the inter-core distance between two adjacent first lenses 2310 in the first direction X gradually becomes shorter for each single first lens 2310 in accordance with movement from the first end section Ex to the first core Cx side.

In this instance, in the first core Cx, the inter-core distance dC1$x$ of the first lenses 2310 in the first direction X is equivalent to the first pitch Px of the pixel electrodes 2009$a$ in the first direction X. Accordingly, as shown in FIGS. 17B and 20A, the cores of the pixel electrodes 2009$a$ and the cores of the first lenses 2310 overlap in the vicinity of the first core Cx, but the cores of the first lenses 2310 are shifted to an outer side in the first direction X with respect to the cores of the pixel electrodes 2009$a$ in positions that are close to the first end section Ex. In addition, as shown in FIG. 20A, the amount (a shift amount) by which the cores of the first lenses 2310 are shifted to the side of the first end section Ex (the outer side) with respect to the cores of the pixel electrodes 2009$a$ increases with movement from the first core Cx toward the first end section Ex.

In addition, as shown in FIG. 19C, in the region 2315 (a region in which the pixel electrodes 2009$a$ are arranged) in which the first lenses 2310 are arranged, the inter-core distance of the first lenses 2310 in the second direction Y is shorter on a side of the center (a second core Cy) in the second direction Y, and the inter-core distance of the first lenses 2310 in the second direction Y becomes longer in accordance with movement toward an end section (a second end section Ey) in the second direction Y. Therefore, on a side of the second end section Ey, an inter-core distance (a second inter-core distance dE1$y$) between adjacent first lenses 2310 in the second direction Y is longer than an inter-core distance dC1$y$ between adjacent first lenses 2310 in the second direction Y on a side of the second core Cy of the first lenses 2310. In addition, among the plurality of first lenses 2310, in first lenses 2310 that are between the second end section Ey and the center in the second direction Y (the second core Cy), the inter-core distance between two adjacent first lenses 2310 in the second direction Y gradually becomes shorter in units of a plurality of first lenses 2310 in accordance with movement from the second end section Ey to the second core Cy side. Additionally, in a case in which the inter-core distance of the first lenses 2310 in the second direction Y differs for each single first lens 2310, in first lenses 2310 that are between the second end section Ey and the center in the second direction Y (the second core Cy), the inter-core distance between two adjacent first lenses 2310 in the second direction Y gradually becomes shorter for each single first lens 2310 in accordance with movement from the second end section Ey to the second core Cy side.

In this instance, in the second core Cy, the inter-core distance dC1$y$ of the first lenses 2310 in the second direction Y is equivalent to the second pitch Py of the pixel electrodes 2009$a$ in the second direction Y. Accordingly, as shown in FIGS. 17B and 20A, the cores of the pixel electrodes 2009$a$ and the cores of the first lenses 2310 overlap in the vicinity of the second core Cy, but the cores of the first lenses 2310 are shifted to an outer side in the second direction Y with respect to the cores of the pixel electrodes 2009$a$ in positions that are close to the second end section Ey. In addition, as shown in FIG. 20A, the amount (a shift amount) by which the cores of the first lenses 2310 are shifted to the side of the second end section Ey (the outer side) with respect to the cores of the pixel electrodes 2009$a$ increases with movement from the second core Cy toward the second end section Ey.

Scaling of the Second Lenses 2320

The inter-core distance in the first direction X of the second lenses 2320 may adopt either a configuration of differing for each single second lens 2320 in the first direction X, or a configuration of differing every plurality of second lenses 2320 in units of a plurality of second lenses 2320 in the first direction X. In the present embodiment, a case in which 20×15 second lenses 2320 are equally divided into five regions in the first direction X, and the inter-core distance of the second lenses 2320 changes for each region, is illustrated by way of example. That is, in the first direction X, four second lenses 2320 are set as a unit, and the inter-core distance changes per unit (per four second lenses 2320). In addition, the inter-core distance in the second direction Y of the second lenses 2320 may adopt either a configuration of differing for each single second lens 2320 in the second direction Y, or a configuration of differing every plurality of second lenses 2320 in units of a plurality of second lenses 2320 in the second direction Y. In the present embodiment, a case in which 20×15 second lenses 2320 are equally divided into five regions in the second direction Y, and the inter-core distance of the second lenses 2320 changes for each region, is illustrated by way of example. That is, in the second direction Y, three second lenses 2320 are set as a unit, and the inter-core distance changes per unit (per three second lenses 2320).

To explain in further detail, as shown in FIG. 19B, in the region 2315 (a region in which the pixel electrodes 2009$a$ are arranged), in which the second lenses 2320 are arranged, the inter-core distance of the second lenses 2320 in the first direction X is shorter on the side of the center (the first core Cx) in the first direction X, and the inter-core distance of the second lenses 2320 in the first direction X becomes longer in accordance with movement toward the end section (the first end section Ex) in the first direction X. Therefore, on a side of the first end section Ex, an inter-core distance (a third inter-core distance dE2$x$) between adjacent second lenses 2320 in the first direction X is longer than an inter-core distance dC2$x$ between adjacent second lenses 2320 in the first direction X on a side of the first core Cx of the second lenses 2320. In addition, among the plurality of second lenses 2320, in second lenses 2320 that are between the first end section Ex and the center in the first direction X (the first core Cx), the inter-core distance between two adjacent second lenses 2320 in the first direction X gradually becomes shorter in units of a plurality of second lenses 2320 in accordance with movement from the first end section Ex to the first core Cx side. Additionally, in a case in which the inter-core distance of the second lenses 2320 in the first direction X differs for each single second lens 2320, in second lenses 2320 that are between the first end section Ex and the center in the first direction X (the first core Cx), the inter-core distance between two adjacent second lenses 2320 in the first direction X gradually becomes shorter for each single second lens 2320 in accordance with movement from the first end section Ex to the first core Cx side.

In this instance, in the first core Cx, the inter-core distance dC2x of the second lenses 2320 in the first direction X is equivalent to the first pitch Px of the pixel electrodes 2009a in the first direction X. Accordingly, as shown in FIGS. 17B and 20A, the cores of the pixel electrodes 2009a and the cores of the second lenses 2320 overlap in the vicinity of the first core Cx, but the cores of the second lenses 2320 are shifted to an outer side in the first direction X with respect to the cores of the pixel electrodes 2009a in positions that are close to the first end section Ex. In addition, as shown in FIG. 20A, the amount (a shift amount) by which the cores of the second lenses 2320 are shifted to the side of the first end section Ex (the outer side) with respect to the cores of the pixel electrodes 2009a increases with movement from the first core Cx toward the first end section Ex.

In addition, as shown in FIG. 19B, in the region 2315 (a region in which the pixel electrodes 2009a are arranged) in which the second lenses 2320 are arranged, the inter-core distance of the second lenses 2320 in the second direction Y is shorter on the side of the center (the second core Cy) in the second direction Y, and the inter-core distance of the second lenses 2320 in the second direction Y becomes longer in accordance with movement toward the end section (the second end section Ey) in the second direction Y. Therefore, on a side of the second end section Ey, an inter-core distance (a fourth inter-core distance dE2y) between adjacent second lenses 2320 in the second direction Y is longer than an inter-core distance dC2y between adjacent second lenses 2320 in the second direction Y on a side of the second core Cy of the second lenses 2320. In addition, among the plurality of second lenses 2320, in second lenses 2320 that are between the second end section Ey and the center in the second direction Y (the second core Cy), the inter-core distance between two adjacent second lenses 2320 in the second direction Y gradually becomes shorter in units of a plurality of second lenses 2320 in accordance with movement from the second end section Ey to the second core Cy side. Additionally, in a case in which the inter-core distance of the second lenses 2320 in the second direction Y differs for each single second lens 2320, in second lenses 2320 that are between the second end section Ey and the center in the second direction Y (the second core Cy), the inter-core distance between two adjacent second lenses 2320 in the second direction Y gradually becomes shorter for each single second lens 2320 in accordance with movement from the second end section Ey to the second core Cy side.

In this instance, in the second core Cy, the inter-core distance dC2y of the second lenses 2320 in the second direction Y is equivalent to the second pitch Py of the pixel electrodes 2009a in the second direction Y. Accordingly, as shown in FIGS. 17B and 20A, the cores of the pixel electrodes 2009a and the cores of the second lenses 2320 overlap in the vicinity of the second core Cy, but the cores of the second lenses 2320 are shifted to an outer side in the second direction Y with respect to the cores of the pixel electrodes 2009a in positions that are close to the second end section Ey. In addition, as shown in FIG. 20A, the amount (a shift amount) by which the cores of the second lenses 2320 are shifted to the side of the second end section Ey (the outer side) with respect to the cores of the pixel electrodes 2009a increases with movement from the second core Cy toward the second end section Ey.

Setting of Shift Amounts

Figure 21:
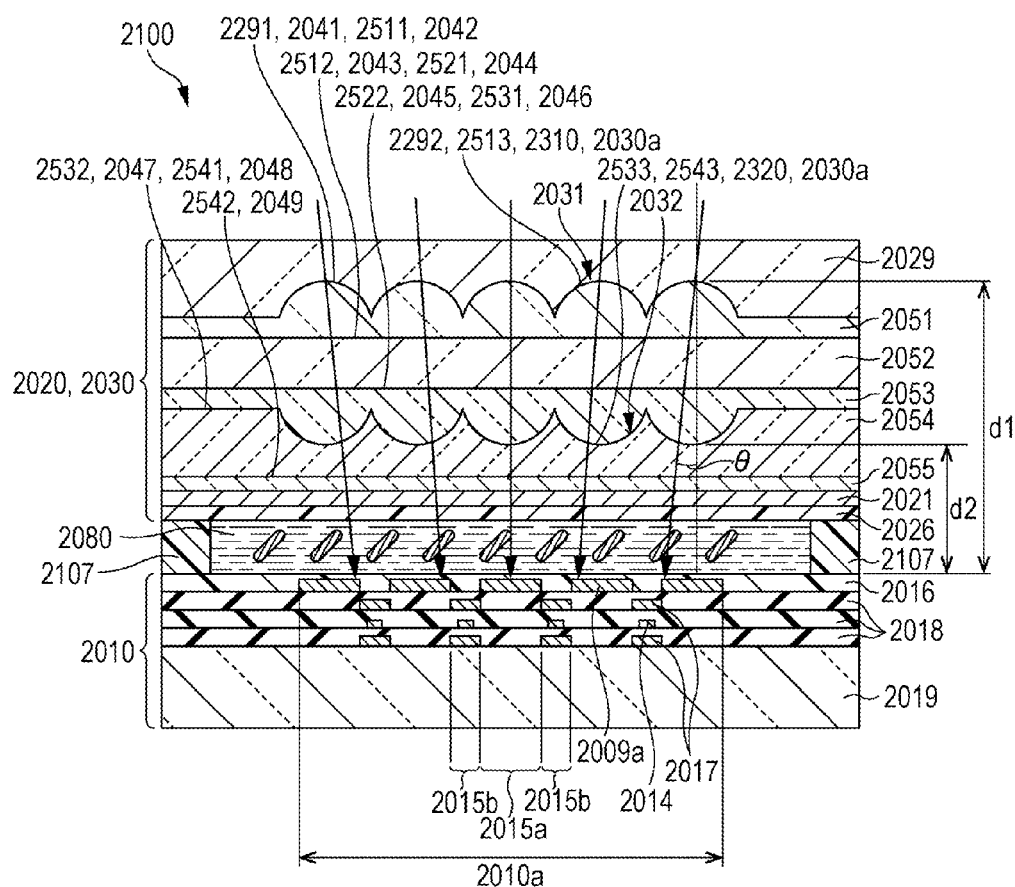
FIG. 21 is an explanatory diagram that shows a method that sets shift amounts of microlenses during the scaling that is shown in FIGS. 19A, 19B and 19C.

FIG. 21 is an explanatory diagram that shows a method that sets a shift amounts of the microlenses 2030a during the scaling that is shown in FIGS. 19A, 19B and 19C.

When setting the shift amount during the abovementioned scaling, as shown in FIG. 21, an angle θ of a center of gravity line of light that is incident to the pixel electrodes 2009a through the first lenses 2310 and the second lenses 2320 is determined at each position in a state in which the abovementioned scaling is not performed on the first lenses 2310 and the second lenses 2320. Next, an air conversion length d1 from the first lenses 2310 to the pixel electrodes 2009a, and an air conversion length d2 from the second lenses 2320 to the pixel electrodes 2009a are determined.

Further, respective shift amounts of the plurality of first lenses 2310 are determined from the following formula.

$$d1 \times \tan \theta$$

In addition, respectively shift amounts of the plurality of second lenses 2320 are determined from the following formula.

$$d2 \times \tan \theta$$

In this instance, the air conversion length d1 from the first lenses 2310 to the pixel electrodes 2009a is longer than the air conversion length d2 from the second lenses 2320 to the pixel electrodes 2009a. Accordingly, among the plurality of first lenses 2310 and the plurality of second lenses 2320, in a first lens 2310 and a second lens 2320 that overlap at the first end section Ex in plan view, the inter-core distance (the third inter-core distance dE2x) of the second lens 2320 is set to be shorter than the inter-core distance (the first inter-core distance dE1x) of the first lens 2310. In addition, among the plurality of first lenses 2310 and the plurality of second lenses 2320, in a first lens 2310 and a second lens 2320 that overlap at the second end section Ey in plan view, the inter-core distance (the fourth inter-core distance dE2y) of the second lens 2320 is set to be shorter than the inter-core distance (the second inter-core distance dE1y) of the first lens 2310.

In the first lenses 2310, in a case in which the shift amounts are set for each of the plurality of first lenses 2310 in the manner of the present embodiment, an average value of the optimum shift amounts for the plurality of first lenses 2310 is determined, and the scaling amounts are established for each of the plurality of first lenses 2310. In addition, in the second lenses 2320, in a case in which the shift amounts are set for each of the plurality of second lenses 2320, an average value of the optimum shift amounts for the plurality of second lenses 2320 is determined, and the shift amounts are established for each of the plurality of second lenses 2320. According to this configuration, the design of the lens array substrate 2030 is easy. In such a case, in general, as shown in FIG. 20B, in pixel electrodes 2009a, first lenses 2310, and second lenses 2320 that overlap in plan view, a core O3 of the pixel electrode 2009a is positioned on a line that connects a core O1 of the first lens 2310 and a core O2 of the second lens 2320. As a result of this, as shown in FIG. 17A, light that is incident to the electro-optical device 2100 is focused in a substantial center of the pixel electrodes 2009a as shown by the arrow L in FIG. 17A.

In contrast to this, in a case in which the shift amounts are set for each single first lens 2310, and the shift amounts are set for each single second lens 2320, as shown in FIG. 20B, in pixel electrodes 2009a, first lenses 2310, and second lenses 2320 that overlap in plan view at any position, the core O3 of the pixel electrode 2009a is positioned on a line that connects the core O1 of the first lens 2310 and the core O2 of the second lens 2320. According to this configuration, it is possible to suitably shift all of the cores of the first lenses 2310 and all of the cores of the second lenses 2320 to correspond to the cores of the pixel electrodes 2009a. For this reason, as shown in FIG. 17A, light that is incident to the electro-optical device 2100 in any position is focused in a substantial center of the pixel electrodes 2009a as shown by the arrow L in FIG. 17A.

Configuration for Scaling Each Region

Figure 22A:
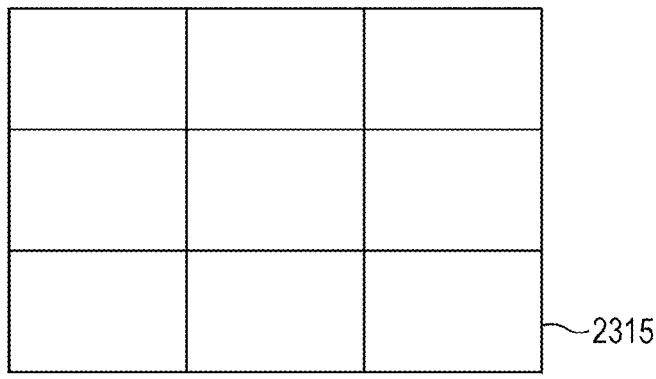
FIG. 22A is an explanatory diagram of regional division for scaling of microlenses in the electro-optical device according to Embodiment 2 of the invention.
Figure 22B:
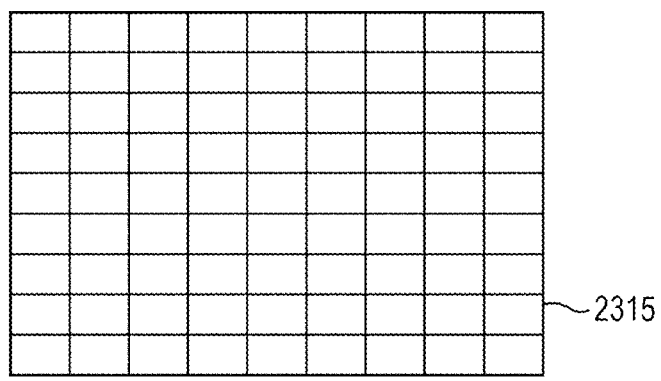
FIG. 22B is an explanatory diagram of regional division for scaling of microlenses in the electro-optical device according to Embodiment 2 of the invention.
Figure 22C:
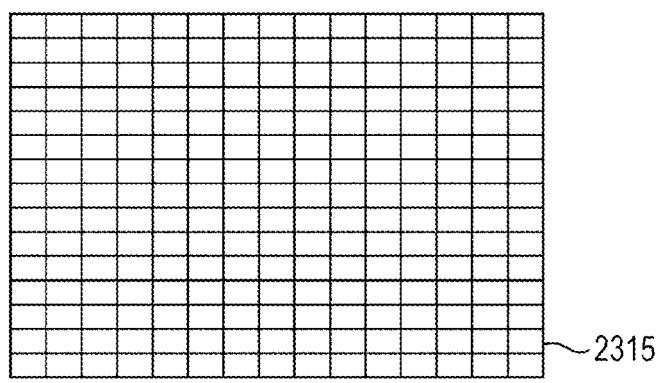
FIG. 22C is an explanatory diagram of regional division for scaling of microlenses in the electro-optical device according to Embodiment 2 of the invention.

FIGS. 22A, 22B and 22C are explanatory diagrams of regional division for scaling of the microlenses 2030a in the electro-optical device 2100 according to Embodiment 2 of the invention, FIGS. 22A, 22B and 22C are respectively an explanatory diagram of a case of performing regional division into 3×3, an explanatory diagram of a case of performing regional division into 9×9, and an explanatory diagram of a case of performing regional division into 15×15.

When setting the abovementioned shift amounts for each region, as shown in FIG. 22C, in a case of performing regional division into 15×15, for example, a difference in shift amount of 0.093 µm is generated between the divided regions. In contrast to this, as shown in FIG. 22B, in a case of performing regional division into 9×9, when the same scaling as the example that is shown FIG. 22C is performed, a difference in shift amount of 0.163 µm is generated between the divided regions.

In contrast to this, as shown in FIG. 22A, in a case of performing regional division into 3×3, when the same scaling as the example that is shown in FIG. 22C is performed, a difference in scaling amount (shift amount) of 0.650 µm is generated between the divided regions. In such a case, obvious borders are generated between regions, and there is a concern that the borders will appear as border of light and dark in displayed images. In contrast to this, in the cases of the divided regions that are shown in FIGS. 22B and 22C, an effect of borders of light and dark not being confirmed by sight in displayed images, is obtained. For this reason, in a case in which regional division is performed for scaling, it is preferable that regional division of a number that exceeds three is performed in the first direction X, and that regional division of a number that exceeds three is performed in the second direction Y.

Main Effects of Present Embodiment

In the manner described above, in the electro-optical device 2100 of the present embodiment, the plurality of first lenses 2310 and the plurality of second lenses 2320 oppose the plurality of pixel electrodes 2009a with a one-to-one relationship, but the inter-core distances of the first lenses 2310 and the inter-core distances of the second lenses 2320 are rectified depending on the positions thereof. Therefore, in the region 2315 (a region in which the pixel electrodes 2009a are arranged) in which the first lenses 2310 are arranged, the cores of the pixel electrodes 2009a, the cores of the first lenses 2310, and the cores of the second lenses 2320 overlap in the vicinity of the center in the first direction X (the first core Cx), and in the vicinity of the center in the second direction Y (the second core Cy). In contrast to this, the cores of the first lenses 2310 and the second lenses 2320 are shifted to an outer side with respect to the cores of the pixel electrodes 2009a in positions that are close to end sections (the first end section Ex and the second end section Ey) of the region 2315 (a region in which the pixel electrodes 2009a are arranged) in which the first lenses 2310 are arranged. Therefore, when the electro-optical device 2100 is irradiated with light, even in a case in which the intensity of light that is incident to the electro-optical device 2100 in an oblique manner from the outer side is higher than that of light that is incident to the electro-optical device 2100 in an oblique manner from the inner side, light is transmitted through the first lenses 2310 and the second lenses 2320, and is focused in a substantial center of the pixel electrodes 2009a. Accordingly, when manufacturing the electro-optical device 2100, it is even possible to suppress the occurrence of a circumstance in which luminance is partially reduced in an image that is projected on the screen 2111 that is shown in FIG. 14 or the like when the element substrate 2010 is pasted together with the lens array substrate 2030 (the opposing substrate 2020) in a state that is shifted in the first direction X and the second direction Y.

Embodiment 3

Figure 23:
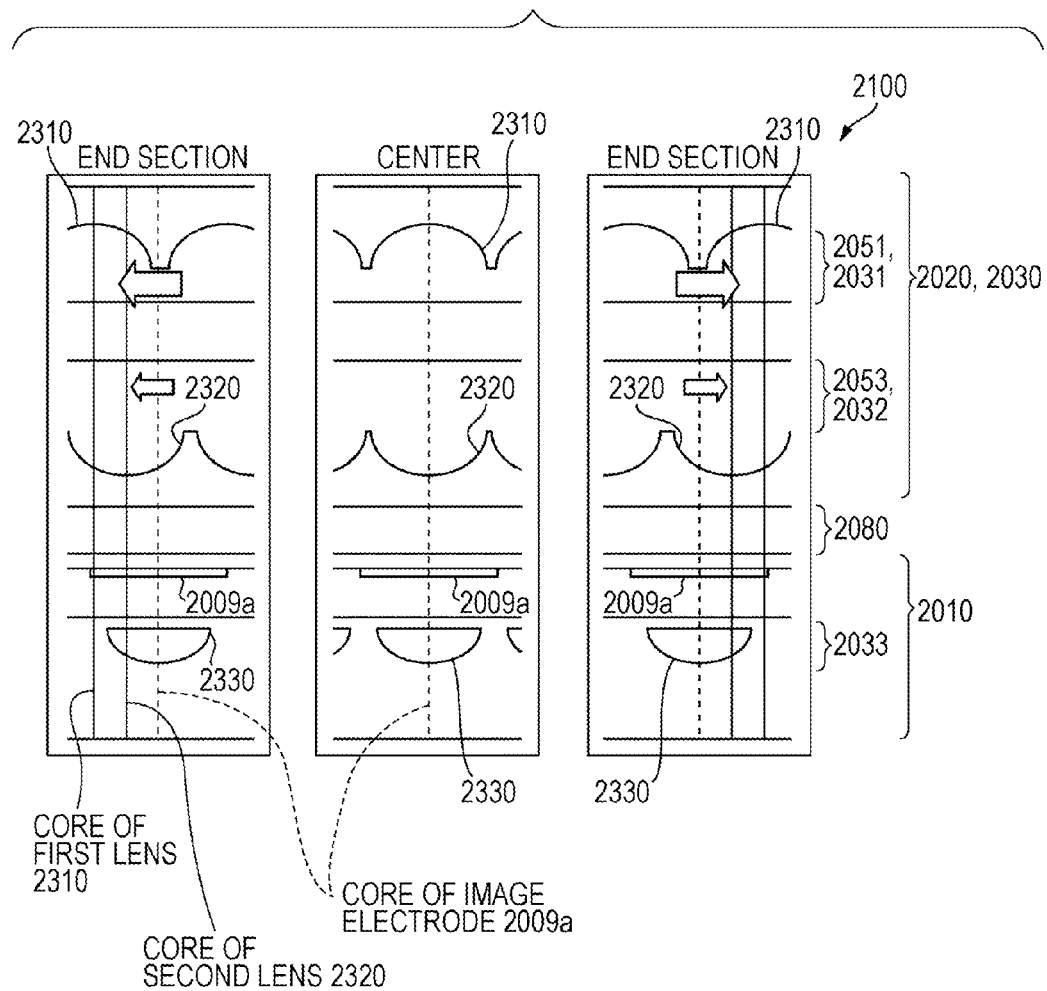
FIG. 23 is an explanatory diagram that schematically shows a cross-sectional configuration of an electro-optical device according to Embodiment 3 of the invention.

FIG. 23 is an explanatory diagram that schematically shows a cross-sectional configuration of an electro-optical device 2100 according to Embodiment 3 of the invention. In Embodiment 2, the first lenses 2310 and the second lenses 2320 were only provided on the opposing substrate 2020 side, but in the present embodiment, as shown in FIG. 23, a third lens array 2033, which is provided with third lenses 2330 (microlenses) opposing the pixel electrodes 2009a, is provided in the element substrate 2010 on an opposite side to the opposing substrate 2020 with respect to the pixel electrodes 2009a. The third lens array 2033 can, for example, be configured by providing a translucent film buried in the concave section after forming the concave sections in the translucent substrate 2019 that is shown in FIG. 17A.

In this instance, in the third lenses 2330, the cores of the pixel electrodes 2009a and the cores of the third lenses 2330 overlap in any position. In contrast to this, the cores of the first lenses 2310 and the cores of the second lenses 2320 are shifted to an outer side by a predetermined distance from the cores of the pixel electrodes 2009a at end sections. In this configuration, when manufacturing the electro-optical device 2100, the same effects as Embodiment 2 are also exhibited such as being able to suppress the occurrence of a circumstance in which luminance is partially reduced in an image that is projected on the screen 2111 that is shown in FIG. 14 or the like when the element substrate 2010 is pasted together with the lens array substrate 2030 (the opposing substrate 2020) in a state that is shifted in the first direction X and the second direction Y.

Embodiment 4

Figure 24:
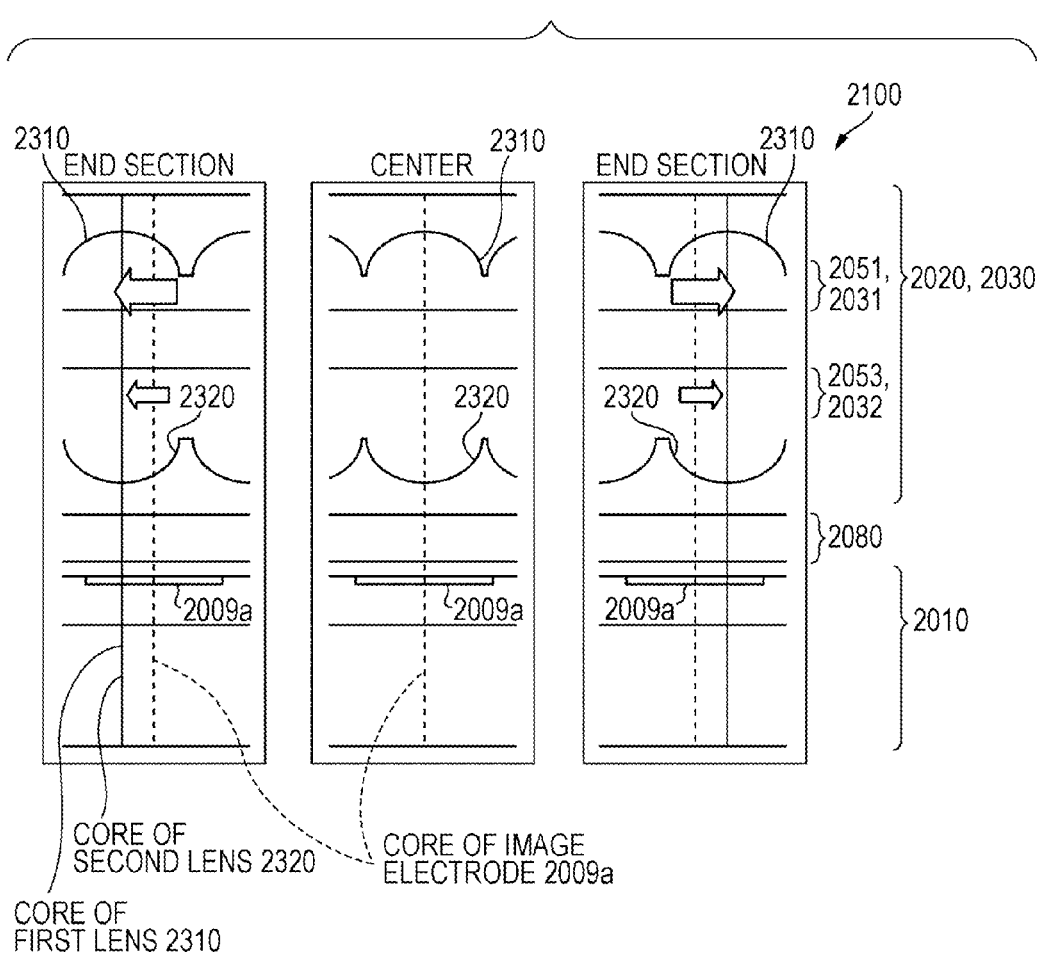
FIG. 24 is an explanatory diagram that schematically shows a cross-sectional configuration of an electro-optical device according to Embodiment 4 of the invention.

FIG. 24 is an explanatory diagram that schematically shows a cross-sectional configuration of an electro-optical device 2100 according to Embodiment 4 of the invention. In Embodiment 2, the shift amounts with respect to the pixel electrodes 2009a differed in the first lenses 2310 and the second lenses 2320 that are provided in the opposing substrate 2020, but in the present embodiment, as shown in FIG. 24, the first lenses 2310 and the second lenses 2320 that are provided in the end sections are provided on an outer side with the same shift amounts with respect to cores of the pixel electrodes 2009a. That is, in first lenses 2310 and second lenses 2320 that overlap in plan view, the third inter-core distance dE2x and the first inter-core distance dE1x, which were described with reference to FIGS. 19A, 19B and 19C are equivalent, and the fourth inter-core distance dE2y and the second inter-core distance dE1y, which were described with reference to FIGS. 19A, 19B and 19C are equivalent.

In this configuration, when manufacturing the electro-optical device 2100, the same effects as Embodiment 2 are also exhibited such as being able to suppress the occurrence of a circumstance in which luminance is partially reduced in an image that is projected on the screen 2111 that is shown in FIG. 14 or the like when the element substrate 2010 is pasted together with the lens array substrate 2030 (the opposing substrate 2020) in a state that is shifted in the first direction X and the second direction Y.

Embodiment 5

Figure 25:
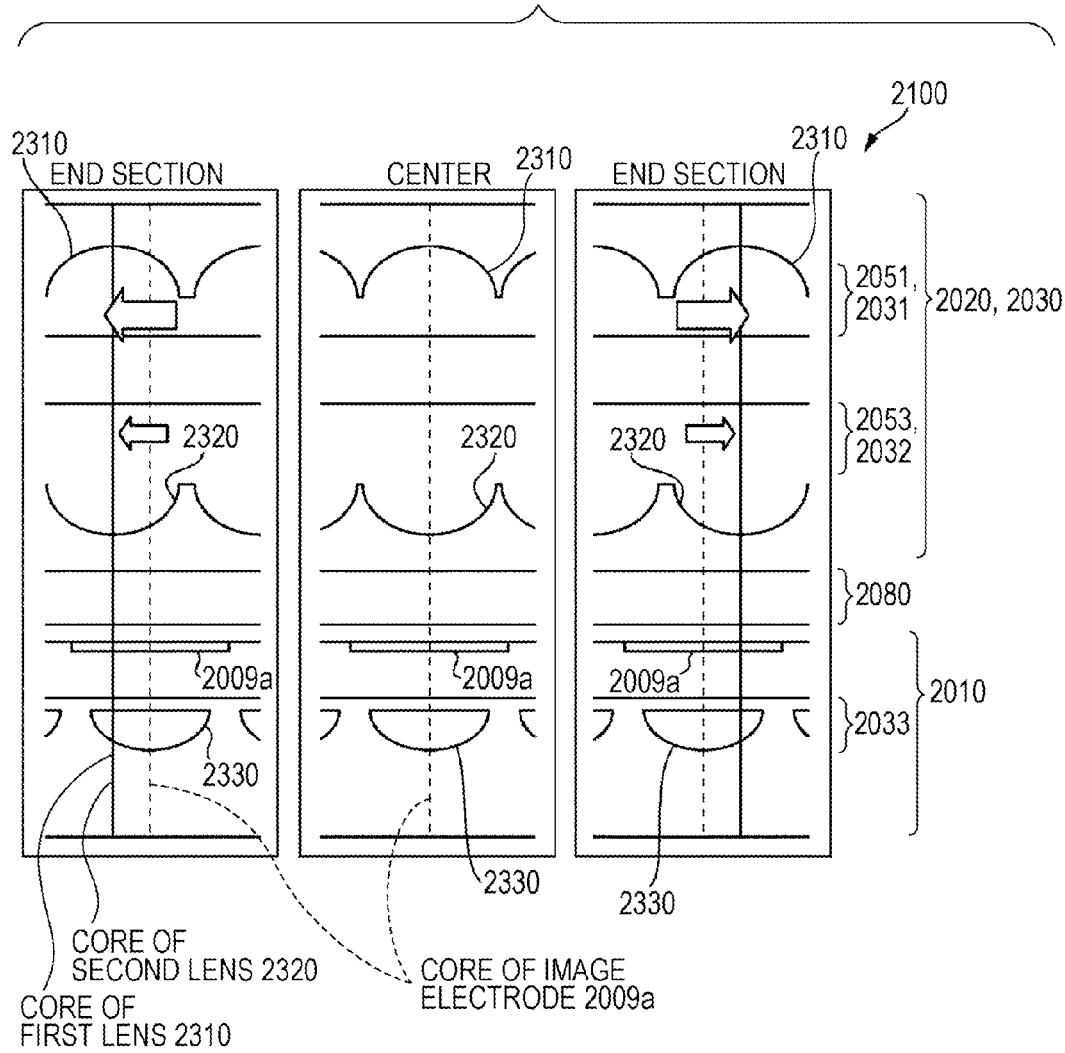
FIG. 25 is an explanatory diagram that schematically shows a cross-sectional configuration of an electro-optical device according to Embodiment 5 of the invention.

FIG. 25 is an explanatory diagram that schematically shows a cross-sectional configuration of an electro-optical device 2100 according to Embodiment 5 of the invention. As shown in FIG. 25, in the present embodiment, the first lenses 2310 and the second lenses 2320 that are provided in the end sections are provided on an outer side with the same shift amounts with respect to cores of the pixel electrodes 2009a in the same manner as Embodiment 4. In addition, the third lens array 2033, which is provided with third lenses 2330 (microlenses) opposing the pixel electrodes 2009a, is provided in the element substrate 2010 on an opposite side to the opposing substrate 2020 with respect to the pixel electrodes 2009a in the same manner as Embodiment 3. In the third lenses 2330, the cores of the pixel electrodes 2009a and the cores of the third lenses 2330 overlap in any position.

In a case of this configuration, in the same manner as Embodiment 4, the cores of the first lenses 2310 and the cores of the second lenses 2320 are shifted to an outer side by a predetermined distance from the cores of the pixel electrodes 2009a at end sections. Therefore, when manufacturing the electro-optical device 2100, the same effects as Embodiment 2 are also exhibited such as being able to suppress the occurrence of a circumstance in which luminance is partially reduced in an image that is projected on the screen 2111 that is shown in FIG. 14 or the like when the element substrate 2010 is pasted together with the lens array substrate 2030 (the opposing substrate 2020) in a state that is shifted in the first direction X and the second direction Y.

Embodiment 6

Figure 26:
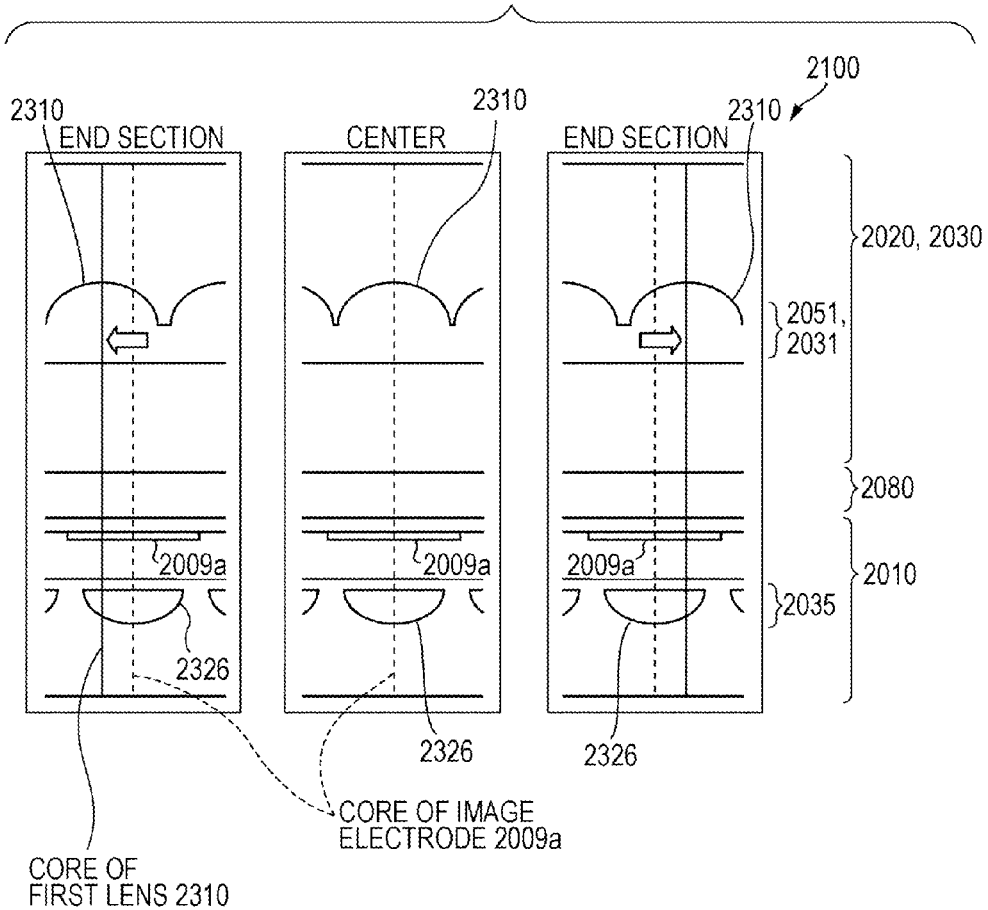
FIG. 26 is an explanatory diagram that schematically shows a cross-sectional configuration of an electro-optical device according to Embodiment 6 of the invention.

FIG. 26 is an explanatory diagram that schematically shows a cross-sectional configuration of an electro-optical device 2100 according to Embodiment 6 of the invention. In Embodiment 2, the first lenses 2310 and the second lenses 2320 were provided on the opposing substrate 2020. In the present embodiment, as shown in FIG. 26, the first lenses 2310 are provided on the opposing substrate 2020, but the second lenses 2320 are not provided. Meanwhile, a second lens layer 2035 (a microlens array), which is provided with second lenses 2326 (microlenses) opposing the pixel electrodes 2009a, is provided in the element substrate 2010 on an opposite side to the opposing substrate 2020 with respect to the pixel electrodes 2009a. In this instance, the second lenses 2326 overlap with the cores of the pixel electrodes 2009a in any position. In contrast to this, the first lenses 2310 that are provided in end sections are provided on an outer side with respect to the cores of the pixel electrodes 2009a. Therefore, when manufacturing the electro-optical device 2100, the same effects as Embodiment 2 are also exhibited such as being able to suppress the occurrence of a circumstance in which luminance is partially reduced in an image that is projected on the screen 2111 that is shown in FIG. 14 or the like when the element substrate 2010 is pasted together with the lens array substrate 2030 (the opposing substrate 2020) in a state that is shifted in the first direction X and the second direction Y.

Other Embodiments

In Embodiment 2, in the first lenses 2310, the cores of the first lenses 2310 that are provided in end sections are shifted to an outer side with respect to the cores of the pixel electrodes 2009a in both the first direction X and the second direction Y, but it may shift the cores of the first lenses 2310 that are provided in end sections to an outer side with respect to the cores of the pixel electrodes 2009a in the first direction X only. In addition, in the second lenses 2320 also, it may also shift the cores of the second lenses 2320 that are provided in end sections to an outer side with respect to the cores of the pixel electrodes 2009a in the first direction X only.

Application Example in Other Electro-Optical Devices

In the abovementioned embodiments, a liquid crystal device was given as an example of an electro-optical device, but the invention is not limited thereto, and the invention may be used in an electro-optical device or the like that uses an electrophoretic display panel.
Other Projection Type Display Devices In the abovementioned projection type display device, a transmission type electro-optical device 2100 is used, but the projection type display device may be configured using a reflection type electro-optical device 2100. In addition, in the projection type display device, a configuration in which LED light sources or the like that emit each color of light are used as a light source, and colored light that is emitted from the LED light sources is respectively supplied to separate liquid crystal devices, may be used.
Other Electronic Instruments In addition to the abovementioned electronic instrument, the electro-optical device 2100 to which the invention is applied, may be used as a direct-view type display device in electronic instruments such as a head mounted display device, a cellular phone, a PDA, a digital camera, a liquid crystal television, a car navigation system, a video telephone, a POS terminal, and a touch panel.

Embodiment 7

An embodiment of the invention will be described with reference to the drawings. Additionally, in the figures that are referenced in the following description, the scaling for each layer and each member are made different in order to set each layer and each member to a size of an extent that is recognizable in the drawings. In addition, in the following description, description will be given with one direction among two directions that mutually intersect one another in a surface direction of the electro-optical device 3100, set as the first direction X and the other direction set as the second direction Y.

Configuration of Projection Type Display Device

Figure 28:
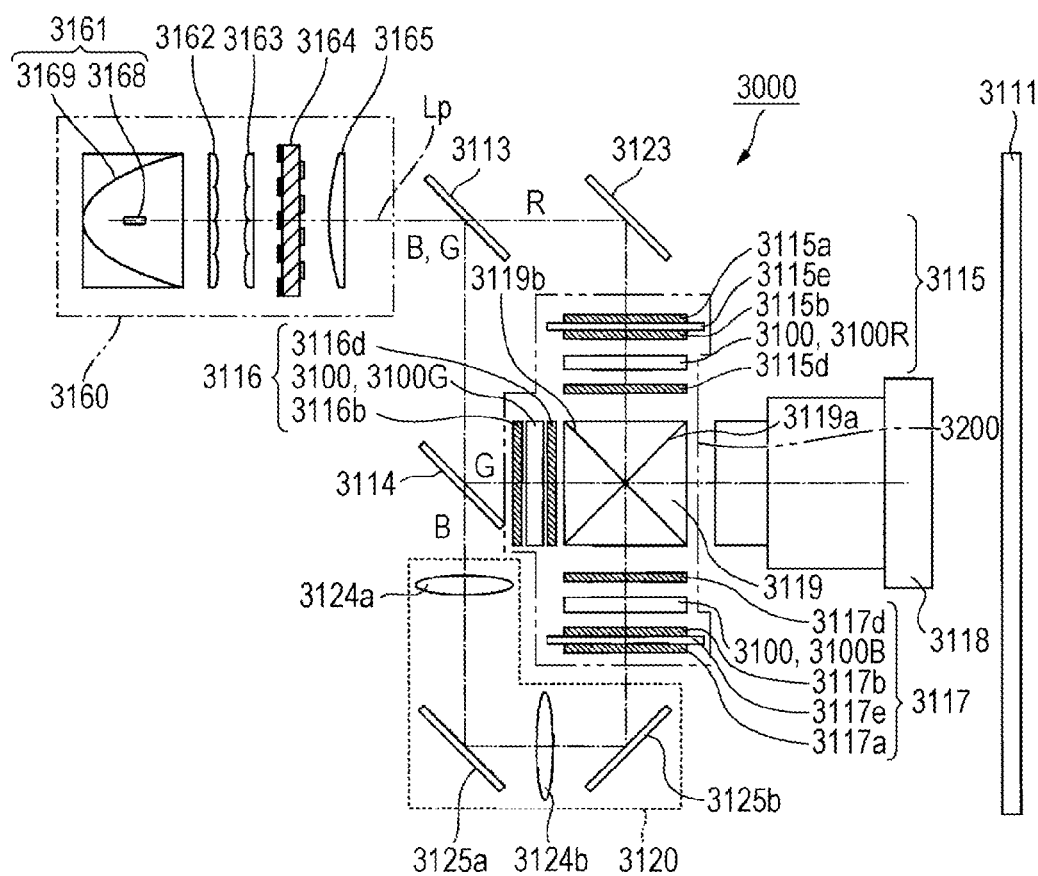
FIG. 28 is a schematic configuration diagram of an aspect of a projection type display device (an electronic instrument) that uses an electro-optical device in which the present invention is applied.

FIG. 28 is a schematic configuration diagram of an aspect of a projection type display device 3000 (an electronic instrument) that uses the electro-optical device 3100 in which the present invention is applied. Additionally, a plurality of electro-optical devices 3100 to which mutually different wavelengths of light are supplied, are used in the following description, but the electro-optical device 3100 in which the invention is applied is used in all of the electro-optical devices 3100.

The projection type display device 3000 that is shown in FIG. 28 is a liquid crystal projector that uses a transmission type electro-optical device 3100, and displays images by irradiating a target projection member that is formed from a screen 3111 or the like, with light. The projection type display device 3000 includes an illumination device 3160, a plurality of electro-optical devices 3100 (liquid crystal light bulbs 3115 to 3117) to which light that is emitted from the illumination device 3160 is provided, a cross dichroic prism 3119 (a color synthesis optical system) that emits by synthesizing light that is emitted from the plurality of electro-optical devices 3100, and the projection optical system 3118, which projects light that is synthesized by the cross dichroic prism 3119, along a device optical axis Lp. In addition, the projection type display device 3000 is provided with dichroic mirrors 3113 and 3114, and a relay system 3120. In the projection type display device 3000, the electro-optical devices 3100 and the cross dichroic prism 3119 configure an optical unit 3200.

In the illumination device 3160, a light source section 3161, a first integrator lens 3162 that is formed from a lens array such as a fly-eye lens, a second integrator lens 3163 that is formed from a lens array such as a fly-eye lens, the polarized light conversion element 3164 and the condenser lens 3165 are arranged in order along the device optical axis Lp. The light source section 3161 is provided with a light source 3168 that emits white light that includes red light R, green light G and blue light B, and a reflector 3169. The light source 3168 is configured by an ultrahigh pressure mercury lamp or the like, and the reflector 3169 has a parabolic cross section. The first integrator lens 3162 and the second integrator lens 3163 homogenize an illumination distribution of light that is emitted from the light source section 3161. The polarized light conversion element 3164 converts light that is emitted from the light source section 3161 into polarized light that has a specific vibration direction such as s polarized light, for example.

The dichroic mirror 3113 transmits red light R that is included in the light that is emitted from the illumination device 3160, and reflects green light G and blue light B. The dichroic mirror 3114 transmits blue light B among the green light G and the blue light B that is reflected by the dichroic mirror 3113, and reflects green light G. In this manner, the dichroic mirrors 3113 and 3114 configure a color separation optical system that separates light that is emitted from the illumination device 3160 into red light R, green light G, and blue light B.

The liquid crystal light bulb 3115 is a transmission type liquid crystal device that modulates the red light R that is transmitted through the dichroic mirror 3113 and reflected by a reflective mirror 3123 depending on an image signal. The liquid crystal light bulb 3115 is provided with a $\lambda/2$ phase difference plate 3115a, a first polarized light plate 3115b, the electro-optical device 3100 (a electro-optical device for red light 3100R), and a second polarized light plate 3115d. In this instance, since the polarization of the light does not change even if transmitted through the dichroic mirror 3113, the red light R that is incident to the liquid crystal light bulb 3115 is still s polarized light.

The $\lambda/2$ phase difference plate 3115a is an optical element that converts the s polarized light that is incident to the liquid crystal light bulb 3115 into p polarized light. The first polarized light plate 3115b is a polarized light plate that blocks the s polarized light and transmits the p polarized light. The electro-optical device 3100 (the electro-optical device for red light 3100R) has a configuration that converts the p polarized light into s polarized light (circular polarization light or elliptical polarized light if halftone) depending on modulation that corresponds to an image signal. The second polarized light plate 3115d is a polarized light plate that blocks the p polarized light and transmits the s polarized light. Therefore, the liquid crystal light bulb 3115 modulates red light R depending on an image signal, and emits modulated red light R toward the cross dichroic prism 3119. The $\lambda/2$ phase difference plate 3115a and the first polarized light plate 3115b are disposed in states of coming into contact with a translucent glass substrate 3115e, which does not convert polarized light, and therefore, it is possible to avoid distortion due to the $\lambda/2$ phase difference plate 3115a and the first polarized light plate 3115b emitting heat.

The liquid crystal light bulb 3116 is a transmission type liquid crystal device that modulates the green light G that is reflected by the dichroic mirror 3114 after being reflected by the dichroic mirror 3113 depending on an image signal. In a similar manner to the liquid crystal light bulb 3115, the liquid crystal light bulb 3116 is provided with a first polarized light plate 3116b, the electro-optical device 3100 (a electro-optical device for green light 3100G), and a second polarized light plate 3116d. The green light G that is incident to the liquid crystal light bulb 3116 is the incident s polarized light that is reflected by the dichroic mirrors 3113 and 3114. The first polarized light plate 3116b is a polarized light plate that blocks the p polarized light and transmits the s polarized light. The electro-optical device 3100 (the electro-optical device for green light 3100G) has a configuration that converts the s polarized light into p polarized light (circular polarization light or elliptical polarized light if halftone) depending on modulation that corresponds to an image signal. The second polarized light plate 3116d is a polarized light plate that blocks the s polarized light and transmits the p polarized light. Therefore, the liquid crystal light bulb 3116 modulates green light G depending on an image signal, and emits modulated green light G toward the cross dichroic prism 3119.

The liquid crystal light bulb 3117 is a transmission type liquid crystal device that modulates the blue light B that has passed the relay system 3120 after being reflected by the dichroic mirror 3113 and transmitted through the dichroic mirror 3114 depending on an image signal. In a similar manner to the liquid crystal light bulbs 3115 and 3116, the liquid crystal light bulb 3117 is provided with a $\lambda/2$ phase difference plate 3117a, a first polarized light plate 3117b, the electro-optical device 3100 (a electro-optical device for blue light 3100B), and a second polarized light plate 3117d. Since the blue light B that is incident to the liquid crystal light bulb 3117 is reflected by two reflective mirrors 3125a and 3125b of the relay system 3120 after being reflected by the dichroic mirror 3113 and transmitted through the dichroic mirror 3114, the blue light B is s polarized light.

The $\lambda/2$ phase difference plate 3117a is an optical element that converts the s polarized light that is incident to the liquid crystal light bulb 3117 into p polarized light. The first polarized light plate 3117b is a polarized light plate that blocks the s polarized light and transmits the p polarized light. The electro-optical device 3100 (the electro-optical device for blue light 3100B) has a configuration that converts the p polarized light into s polarized light (circular polarization light or elliptical polarized light if halftone) depending on modulation that corresponds to an image signal. The second polarized light plate 3117d is a polarized light plate that blocks the p polarized light and transmits the s polarized light. Therefore, the liquid crystal light bulb 3117 modulates blue light B depending on an image signal, and emits modulated blue light B toward the cross dichroic prism 3119. Additionally, the λ/2 phase difference plate 3117a and the first polarized light plate 3117b are disposed in states of coming into contact with a glass substrate 3117e.

The relay system 3120 is provided with relay lenses 3124a and 3124b, and the reflective mirrors 3125a and 3125b. The relay lenses 3124a and 3124b are provided in order to prevent optical loss that is caused by an optical path of the blue light B being long. The relay lens 3124a is disposed between the dichroic mirror 3114 and the reflective mirror 3125a. The relay lens 3124b is disposed between the reflective mirrors 3125a and 3125b. The reflective mirror 3125a reflects blue light B that is transmitted through the dichroic mirror 3114 and emitted from the relay lens 3124a, toward the relay lens 3124b. The reflective mirror 3125b reflects blue light B that is emitted from the relay lens 3124b, toward the liquid crystal light bulb 3117.

The cross dichroic prism 3119 is a color synthesis optical system in which two dichroic films 3119a and 3119b are orthogonally arranged in an X shape. The dichroic film 3119a is a film that reflects blue light B and transmits green light G, and the dichroic film 3119b is a film the reflects red light R and transmits green light G. Therefore, the cross dichroic prism 3119 synthesizes the red light R, the green light G and the blue light B that was respectively modulated in the liquid crystal light bulbs 3115 to 3117, and emits to the projection optical system 3118.

Additionally, light that is incident to the cross dichroic prism 3119 from the liquid crystal light bulbs 3115 and 3117 is s polarized light, and light that is incident to the cross dichroic prism 3119 from the liquid crystal light bulb 3116 is p polarized light. In this manner, by configuring so that light that is incident to the cross dichroic prism 3119 is different kinds of polarized light, it is possible to synthesize light that is incident from each of the liquid crystal light bulbs 3115 to 3117 in the cross dichroic prism 3119. In this instance, normally, the dichroic films 3119a and 3119b have excellent reflective characteristics of s polarized light. Therefore, the red light R and the blue light B that is reflected by the dichroic films 3119a and 3119b is set as s polarized light, and the green light G that is transmitted through the dichroic films 3119a and 3119b is set as p polarized light. The projection optical system 3118 includes a projection lens (not illustrated), and light that is synthesized by the cross dichroic prism 3119 is projected onto a target projection member such as the screen 3111.

Incidence Angle Characteristics of Illumination Light to Electro-Optical Devices 3100

Figure 29:
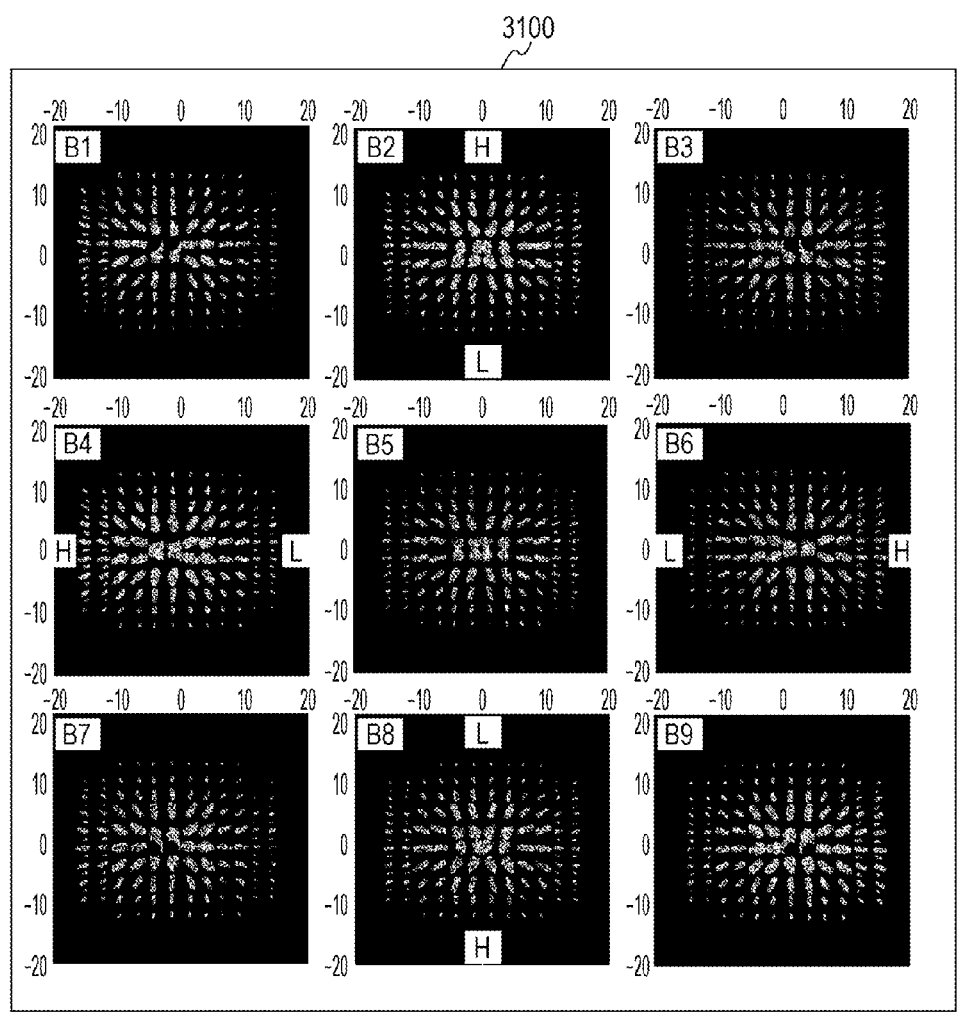
FIG. 29 is an explanatory diagram that shows an example of incidence angle characteristics of illumination light to the electro-optical device in the projection type display device that is shown in FIG. 28.

FIG. 29 is an explanatory diagram that shows an example of incidence angle characteristics of illumination light to the electro-optical devices 3100 in the projection type display device 3000 that is shown in FIG. 28. Additionally, in FIG. 29, in each incidence direction, a direction in which optical intensity is high is shown with a larger white region, and an "H" is applied to a side on which light intensity is high, and an "L" is applied to a side on which light intensity is low.

Figure 44:
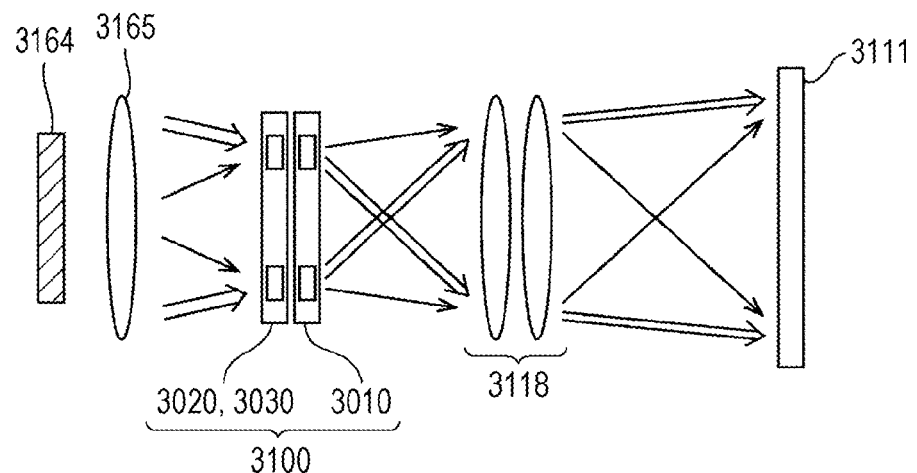
FIG. 44 is an explanatory diagram of light that is incident to an electro-optical device.

In the projection type display device 3000 that is shown in FIG. 28, in the manner described with reference to FIG. 44, among the light that the electro-optical devices 3100 are irradiated with, the intensity of light that is incident to the electro-optical devices 3100 in an oblique manner from the outer side is higher than that of light that is incident in an oblique manner from the inner side. For example, as shown in FIG. 29, there is a deviation in the incidence angle distribution of the incidence light to each position B1 to B9 of the electro-optical devices 3100, and the intensity of light that is incident to the electro-optical devices 3100 in an oblique manner from the outer side is higher than that of light that is incident to the electro-optical devices 3100 in an oblique manner from the inner side. Therefore, at a position B5 in the center of the electro-optical device 3100, illumination light is incident with an intensity that has lateral symmetry and vertical symmetry toward the drawing, but at positions B1 to B4 and B6 to B9 that are close to end sections, the intensity of light that is incident from the outer side is higher than the intensity of light that is incident from the inner side in a left-right and up-down manner toward the drawing.

Figure 45:
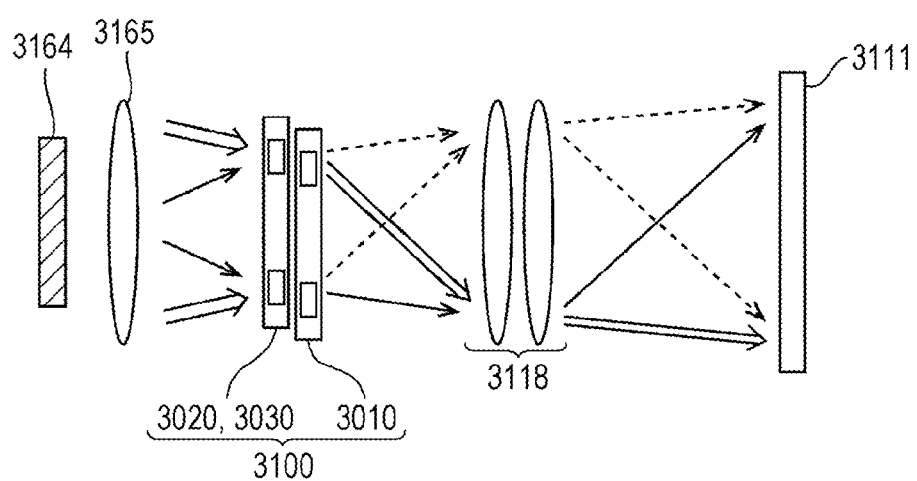
FIG. 45 is an explanatory diagram that shows an effect of positional shift between a first substrate and a second substrate.

In the invention, the electro-optical devices 3100 are configured in the manner described below with the aim of suppressing the luminance unevenness of images even if the positional shift between the second substrate 3020 and the first substrate 3010 that was described with reference to FIG. 45 is generated in a state in which there is unevenness in the abovementioned incidence angle distribution.

Overall Configuration of Electro-Optical Devices 3100

Figure 30:
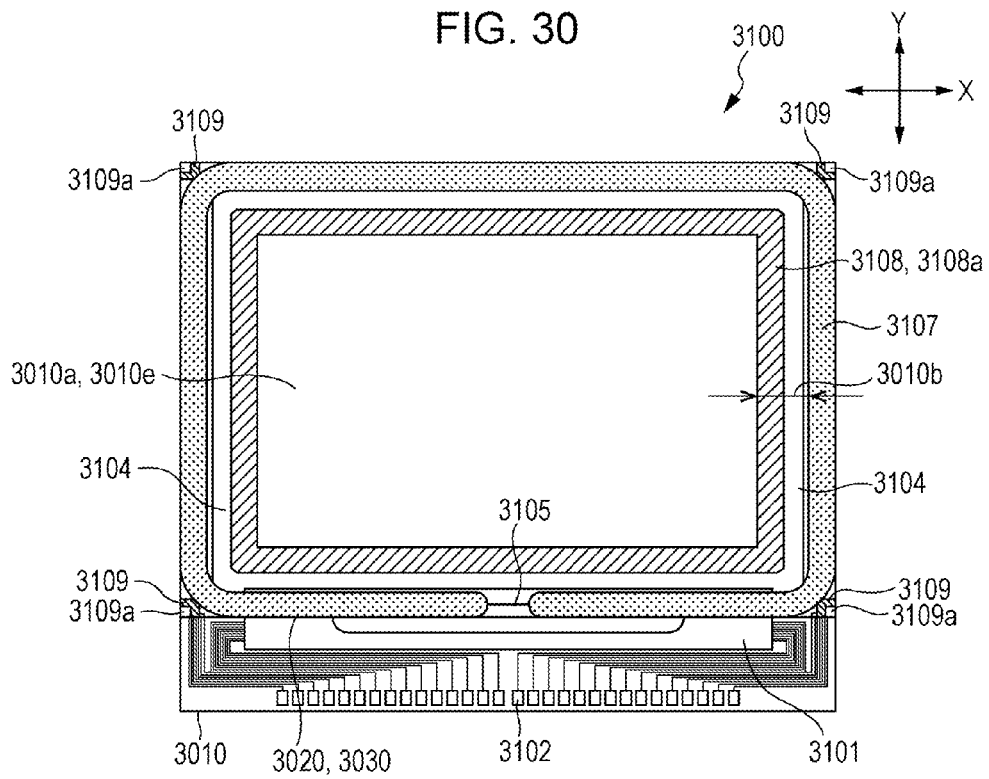
FIG. 30 is a plan view of an electro-optical device according to Embodiment 7 of the invention.
Figure 31:
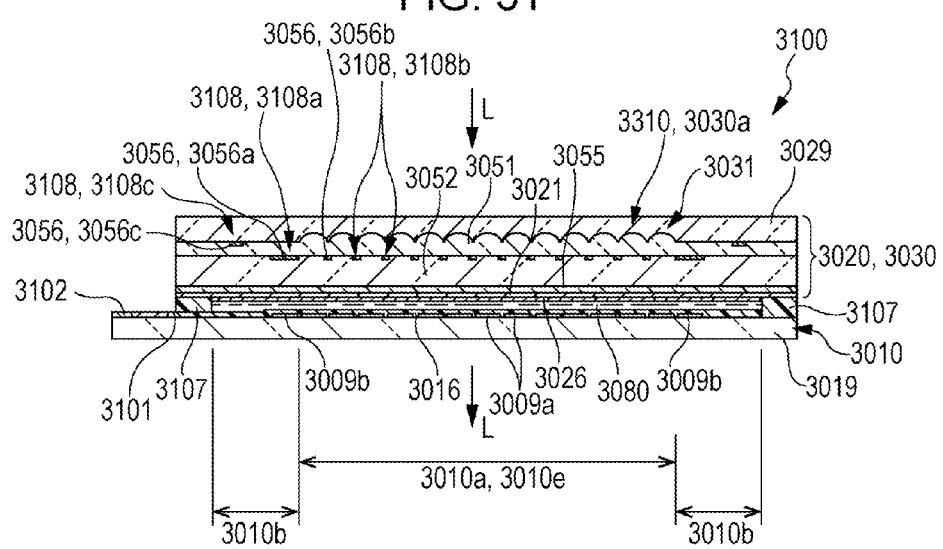
FIG. 31 is a cross-sectional view of the electro-optical device that is shown in FIG. 30.

FIG. 30 is a plan view of an electro-optical device 3100 according to Embodiment 7 of the invention. FIG. 31 is a cross-sectional view of the electro-optical device 3100 that is shown in FIG. 30.

As shown in FIGS. 30 and 31, in the electro-optical device 3100, the translucent first substrate 3010 and the translucent second substrate 3020 are pasted together with a predetermined interval using a sealing material 3107, and an electro-optical layer 3080 that is formed from a liquid crystal layer is disposed between the first substrate 3010 and the second substrate 3020 in a region that is surrounded by the sealing material 3107. The sealing material 3107 is provided in frame form so as to run along the outer edge of the second substrate 3020. The sealing material 3107 is an adhesive that has a photosetting property or an adhesive that has a photosetting property and a thermosetting property, and a gap material such as glass fiber or glass beads for setting a distance between the substrates to a predetermined value is mixed in with the sealing material 3107. As the sealing material 3107, it is possible to use a photosetting adhesive (an ultraviolet light curable adhesive or a UV curable adhesive) such as an acrylic resin-based photosetting adhesive, an epoxy resin-based photosetting adhesive, an acrylic-modified resin-based photosetting adhesive, or an epoxy-modified-based photosetting adhesive.

The first substrate 3010 and the second substrate 3020 are both rectangular, and a display region 3010a is provided in a substantial center of the electro-optical device 3100 as a rectangular region. The sealing material 3107 is also provided in a substantially rectangular form to correspond to the abovementioned shape, and a rectangular frame form peripheral region 3010b is provided between an inner peripheral edge of the sealing material 3107 and an outer peripheral edge of the display region 3010a. In the present embodiment, the display region 3010a is an oblong form in which the size in the first direction X is larger than the size in the second direction Y. In this instance, the sizes of the first substrate 3010 and the second substrate 3020 in the first direction X are equivalent, but a form in which the size of the first substrate 3010 in the first direction X is larger than the size of the second substrate 3020 in the first direction X, or a form in which the size of the first substrate 3010 in the first direction X is smaller than the size of the second substrate 3020 in the first direction X, may be adopted.

A data line driving circuit 3101 and a plurality of terminals 3102 are formed along a side of the first substrate 3010 on an outer side of the display region 3010a on a surface of a second substrate 3020 side of the first substrate 3010, and a scanning line driving circuit 3104 is formed along other sides that are adjacent to the side. A flexible wiring substrate (not illustrated) is connected to the terminals 3102, and various potentials and various signals are input to the first substrate 3010 through the flexible wiring substrate.

In addition, translucent pixel electrodes 3009a that are formed from an ITO (Indium Tin Oxide) film or the like, and pixel transistors (not illustrated), which are electrically connected to the pixel electrodes 3009a, are formed in matrix form in the display region 3010a on a surface of the second substrate 3020 side of the first substrate 3010. Accordingly, in the manner described below with reference to FIG. 35, the display region 3010a is formed from a pixel electrode arrangement region 3010e in which a plurality of pixel electrodes 3009a are arranged along the first direction X and the second direction Y, which intersects the first direction X. An alignment film 3016 is formed on a second substrate 3020 side to correspond to the pixel electrodes 3009a. In addition, a dummy pixel electrode 3009b, which is formed at the same time as the pixel electrodes 3009a, is formed on the first substrate 3010 in the peripheral region 3010b.

A translucent common electrode 3021 that is formed from an ITO film or the like is formed on a surface side of the second substrate 3020 that is opposite to the first substrate 3010, and an alignment film 3026 is formed on the first substrate 3010 side to correspond to the common electrode 3021. In the present embodiment, the common electrode 3021 is formed over substantially the entire surface of the second substrate 3020.

The alignment films 3016 and 3026 are formed from a resin film such as a polyimide or an oblique vapor deposition film such as a silicon oxide film. In the present embodiment, the alignment films 3016 and 3026 are inorganic alignment films (vertical alignment films) that are formed from oblique vapor deposition films such as SiOx (x<2), $SiO_2$, $TiO_2$, MgO, $Al_2O_3$, $In_2O_3$, $Sb_2O_3$, and $Ta_2O_5$, and cause the electro-optical device 3100 to act as a VA (Vertical Alignment) mode liquid crystal device by performing inclined alignment of liquid crystal molecules, which have negative dielectric anisotropy, and are used in the electro-optical layer 3080.

An inter-substrate conduction electrode 3109 for electrically conducting between the first substrate 3010 and the second substrate 3020, is formed on the first substrate 3010 further on the outer side than the sealing material 3107 in a region that overlaps with a corner portion of the second substrate 3020. An inter-substrate conduction material 3109a, which includes conductive particles, is disposed in the inter-substrate conduction electrode 3109, and the common electrode 3021 of the second substrate 3020 is electrically connected to the first substrate 3010 side through the inter-substrate conduction material 3109a and the inter-substrate conduction electrode 3109. Therefore, in the common electrode 3021, a common potential is applied from the first substrate 3010 side.

In the electro-optical device 3100 of the present embodiment, the pixel electrode 3009a and the common electrode 3021 are formed by translucent conductive films, and the electro-optical device 3100 is configured as a transmission type liquid crystal device. In the electro-optical device 3100, images are displayed as a result of light that is incident from a substrate of one side, among the first substrate 3010 and the second substrate 3020, being modulated in a period between being transmitted through the substrate of the other side and emitted. In the present embodiment, as shown by an arrow L, images are displayed as a result of light that is incident from the second substrate 3020 being modulated by the electro-optical layer 3080 for each pixel in a period between being transmitted through the first substrate 3010 and emitted.

Configuration of Second Substrate 3020

Figure 32:
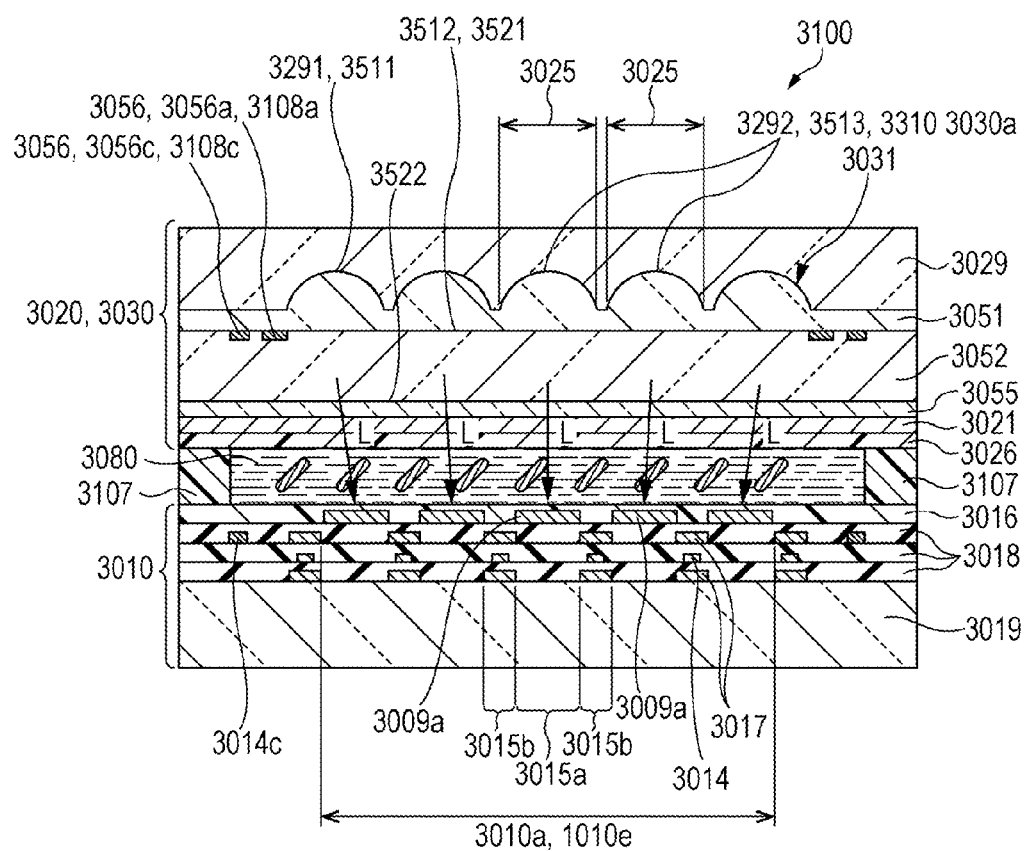
FIG. 32 is an explanatory diagram that schematically shows a cross-sectional configuration of lenses and the like in the electro-optical device that is shown in FIG. 31.
Figure 33:
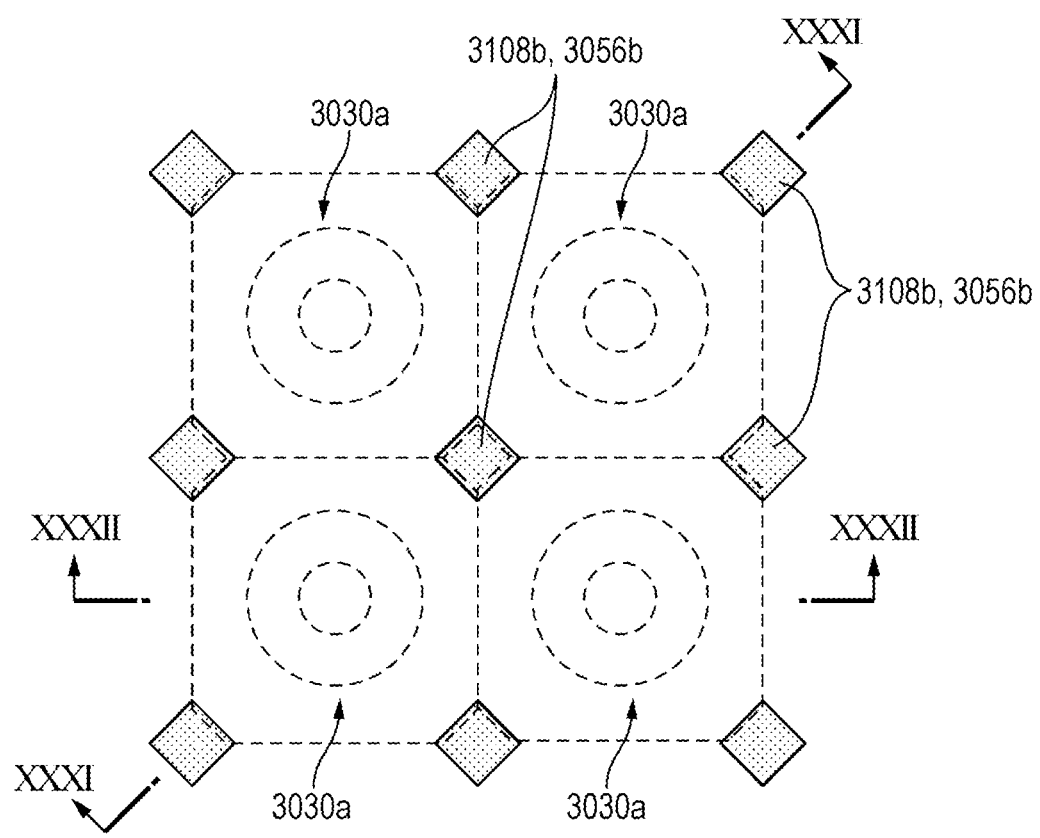
FIG. 33 is an explanatory diagram that shows an example of a planar positional relationship between lenses and light shielding layers in the electro-optical device that is shown in FIG. 31.

FIG. 32 is an explanatory diagram that schematically shows a cross sectional configuration of lenses 3310 and the like in the electro-optical device 3100 that is shown in FIG. 31. FIG. 33 is an explanatory diagram that shows a planar positional relationship between lenses and light shielding layers 3108b in the electro-optical device 3100 that is shown in FIG. 31.

As shown in FIG. 31, in the electro-optical device 3100 of the present embodiment, a light shielding layer 3108 that has a light shielding property and is formed from a metal or a metal compound is formed on the second substrate 3020. The light shielding layer 3108 is, for example, formed as frame form boundaries 3108a that extend along the outer peripheral edge of the display region 3010a. In addition, the light shielding layer 3108 is formed as the light shielding layers 3108b in regions that overlap in plan view with regions that are interposed between adjacent pixel electrodes 3009a. Furthermore, the light shielding layer 3108 is formed as alignment marks 3108c on an outer side of the display region 3010a.

As shown in FIG. 32, the first substrate 3010 includes a translucent substrate 3019 and a plurality of interlayer insulation films 3018 are laminated onto a surface of the second substrate 3020 side of the translucent substrate 3019. In addition, in the first substrate 3010, wiring 3017, which extends along a region that overlaps with space between adjacent pixel electrodes 3009a, and a pixel transistor 3014 are formed using space between the translucent substrate 3019 and the interlayer insulation films 3018, and space between the interlayer insulation films 3018, and the wiring 3017 and the pixel transistor 3014 do not transmit light. Therefore, in the first substrate 3010, among regions that overlap with the pixel electrodes 3009a in plan view, regions that overlap with the wiring 3017 and the pixel transistor 3014 in plan view, and regions that overlap with regions that are interposed between adjacent pixel electrodes 3009a in plan view form light shielding regions 3015b, which do not transmit light, and among regions that overlap with the pixel electrodes 3009a in plan view, regions that do not overlap with the wiring 3017 and the pixel transistor 3014 in plan view form opening regions 3015a, which transmit light. Therefore, only light that is transmitted through the opening regions 3015a contributes to the display of images, and light that runs toward the light shielding regions 3015b does not contribute to the display of images. In the present embodiment, first substrate side alignment marks 3014c are formed by the light shielding layer that configures the data lines wiring 3017 and the pixel transistor 3014.

A plurality of optical elements 3025 such as focusing elements, which focus incidence light, black matrices, which shield a portion of incidence light, and color filters, which transmit light of a portion of wavelengths among incidence light, are formed in the second substrate 3020. The plurality of optical elements 3025 are arranged so as to respectively correspond to the plurality of pixel electrodes 3009a. In the present embodiment, the second substrate 3020 is configured as the lens array substrate 3030, and a lens array 3031 (a first lens array), which is provided with a plurality of lenses 3310 as focusing elements 3030a, is formed on the second substrate 3020 (the lens array substrate 3030) in the display region 3010a (the pixel electrode arrangement region 3010e). The plurality of lenses 3310 respectively oppose the plurality of pixel electrodes 3009a. Accordingly, an arrangement region of the plurality of lenses 3310 (the optical elements 3025) overlaps with the pixel electrode arrangement region 3010e. The plurality of lenses 3310 respectively configure the optical elements 3025 that focus light from a light source onto the opening regions 3015a of the first substrate 3010, and light that is incident to the electro-optical layer 3080 is collimated. For this reason, since inclination in an optical axis of light that is incident to the electro-optical layer 3080 is small, it is possible to reduce phase shift in the electro-optical layer 3080, and therefore, it is possible to suppress deteriorations in transmittance and contrast. In particular, in the present embodiment, since the electro-optical device 3100 is configured as a VA (Vertical Alignment) mode liquid crystal device, it is easy for deteriorations in contrast and the like to be generated as a result of inclinations in the optical axis of light that is incident to the electro-optical layer 3080, but according to the present embodiment, it is difficult for deteriorations in contrast and the like to be generated.

In this instance, as shown in FIG. 33, the lenses 3310 are arranged so that adjacent lenses 3310 come into contact with one another, and the light shielding layers 3108b that are shown in FIG. 31 are formed in regions that overlap in plan view with regions that are surrounded by four lenses 3310. Therefore, in the cross-section of a XXXI-XXXI line in FIG. 33, the light shielding layers 3108b are represented as shown in FIG. 31, but in the cross-section of a XXXII-XXXII line in FIG. 33, the light shielding layers 3108b are not represented as shown in FIG. 32. Additionally, there are cases in which the light shielding layers 3108b overlap with end sections of the lenses 3310 in plan view, but the light shielding layers 3108b are formed so as to not overlap with the centers of the lenses 3310.

As shown in FIG. 32, when configuring the lens array substrate 3030 (the second substrate 3020), a plurality of concave sections 3292 that are formed from concave curved surfaces are formed on a substrate surface 3291 a translucent substrate 3029. The plurality of concave sections 3292 overlap with the plurality of pixel electrodes 3009a in plan view with a one-to-one relationship. In addition, a translucent lens layer 3051 (a first lens layer), a translucent layer 3052 (a first translucent layer), and a translucent protective layer 3055 are laminated in order on the substrate surface 3291 of the translucent substrate 3029. The lens layer 3051 is provided with a surface 3511 that covers the substrate surface 3291 of the translucent substrate 3029, and a flat surface 3512 that is positioned on an opposite side to the surface 3511. In addition, the surface 3511 of the lens layer 3051 includes hemispherical convex sections 3513 buried in the concave sections 3292 of the translucent substrate 3029. A refractive index differs between the translucent substrate 3029 and the lens layer 3051, and the concave sections 3292 and the convex sections 3513 configure the lenses 3310 of the lens array 3031. In the present embodiment, the refractive index of the lens layer 3051 is greater than the refractive index of the translucent substrate 3029. For example, in contrast to the translucent substrate 3029 being formed from a quartz substrate (a silicon oxide film, $SiO_2$), and having a refractive index of 1.48, the lens layer 3051 is formed from a silicon oxynitride film (SiON), and has a refractive index of 1.58 to 1.68. For this reason the lenses 3310 have a power of focusing light from a light source.

The translucent layer 3052 is provided with a surface 3521 that covers the flat surface 3512 of the lens layer 3051, and a surface 3522 that is positioned on an opposite side to the surface 3521. In the present embodiment, the translucent layer 3052 is formed from a silicon oxide film ($SiO_x$), and has a refractive index of 1.48. The translucent layer 3052 is an optical path length adjustment layer that adjusts the optical path length from the lens array 3031 to the first substrate 3010. The protective layer 3055 of a silicon oxide film ($SiO_x$), a silicon oxynitride film (SiON) or the like is formed on the surface 3522 of the translucent layer 3052, and the common electrode 3021 is formed on an opposite side to the translucent substrate 3029 with respect to the protective layer 3055. In addition, the alignment film 3026 is formed on an opposite side to the protective layer 3055 and the translucent substrate 3029 with respect to the common electrode 3021.

Detailed Configuration of Light Shielding Layer 3108

In the second substrate 3020, the light shielding layer 3108 (the boundaries 3108a, the light shielding layers 3108b and the alignment marks 3108c) is, for example, configured by a metal layer 3056 that is formed between layers of the abovementioned translucent films. More specifically, in the second substrate 3020, as the frame shaped boundaries 3108a that extend along the outer peripheral edge of the display region 3010a, boundaries 3056a, which are formed from the metal layer 3056, are formed between the flat surface 3512 of the lens layer 3051 and the surface 3521 of the translucent layer 3052. In addition, as the light shielding layers 3108b, light shielding layers 3056b, which are formed from the metal layer 3056, are formed in the display region 3010a. Furthermore, as alignment marks 3056c, second substrate side alignment marks 3056c, which are formed from the metal layer 3056, are formed on the outer side of the display region 3010a.

In the present embodiment, the light shielding layer 3108 (the metal layer 3056) is respectively formed from a metal film of titanium (Ti), aluminum (Al), chromium (Cr), tungsten (W), tantalum (Ta), molybdenum (Mo), palladium (Pd) or the like, or a metal compound film of a nitride film or the like of one of these. In addition, the light shielding layer 3108 may be a single layered film or a multilayered film of the abovementioned metal films or metal compound films.

Layout of the Optical Elements 3025 and the Like

Figure 34:
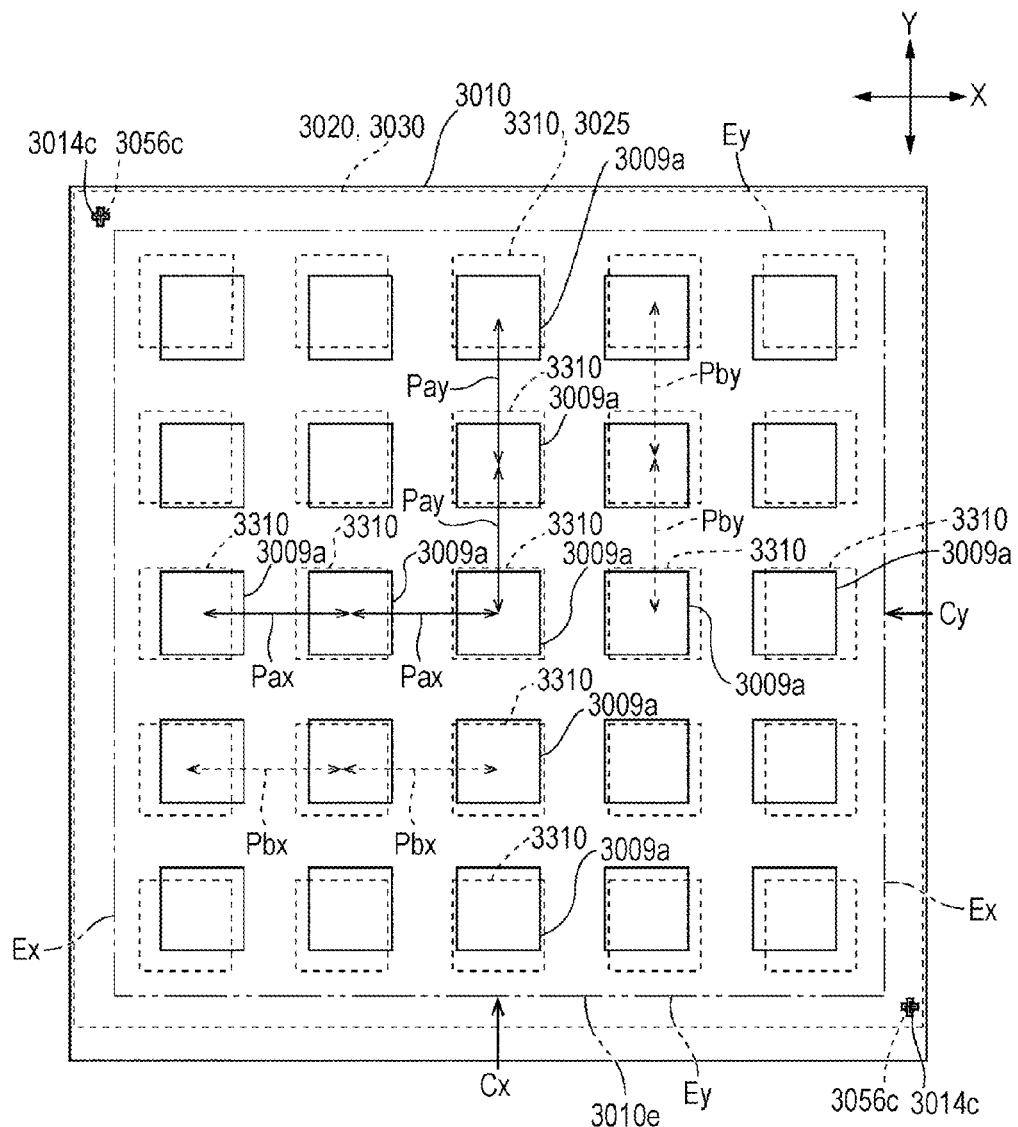
FIG. 34 is a plan view that schematically shows a layout and the like of lenses in the electro-optical device according to Embodiment 7 of the invention.
Figure 35:
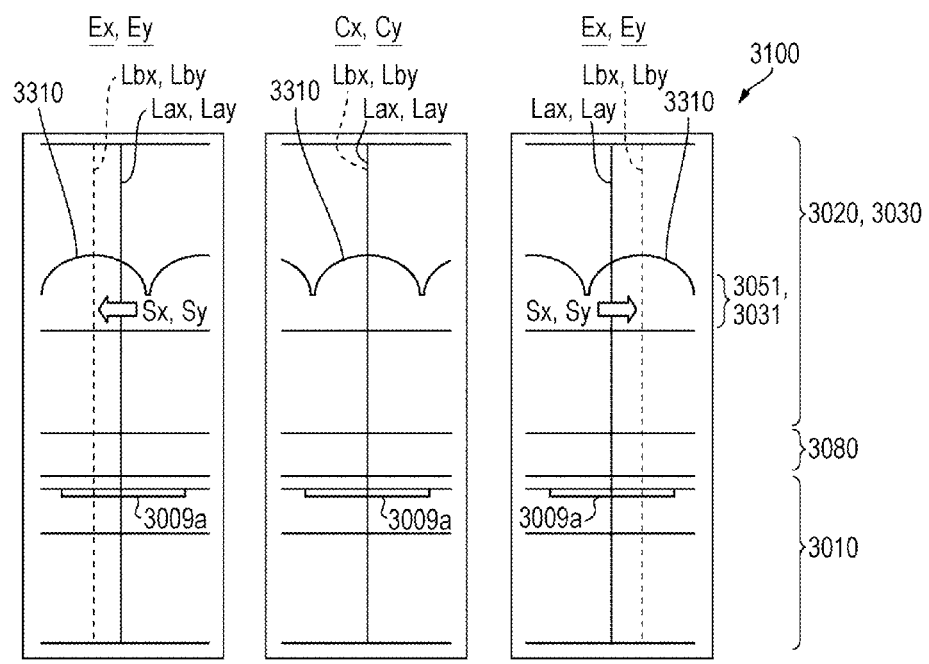
FIG. 35 is a cross-sectional view that schematically shows a positional relationship between lenses and pixel electrodes in the electro-optical device according to Embodiment 7 of the invention.

FIG. 34 is a plan view that schematically shows a layout and the like of lenses 3310 in the electro-optical device 3100 according to Embodiment 7 of the invention. FIG. 35 is a cross-sectional view that schematically shows a positional relationship between lenses 3310 and pixel electrodes 3009a in the electro-optical device 3100 according to Embodiment 7 of the invention. Additionally, in FIG. 34, the number of the plurality of pixel electrodes 3009a is reduced and a total of 25 pixel electrodes 3009a are shown. In addition, in the following description, the cores of the lenses 3310 refer to cores of summit sections of convex sections that configure lens surfaces, and cores of bottom sections of concave sections. In addition, in FIG. 34, the first substrate 3010 and the pixel electrodes 3009a are shown with solid lines, and the second substrate 3020 and the optical elements 3025 (the lenses 3310) are shown with dotted lines.

As shown in FIG. 34, in the electro-optical device 3100 of the present embodiment, the plurality of pixel electrodes 3009a are arranged in the first direction X of the first substrate 3010 so that all of the inter-core distances in the first direction X of two pixel electrodes 3009a that are adjacent in the first direction X are a first pitch Pax. In addition, the widths in the first direction X of the plurality of pixel electrodes 3009a are equivalent.

The plurality of lenses 3310 (the optical elements 3025) are arranged in the first direction X of the second substrate 3020 so that all of the inter-core distances in the first direction X of two lenses 3310 (the optical elements 3025) that are adjacent in the first direction X are a second pitch Pbx. In addition, the widths in the first direction X of the plurality of lenses 3310 are equivalent, and the widths in the first direction X of the pixel electrodes 3009a are the same as the widths in the first direction X of the lenses 3310 (the optical elements 3025).

In this instance, the second pitch Pbx is longer than the first pitch Pax. In addition, the cores in the first direction X of the pixel electrodes 3009a and the cores in the first direction X of the lenses 3310 overlap at a centre Cx in the first direction X. Therefore, as shown in FIGS. 34 and 35, among the plurality of lenses 3310, the cores (refer to the dotted line Lbx in FIG. 35) of the lenses 3310 that are positioned on a first end section Ex, which is an end section in the first direction X of the pixel electrode arrangement region 3010e are shifted further to an outer side (a direction that is shown by an arrow Sx in FIG. 35) in the first direction X than the cores (refer to the solid line Lax in FIG. 35) of the pixel electrodes 3009a, among the plurality of pixel electrodes 3009a, that are positioned on the first end section Ex side. In addition, a shift amount to the outer side in the first direction X from the cores in the first direction X of the pixel electrodes 3009a of lenses 3310 that are positioned on the first end section Ex side gradually increases more than that of lenses 3310 that are positioned between the centre Cx and the first end section Ex in the first direction X.

In addition, as shown in FIG. 34, the plurality of pixel electrodes 3009a are arranged in the second direction Y of the first substrate 3010 so that all of the inter-core distances in the second direction Y of two pixel electrodes 3009a that are adjacent in the second direction Y are a third pitch Pay. In addition, the widths in the second direction Y of the plurality of pixel electrodes 3009a are equivalent.

The plurality of lenses 3310 (the optical elements 3025) are arranged in the second direction Y of the second substrate 3020 so that all of the inter-core distances in the second direction Y of two lenses 3310 (the optical elements 3025) that are adjacent in the second direction Y are a fourth pitch Pby. The widths in the second direction Y of the plurality of lenses 3310 are equivalent, and the widths in the second direction Y of the pixel electrodes 3009a are the same as the widths in the second direction Y of the lenses 3310 (the optical elements 3025).

In this instance, the fourth pitch Pby is longer than the third pitch Pay. In addition, the cores in the second direction Y of the pixel electrodes 3009a and the cores in the second direction Y of the lenses 3310 overlap at a centre Cy in the second direction Y. Therefore, as shown in FIGS. 34 and 35, among the plurality of lenses 3310, the cores (refer to the dotted line Lby in FIG. 35) of the lenses 3310 that are positioned on a second end section Ey, which is an end section in the second direction Y of the pixel electrode arrangement region 3010e are shifted further to an outer side (a direction that is shown by an arrow Sy in FIG. 35) in the second direction Y than the cores (refer to the solid line Lay in FIG. 35) of the pixel electrodes 3009a, among the plurality of pixel electrodes 3009a, that are positioned on the second end section Ey side. In addition, a shift amount to the outer side in the second direction Y from the cores in the second direction Y of the pixel electrodes 3009a of lenses 3310 that are positioned on the second end section Ey side gradually increases more than that of lenses 3310 that are positioned between the centre Cy and the second end section Ey in the second direction Y.

Manufacturing Method of Electro-Optical Device 3100

In manufacturing steps of the electro-optical device 3100 of the present embodiment, firstly, in a first substrate preparation step, the first substrate 3010, on which the plurality of pixel electrodes 3009a are arranged along the first direction X and the second direction Y, is prepared. In this instance, as shown in FIG. 34, the plurality of pixel electrodes 3009a are arranged so that all of the inter-core distances in the first direction X are the first pitch Pax, and are arranged so that all of the inter-core distances in the second direction Y are the third pitch Pay.

In addition, in a second substrate preparation step, the second substrate 3020, on which the plurality of optical elements 3025 that are formed from formation regions of the lenses 3310 (the focusing elements 3030a) are arranged along the first direction X and the second direction Y, is prepared. In this instance, the plurality of lenses 3310 are arranged so that all of the inter-core distances in the first direction X are the second pitch Pbx, and are arranged so that all of the inter-core distances in the second direction Y are the fourth pitch Pby. In addition, the second pitch Pbx is set to be longer than the first pitch Pax, and the fourth pitch Pby is set to be longer than the third pitch Pay.

Next, in a pasting step, the first substrate 3010 and the second substrate 3020 are pasted together so that the plurality of pixel electrodes 3009a and the plurality of lenses 3310 respectively oppose one another. At this time, the first substrate 3010 and the second substrate 3020 are pasted together so that the cores of the lenses 3310 that are positioned on the first end section Ex side of the pixel electrode arrangement region 3010e are positioned further on an outer side in the first direction X than the cores of the pixel electrodes 3009a that are positioned on the first end section Ex side of the pixel electrode arrangement region 3010e. In addition, the first substrate 3010 and the second substrate 3020 are pasted together so that the cores of the lenses 3310 that are positioned on the second end section Ey side of the pixel electrode arrangement region 3010e are positioned further on an outer side in the second direction Y than the cores of the pixel electrodes 3009a that are positioned on the second end section Ey side of the pixel electrode arrangement region 3010e.

In this instance, in the first substrate preparation step, the first substrate 3010 in which the first substrate side alignment marks 3014c are formed on the outer side of the pixel electrode arrangement region 3010e, is prepared, and in the second substrate preparation step, the second substrate 3020 in which the second substrate side alignment marks 3056c are formed on the outer side of a region in which the plurality of lenses 3310 are arranged, is prepared. Further, in the pasting process the first substrate 3010 and the second substrate 3020 are pasted together by aligning the positions of the first substrate side alignment marks 3014c and the second substrate side alignment marks 3056c.

Main Effects of Present Embodiment

In the manner described above, in the electro-optical device 3100 of the present embodiment, the plurality of lenses 3310 (the optical elements 3025) of the second substrate 3020 respectively oppose the plurality of pixel electrodes 3009a of the first substrate 3010, but the inter-core distances (the second pitch Pbx) in the first direction X of the lenses 3310 are longer than the inter-core distances (the first pitch Pax) in the first direction X of the pixel electrodes 3009a. Therefore, the cores of the lenses 3310 are positioned further on the outer side in the first direction X than the cores of the pixel electrodes 3009a on an end section (the first end section Ex) side in the first direction X of the pixel electrode arrangement region 3010e. Accordingly, light that is incident in an oblique manner from the outer side in the first direction X is transmitted through the lenses 3310, and incident to a substantial center of the pixel electrodes 3009a. For this reason, even if the second substrate 3020 is pasted together with the first substrate 3010 in a state of being shifted in the first direction X, light that is incident in an oblique manner from the outer side in the first direction X is transmitted through the lenses 3310, and incident to the pixel electrodes 3009a. For this reason, in the projection type display device 3000 that is shown in FIG. 28, it is even possible to suppress the occurrence of a circumstance in which luminance is partially reduced in a projected image in a case in which the intensity of light that is incident in an oblique manner from the outer side of the first direction X is higher than that of light that is incident to the electro-optical device 3100 in an oblique manner from the inner side.

In addition, the inter-core distances (the fourth pitch Pby) in the second direction Y of the lenses 3310 are longer than the inter-core distances (the third pitch Pay) in the second direction Y of the pixel electrodes 3009a. Therefore, the cores of the lenses 3310 are positioned further on the outer side in the second direction Y than the cores of the pixel electrodes 3009a on an end section (the second end section Ey) side in the second direction Y of the pixel electrode arrangement region 3010e. Accordingly, light that is incident in an oblique manner from the outer side in the second direction Y is transmitted through the lenses 3310, and incident to a substantial center of the pixel electrodes 3009a. For this reason, even if the second substrate 3020 is pasted together with the first substrate 3010 in a state of being shifted in the second direction Y, light that is incident in an oblique manner from the outer side in the second direction Y is transmitted through the lenses 3310, and incident to the pixel electrodes 3009a. For this reason, in the projection type display device 3000 that is shown in FIG. 28, it is even possible to suppress the occurrence of a circumstance in which luminance is partially reduced in a projected image in a case in which the intensity of light that is incident in an oblique manner from the outer side in the second direction Y is higher than that of light that is incident to the electro-optical device 3100 in an oblique manner from the inner side.

Modification Example 1 of Embodiment 7

Figure 36:
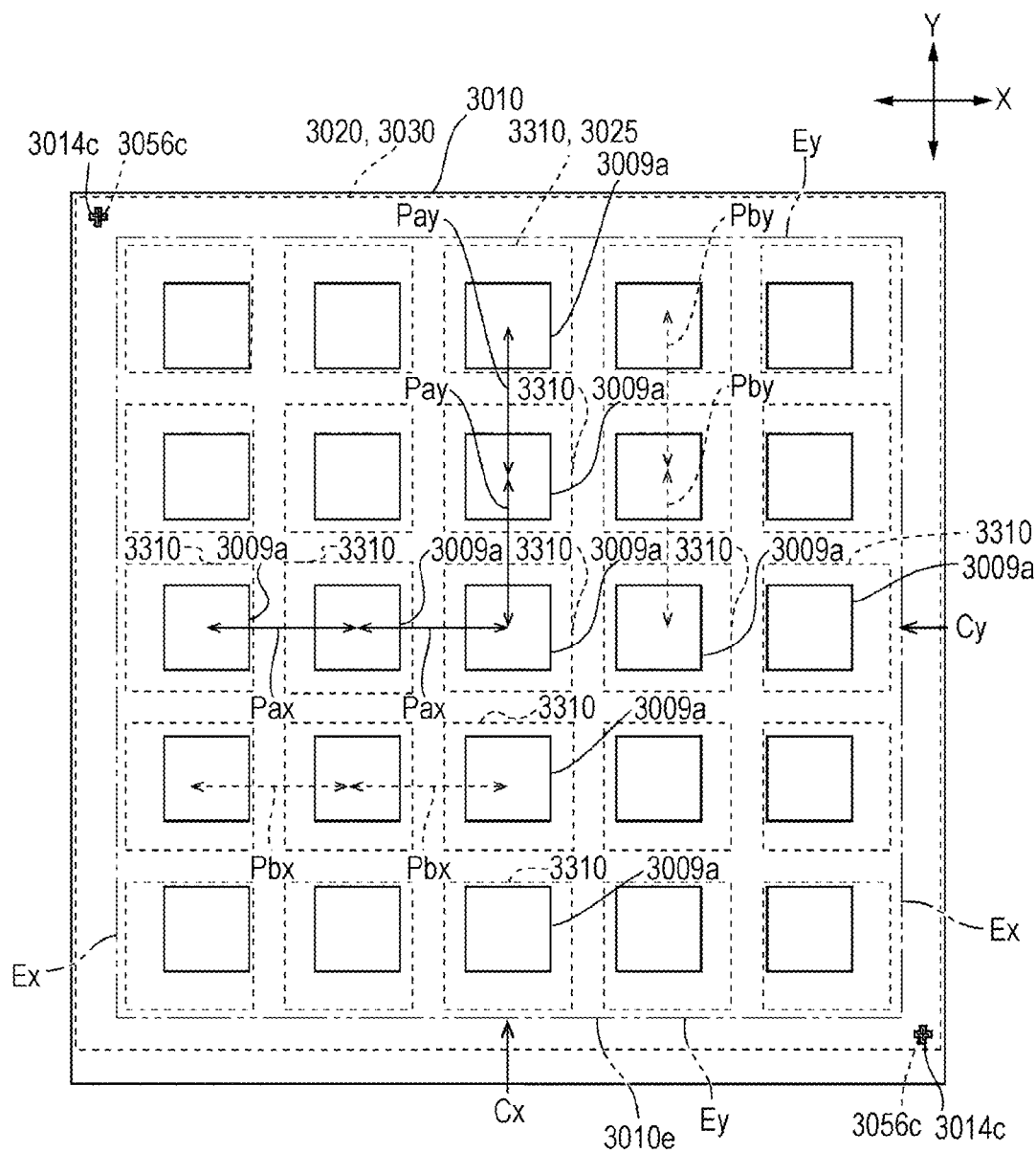
FIG. 36 is a plan view that schematically shows a layout and the like of lenses in an electro-optical device according to Modification Example 1 of Embodiment 7 of the invention.

FIG. 36 is a plan view that schematically shows a layout and the like of lenses 3310 in an electro-optical device 3100 according to Modification Example 1 of Embodiment 7 of the invention. Additionally, since the basic configuration of the embodiment is the same as that of Embodiment 7, the same symbols are given to common portions, and description thereof is omitted.

As shown in FIG. 36, in the electro-optical device 3100 of the present embodiment, the plurality of pixel electrodes 3009a are all also arranged so as to be the first pitch Pax, and the plurality of lenses 3310 (the optical elements 3025) are all arranged so as to be the second pitch Pbx in the same manner as Embodiment 7. In addition, the plurality of pixel electrodes 3009a are all arranged so as to be the third pitch Pay, and the plurality of lenses 3310 (the optical elements 3025) are all arranged so as to be the fourth pitch Pby. In addition, in the plurality of pixel electrodes 3009a, the widths in the first direction X are equivalent and the widths in the second direction Y are equivalent.

In the present embodiment, the second pitch Pbx is longer than the first pitch Pax. Therefore, the cores of the lenses 3310 that are positioned on the first end section Ex side are positioned further on the outer side in the first direction X than the cores of the pixel electrodes 3009a that are positioned on the first end section Ex side. In addition, the fourth pitch Pby is longer than the third pitch Pay. Therefore, the cores of the lenses 3310 that are positioned on the second end section Ey side are positioned further on the outer side in the second direction Y than the cores of the pixel electrodes 3009a that are positioned on the second end section Ey side. Accordingly, in the projection type display device 3000 that is shown in FIG. 28, the same effects as Embodiment 7 are also exhibited such as it even being possible to suppress the occurrence of a circumstance in which luminance is partially reduced in a projected image in a case in which the intensity of light that is incident in an oblique manner from the outer side in the first direction X or the outer side in the second direction Y is higher than that of light that is incident to the electro-optical device 3100 in an oblique manner from the inner side.

In this instance, the widths in the first direction X of the lenses 3310 (the optical elements 3025) are larger than the widths in the first direction X of the pixel electrodes 3009a. Therefore, even if the second substrate 3020 is pasted together with the first substrate 3010 in a state of being shifted in the first direction X, the lenses 3310 overlap with the pixel electrodes 3009a over a wide range on the centre Cx side in the first direction X and at the first end section Ex. Accordingly, it is easy for light that is incident in an oblique manner from the inner side and the outer side in the first direction X to be transmitted through the lenses 3310 and incident to the pixel electrodes 3009a. In addition, the widths in the second direction Y of the lenses 3310 (the optical elements 3025) are larger than the widths in the second direction Y of the pixel electrodes 3009a. Therefore, even if the second substrate 3020 is pasted together with the first substrate 3010 in a state of being shifted in the second direction Y, the lenses 3310 overlap with the pixel electrodes 3009a over a wide range on the centre Cy side in the second direction Y and at the second end section Ey. Accordingly, it is easy for light that is incident in an oblique manner from the inner side and the outer side in the second direction Y to be transmitted through the lenses 3310 and incident to the pixel electrodes 3009a. For this reason, an effect of the luminance being high in the entirety of projected images is exhibited.

Modification Example 2 of Embodiment 7

Figure 37:
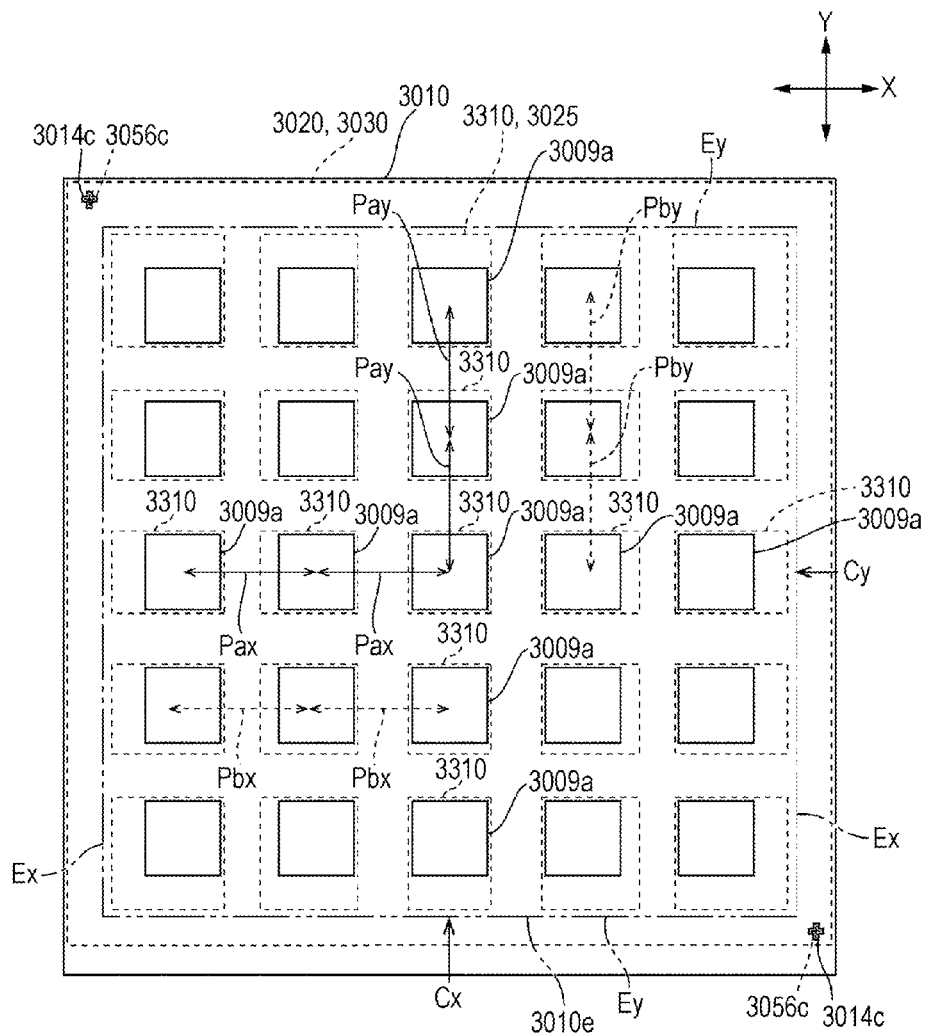
FIG. 37 is a plan view that schematically shows a layout and the like of lenses in an electro-optical device according to Modification Example 2 of Embodiment 7 of the invention.

FIG. 37 is a plan view that schematically shows a layout and the like of lenses 3310 in an electro-optical device 3100 according to Modification Example 2 of Embodiment 7 of the invention. Additionally, since the basic configuration of the embodiment is the same as that of Embodiment 7, the same symbols are given to common portions, and description thereof is omitted.

As shown in FIG. 37, in the electro-optical device 3100 of the present embodiment, the plurality of pixel electrodes 3009*a* are all also arranged so as to be the first pitch Pax, and the plurality of lenses 3310 (the optical elements 3025) are all arranged so as to be the second pitch Pbx in the same manner as Embodiment 7. In addition, the plurality of pixel electrodes 3009*a* are all arranged so as to be the third pitch Pay, and the plurality of lenses 3310 (the optical elements 3025) are all arranged so as to be the fourth pitch Pby. In addition, in the plurality of pixel electrodes 3009*a*, the widths in the first direction X are equivalent and the widths in the second direction Y are equivalent.

In the present embodiment, the second pitch Pbx is longer than the first pitch Pax. Therefore, the cores of the lenses 3310 that are positioned on the first end section Ex side are positioned further on the outer side in the first direction X than the cores of the pixel electrodes 3009*a* that are positioned on the first end section Ex side. In addition, the fourth pitch Pby is longer than the third pitch Pay. Therefore, the cores of the lenses 3310 that are positioned on the second end section Ey side are positioned further on the outer side in the second direction Y than the cores of the pixel electrodes 3009*a* that are positioned on the second end section Ey side. Accordingly, in the projection type display device 3000 that is shown in FIG. 28, the same effects as Embodiment 7 are also exhibited such as it even being possible to suppress the occurrence of a circumstance in which luminance is partially reduced in a projected image in a case in which the intensity of light that is incident in an oblique manner from the outer side in the first direction X or in the second direction Y is higher than that of light that is incident to the electro-optical device 3100 in an oblique manner from the inner side.

In this instance, the widths in the first direction X of the lenses 3310 (the optical elements 3025) are equivalent to the widths in the first direction X of the pixel electrodes 3009*a* in the centre Cx in the first direction X, but the widths in the first direction X of the lenses 3310 that are positioned on a first end section Ex side are larger than the widths in the first direction X of the lenses 3310 that are positioned on the centre Cx side in the first direction X. In addition, between the centre Cx in the first direction X and the first end section Ex, the widths in the first direction X of the lenses 3310 gradually increase from the centre Cx in the first direction X toward the first end section Ex. For example, the widths in the first direction X of the lenses 3310 gradually increase with a single lens 3310 set as a unit, or with a plurality of lenses 3310 set as a unit.

Therefore, even if the second substrate 3020 is pasted together with the first substrate 3010 in a state of being shifted in the first direction X, the lenses 3310 overlap with the pixel electrodes 3009*a* over a wide range on the centre Cx side in the first direction X and at the first end section Ex. Accordingly, it is easy for light that is incident in an oblique manner from the inner side and the outer side in the first direction X to be transmitted through the lenses 3310 and incident to the pixel electrodes 3009*a*. For this reason, an effect of the luminance being high in the entirety of projected images is exhibited.

In addition, the widths in the second direction Y of the lenses 3310 (the optical elements 3025) are equivalent to the widths in the second direction Y of the pixel electrodes 3009*a* in the centre Cy in the second direction Y, but the widths in the second direction Y of the lenses 3310 that are positioned on a second end section Ey side are larger than the widths in the second direction Y of the lenses 3310 that are positioned on the centre Cy side in the second direction Y. In addition, between the centre Cy in the second direction Y and the second end section Ey, the widths in the second direction Y of the lenses 3310 gradually increase from the centre Cy in the second direction Y toward the second end section Ey. For example, the widths in the second direction Y of the lenses 3310 gradually increase with a single lens 3310 set as a unit, or with a plurality of lenses 3310 set as a unit.

Therefore, even if the second substrate 3020 is pasted together with the first substrate 3010 in a state of being shifted in the second direction Y, the lenses 3310 overlap with the pixel electrodes 3009*a* over a wide range on the centre Cy side in the second direction Y and at the second end section Ey. Accordingly, it is easy for light that is incident in an oblique manner from the inner side and the outer side in the second direction Y to be transmitted through the lenses 3310 and incident to the pixel electrodes 3009*a*. For this reason, an effect of the luminance being high in the entirety of projected images is exhibited.

Embodiment 8

Figure 38:
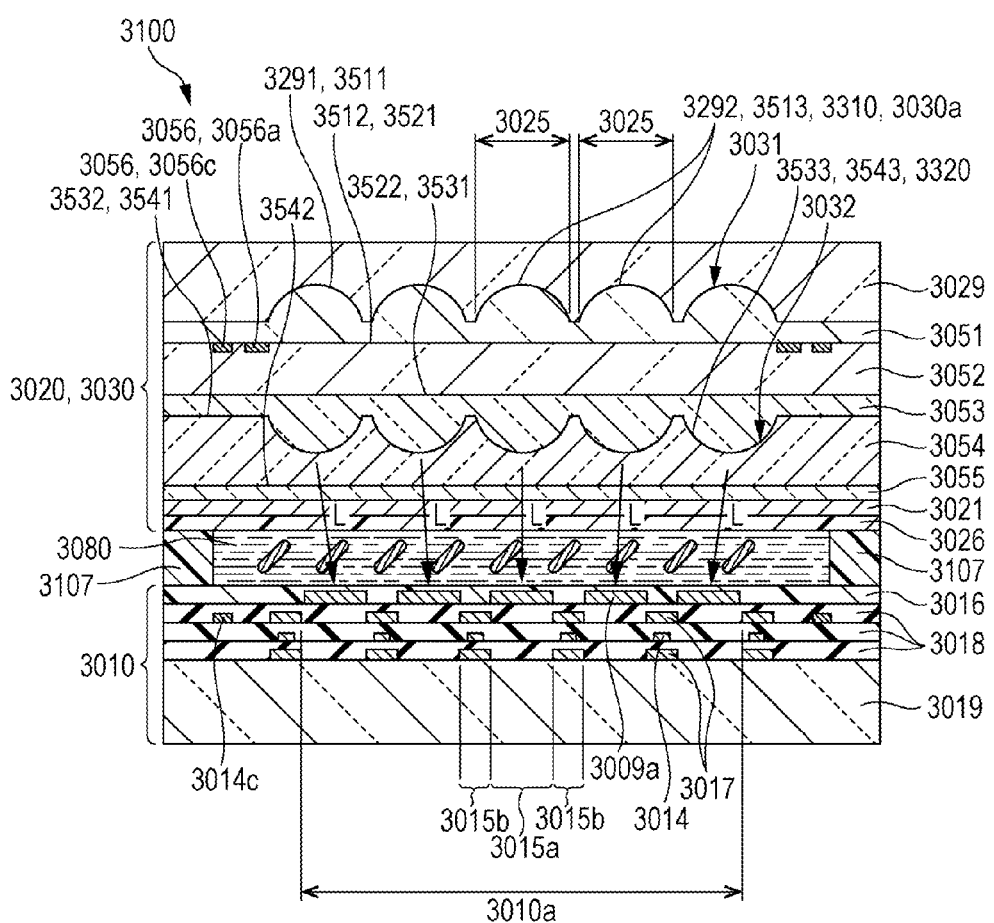
FIG. 38 is an explanatory diagram that schematically shows a cross-sectional configuration of lenses and the like in an electro-optical device according to Embodiment 8 of the invention.
Figure 39:
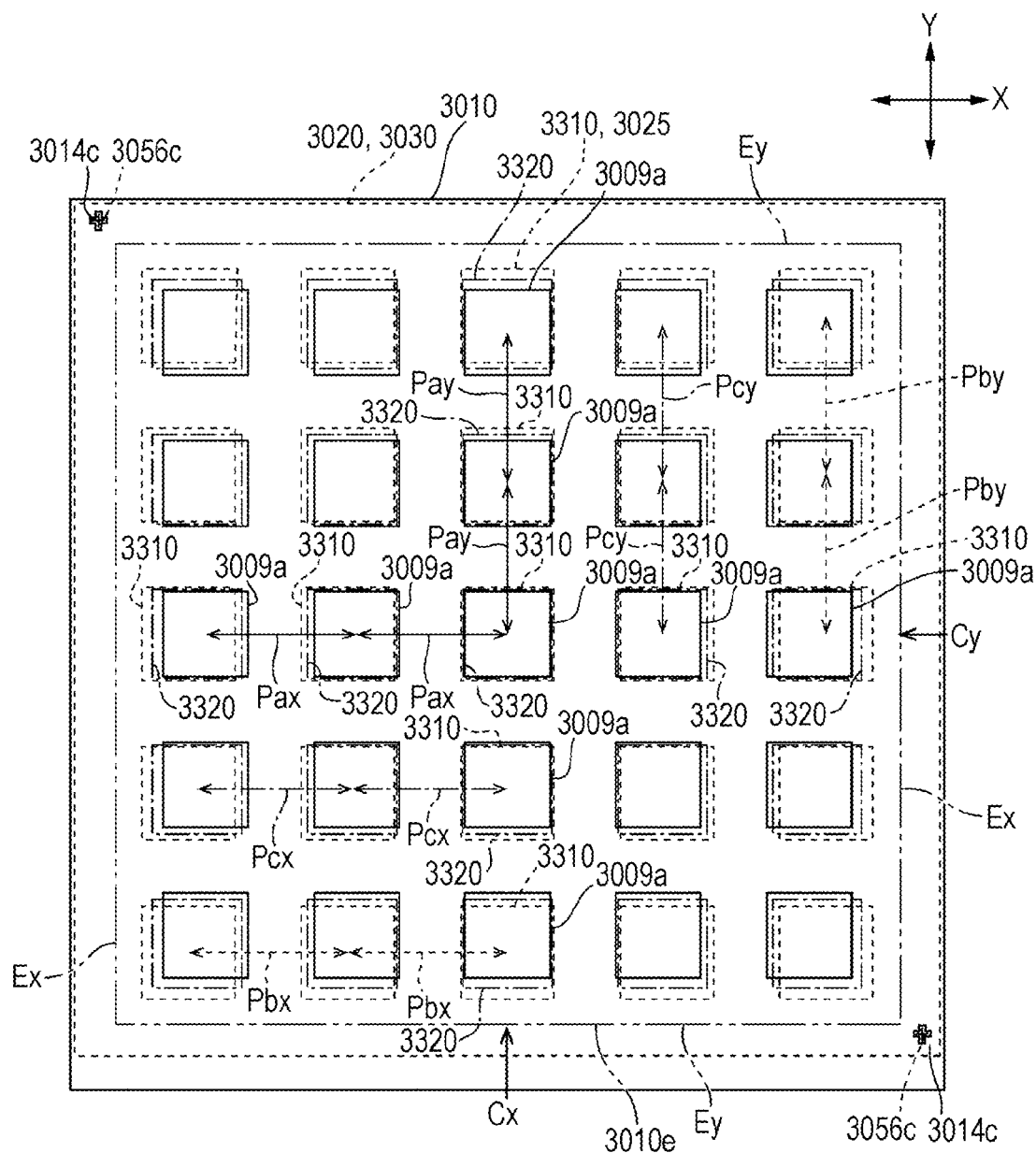
FIG. 39 is a plan view that schematically shows a layout and the like of lenses in the electro-optical device according to Embodiment 8 of the invention.

FIG. 38 is an explanatory diagram that schematically shows a cross-sectional configuration of lenses 3310 and the like in an electro-optical device 3100 according to Embodiment 8 of the invention. FIG. 39 is a plan view that schematically shows a layout and the like of the lenses 3310 in the electro-optical device 3100 that is shown in FIG. 38. Additionally, since the basic configuration of the embodiment is the same as that of Embodiment 7, the same symbols are given to common portions, and description thereof is omitted. In addition, in FIG. 39, the first substrate 3010 and the pixel electrodes 3009*a* are shown with solid lines, and the second substrate 3020, the optical elements 3025 (the lenses 3310), and the lenses 3320 are shown with dotted lines, dashed-dotted lines and the like.

In FIG. 38, the optical elements 3025 in the electro-optical device 3100 of the present embodiment are also configured by a formation region of lenses 3310 (first lenses) as focusing elements 3030*a* in the same manner as Embodiment 7. In the present embodiment, the second substrate 3020 includes a lens array 3032 (a second lens array) that is provided with a plurality of the lenses 3320 (second lenses) that oppose the lenses 3310 in the first substrate 3010 in each of a plurality of optical elements 3025. More specifically, a translucent lens layer 3053 (a second lens layer), and a translucent layer 3054 (a second translucent layer) are laminated in order between the translucent layer 3052 and the protective layer 3055. The lens layer 3053 is provided with a surface 3531 that covers the surface 3522 of the translucent layer 3052, and a surface 3532 that is on an opposite side to the surface 3531, and convex sections, which protrude toward an opposite side to the translucent substrate 3029, or concave sections, which are hollowed out toward the translucent substrate 3029, are formed on the surface 3532 in positions that overlap with the concave sections 3292 in plan view. In the present embodiment, convex sections 3533, which protrude in hemispherical form toward an opposite side to the translucent substrate 3029, are formed on the surface 3532 of the lens layer 3053 in positions that overlap with the concave sections 3292 in plan view. Therefore, in the translucent layer 3054, concave sections 3543, which are formed from concave curved surfaces in which the convex sections 3533 of the lens layer 3053 are positioned on an inner side thereof, are formed on a surface 3541 that covers the surface 3532 of the lens layer 3053. The translucent layer 3054 is provided with a flat surface 3542 on the opposite side to the surface 3541.

In this instance, a refractive index differs between the lens layer 3053 and the translucent layer 3054, and the concave sections 3543 and the convex sections 3533 configure the lenses 3320. In the present embodiment, the refractive index of the lens layer 3053 is greater than the refractive index of the translucent layer 3054. For example, in contrast to the lens layer 3053 being formed from a silicon oxynitride film (SiON), and having a refractive index of 1.58 to 1.68, the translucent layer 3054 is formed from a silicon oxide film ($SiO_x$), and has a refractive index of 1.48. For this reason the lenses 3320 have a power of focusing light from a light source. In the present embodiment, the translucent layer 3054 is an optical path length adjustment layer that adjusts the optical path length from the lens array 3032 to the first substrate 3010.

The protective layer 3055 of a silicon oxide film ($SiO_x$), a silicon oxynitride film (SiON) or the like is formed on the flat surface 3542 of the translucent layer 3054, and the common electrode 3021 is formed on an opposite side to the translucent layer 3054 and the translucent substrate 3029 with respect to the protective layer 3055. In addition, the alignment film 3026 is formed on an opposite side to the protective layer 3055 and the translucent substrate 3029 with respect to the common electrode 3021.

As shown in FIG. 39, in the electro-optical device 3100 of the present embodiment, the plurality of pixel electrodes 3009a are all also arranged so as to be the first pitch Pax, and the plurality of lenses 3310 (the optical elements 3025) are all arranged so as to be the second pitch Pbx in the same manner as Embodiment 7. In addition, the plurality of pixel electrodes 3009a are all arranged so as to be the third pitch Pay, and the plurality of lenses 3310 (the optical elements 3025) are all arranged so as to be the fourth pitch Pby. In addition, in the plurality of pixel electrodes 3009a, the widths in the first direction X are equivalent and the widths in the second direction Y are equivalent. In addition, in the lenses 3310 (the optical elements 3025), the widths in the first direction X are equivalent and the widths in the second direction Y are equivalent.

In the present embodiment, the second pitch Pbx is longer than the first pitch Pax. Therefore, the cores of the lenses 3310 that are positioned on the first end section Ex side are positioned further on the outer side in the first direction X than the cores of the pixel electrodes 3009a that are positioned on the first end section Ex side. In addition, the fourth pitch Pby is longer than the third pitch Pay. Therefore, the cores of the lenses 3310 that are positioned on the second end section Ey side are positioned further on the outer side in the second direction Y than the cores of the pixel electrodes 3009a that are positioned on the second end section Ey side.

In addition, the plurality of lenses 3320 are all arranged so that inter-core distances in the first direction X of two lenses 3320 that are adjacent in the first direction X are all a fifth pitch Pcx, and are arranged so that inter-core distances in the second direction Y of two lenses 3320 that are adjacent in the second direction Y are all a sixth pitch Pcy. In addition, in the plurality of lenses 3320, the widths in the first direction X are equivalent, and the widths in the second direction Y are equivalent.

In this instance, the fifth pitch Pcx is longer than the first pitch Pax, but shorter than the second pitch Pbx. Therefore, the cores of the lenses 3320 that are positioned on the first end section Ex side are positioned further on an outer side in the first direction X than the cores of the pixel electrodes 3009a that are positioned on the first end section Ex side, and are positioned further on an inner side in the first direction X than the cores of the lenses 3310 that are positioned on the first end section Ex side. In addition, the sixth pitch Pcy is longer than the third pitch Pay, but shorter than the fourth pitch Pby. Therefore, the cores of the lenses 3320 that are positioned on the second end section Ey side are positioned further on an outer side in the second direction Y than the cores of the pixel electrodes 3009a that are positioned on the second end section Ey side, and are positioned further on an inner side in the second direction Y than the cores of the lenses 3310 that are positioned on the first end section Ex side.

In a case of configuring in this manner, even if the second substrate 3020 is pasted together with the first substrate 3010 in a state of being shifted in the first direction X, light that is incident in an oblique manner from the outer side in the first direction X is transmitted through the lenses 3310 and 3320, and incident to the pixel electrodes 3009a. For this reason, in the projection type display device 3000 that is shown in FIG. 28, it is even possible to suppress the occurrence of a circumstance in which luminance is partially reduced in a projected image in a case in which the intensity of light that is incident in an oblique manner from the outer side in the first direction X is higher than that of light that is incident to the electro-optical device 3100 in an oblique manner from the inner side.

In addition, even if the second substrate 3020 is pasted together with the first substrate 3010 in a state of being shifted in the second direction Y, light that is incident in an oblique manner from the outer side in the second direction Y is transmitted through the lenses 3310 and 3320, and incident to the pixel electrodes 3009a. For this reason, in the projection type display device 3000 that is shown in FIG. 28, it is even possible to suppress the occurrence of a circumstance in which luminance is partially reduced in a projected image in a case in which the intensity of light that is incident in an oblique manner from the outer side in the second direction Y is higher than that of light that is incident to the electro-optical device 3100 in an oblique manner from the inner side.

Modification Example 1 of Embodiment 8

Figure 40:
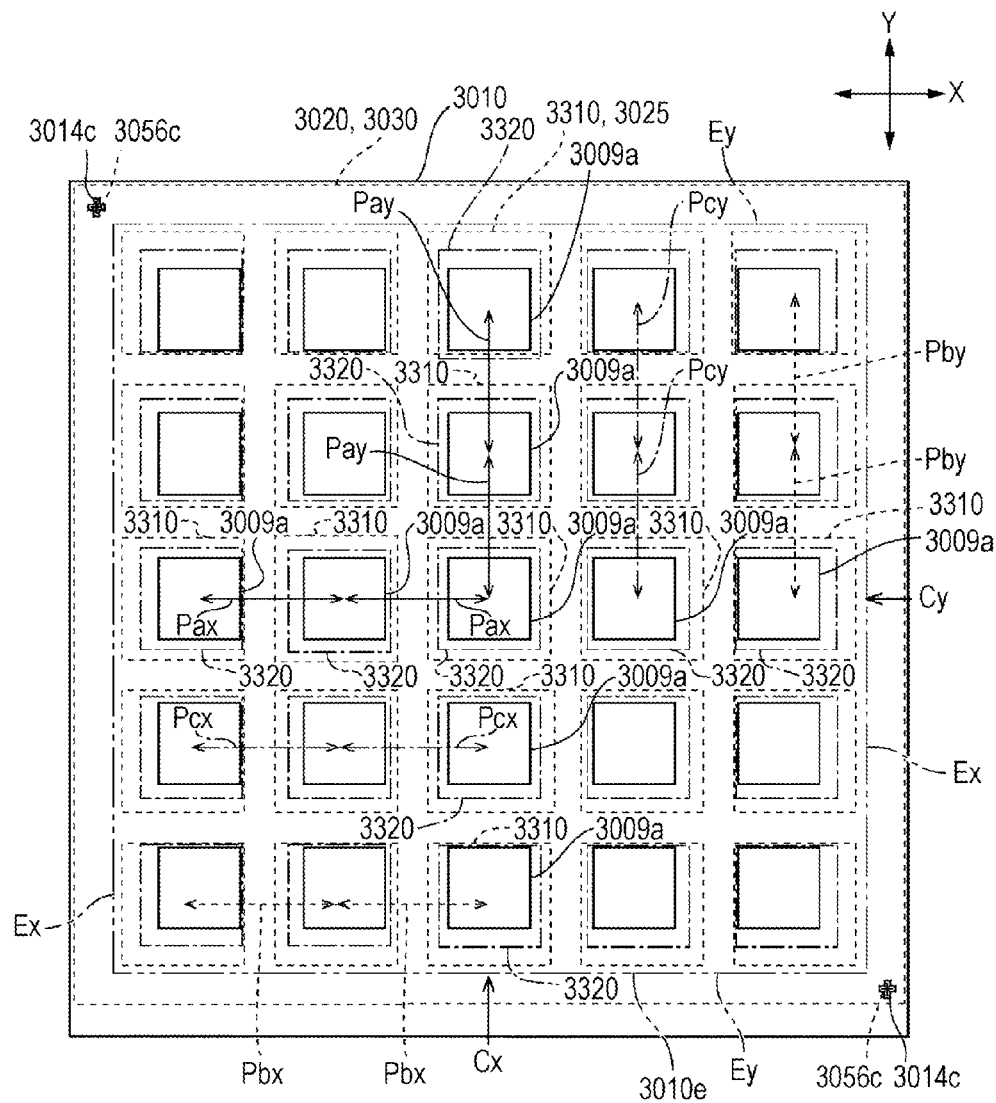
FIG. 40 is a plan view that schematically shows a layout and the like of lenses in an electro-optical device according to Modification Example 1 of Embodiment 8 of the invention.

FIG. 40 is a plan view that schematically shows a layout and the like of lenses 3310 in an electro-optical device 3100 according to Modification Example 1 of Embodiment 8 of the invention. Additionally, since the basic configuration of the embodiment is the same as that of Embodiment 7, the same symbols are given to common portions, and description thereof is omitted.

As shown in FIG. 40, in the electro-optical device 3100 of the present embodiment, the plurality of pixel electrodes 3009a are all also arranged so as to be the first pitch Pax, and the plurality of lenses 3310 (the optical elements 3025) are all arranged so as to be the second pitch Pbx in the same manner as Embodiments 7 and 8. In addition, the plurality of pixel electrodes 3009a are all arranged so as to be the third pitch Pay, and the plurality of lenses 3310 (the optical elements 3025) are all arranged so as to be the fourth pitch Pby. In addition, in the plurality of pixel electrodes 3009a, the widths in the first direction X are equivalent and the widths in the second direction Y are equivalent. In addition, in the same manner as Embodiment 8, the plurality of lenses 3320 are all arranged so as to be the fifth pitch Pcx in the first direction X, and are all arranged so as to be the sixth pitch Pcy in the second direction Y.

In the present embodiment, the second pitch Pbx is longer than the first pitch Pax. Therefore, the cores of the lenses 3310 that are positioned on the first end section Ex side are positioned further on the outer side in the first direction X than the cores of the pixel electrodes 3009a that are positioned on the first end section Ex side. In addition, the fourth pitch Pby is longer than the third pitch Pay. Therefore, the cores of the lenses 3310 that are positioned on the second end section Ey side are positioned further on the outer side in the second direction Y than the cores of the pixel electrodes 3009a that are positioned on the second end section Ey side. In addition, the fifth pitch Pcx is longer than the first pitch Pax, but shorter than the second pitch Pbx. Therefore, the cores of the lenses 3320 that are positioned on the first end section Ex side are positioned further on an outer side in the first direction X than the cores of the pixel electrodes 3009a that are positioned on the first end section Ex side, and are positioned further on an inner side in the first direction X than the cores of the lenses 3310 that are positioned on the first end section Ex side. In addition, the sixth pitch Pcy is longer than the third pitch Pay, but shorter than the fourth pitch Pby. Therefore, the cores of the lenses 3320 that are positioned on the second end section Ey side are positioned further on an outer side in the second direction Y than the cores of the pixel electrodes 3009a that are positioned on the second end section Ey side, and are positioned further on an inner side in the second direction Y than the cores of the lenses 3310 that are positioned on the first end section Ex side.

In this instance, the widths in the first direction X of the lenses 3310 (the optical elements 3025) are greater than the widths in the first direction X of the pixel electrodes 3009a. In addition, the widths in the first direction X of the lenses 3320 are greater than the widths in the first direction X of the pixel electrodes 3009a, but shorter than the widths in the first direction X of the lenses 3310. Therefore, even if the second substrate 3020 is pasted together with the first substrate 3010 in a state of being shifted in the first direction X, the lenses 3310 and the lenses 3320 overlap with the pixel electrodes 3009a over a wide range on the centre Cx side in the first direction X and at the first end section Ex. Accordingly, it is easy for light that is incident in an oblique manner from the inner side and the outer side in the first direction X to be transmitted through the lenses 3310 and incident to the pixel electrodes 3009a.

In addition, the widths in the second direction Y of the lenses 3310 (the optical elements 3025) are greater than the widths in the second direction Y of the pixel electrodes 3009a. In addition, the widths in the second direction Y of the lenses 3320 are greater than the widths in the second direction Y of the pixel electrodes 3009a, but shorter than the widths in the second direction Y of the lenses 3310. Therefore, even if the second substrate 3020 is pasted together with the first substrate 3010 in a state of being shifted in the second direction Y, the lenses 3310 and the lenses 3320 overlap with the pixel electrodes 3009a over a wide range on the centre Cy side in the second direction Y and at the second end section Ey. Accordingly, it is easy for light that is incident in an oblique manner from the inner side and the outer side in the second direction Y to be transmitted through the lenses 3310 and incident to the pixel electrodes 3009a.

Modification Example 2 of Embodiment 8

Figure 41:
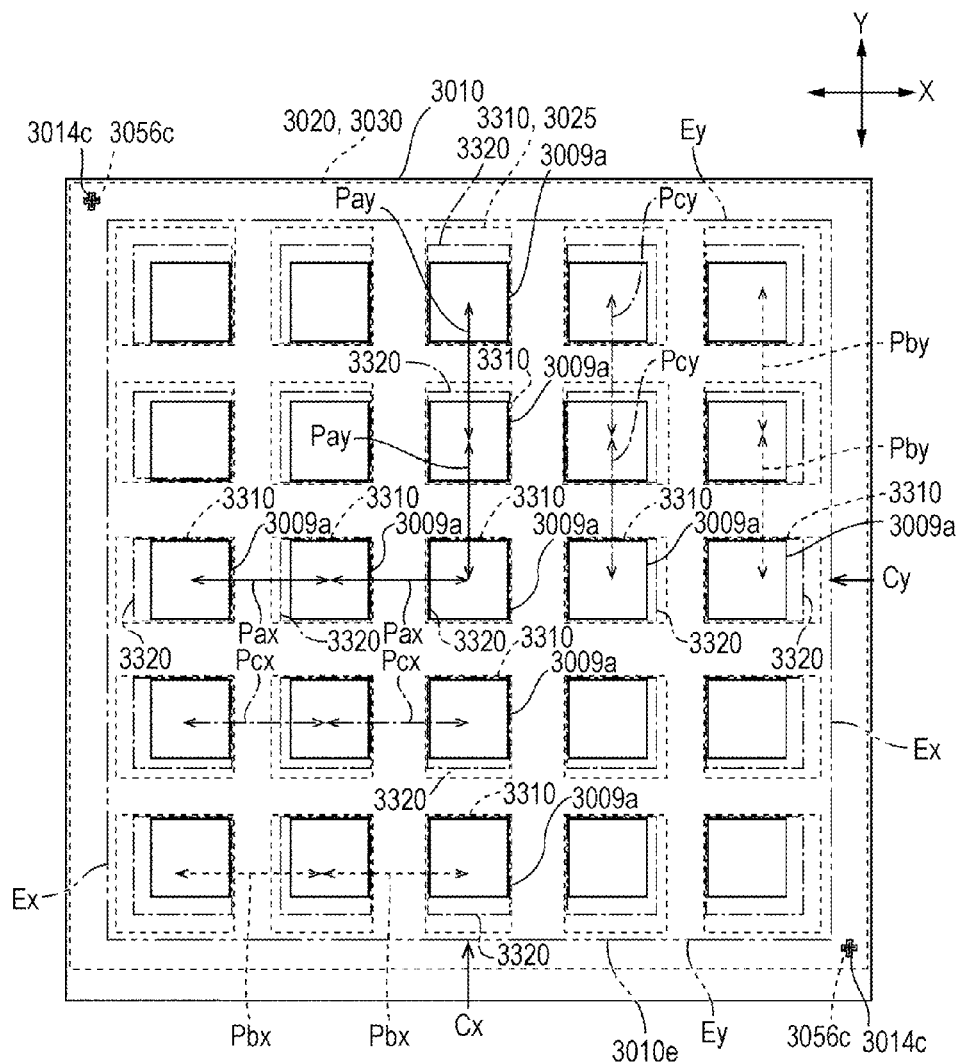
FIG. 41 is a plan view that schematically shows a layout and the like of lenses in an electro-optical device according to Modification Example 2 of Embodiment 8 of the invention.

FIG. 41 is a plan view that schematically shows a layout and the like of lenses 3310 in an electro-optical device 3100 according to Modification Example 2 of Embodiment 8 of the invention. Additionally, since the basic configuration of the embodiment is the same as that of Embodiment 7, the same symbols are given to common portions, and description thereof is omitted.

As shown in FIG. 41, in the electro-optical device 3100 of the present embodiment, the plurality of pixel electrodes 3009a are all also arranged so as to be the first pitch Pax, and the plurality of lenses 3310 (the optical elements 3025) are all arranged so as to be the second pitch Pbx in the same manner as Embodiments 7 and 8. In addition, the plurality of pixel electrodes 3009a are all arranged so as to be the third pitch Pay, and the plurality of lenses 3310 (the optical elements 3025) are all arranged so as to be the fourth pitch Pby. In addition, in the plurality of pixel electrodes 3009a, the widths in the first direction X are equivalent and the widths in the second direction Y are equivalent. In addition, in the same manner as Embodiment 8, the plurality of lenses 3320 are all arranged so as to be the fifth pitch Pcx in the first direction X, and are all arranged so as to be the sixth pitch Pcy in the second direction Y.

In the present embodiment, the second pitch Pbx is longer than the first pitch Pax. Therefore, the cores of the lenses 3310 that are positioned on the first end section Ex side are positioned further on the outer side in the first direction X than the cores of the pixel electrodes 3009a that are positioned on the first end section Ex side. In addition, the fourth pitch Pby is longer than the third pitch Pay. Therefore, the cores of the lenses 3310 that are positioned on the second end section Ey side are positioned further on the outer side in the second direction Y than the cores of the pixel electrodes 3009a that are positioned on the second end section Ey side. In addition, the fifth pitch Pcx is longer than the first pitch Pax, but shorter than the second pitch Pbx. Therefore, the cores of the lenses 3320 that are positioned on the first end section Ex side are positioned further on an outer side in the first direction X than the cores of the pixel electrodes 3009a that are positioned on the first end section Ex side, and are positioned further on an inner side in the first direction X than the cores of the lenses 3310 that are positioned on the first end section Ex side. In addition, the sixth pitch Pcy is longer than the third pitch Pay, but shorter than the fourth pitch Pby. Therefore, the cores of the lenses 3320 that are positioned on the second end section Ey side are positioned further on an outer side in the second direction Y than the cores of the pixel electrodes 3009a that are positioned on the second end section Ey side, and are positioned further on an inner side in the second direction Y than the cores of the lenses 3310 that are positioned on the first end section Ex side.

In this instance, the widths in the first direction X of the lenses 3310 (the optical elements 3025) are equivalent to the widths in the first direction X of the pixel electrodes 3009a at the centre Cx in the first direction X, but the widths in the first direction X of the lenses 3310 that are positioned on the first end section Ex side are greater than the widths in the first direction X of the lenses 3310 that are positioned on the centre Cx side in the first direction X. In addition, between the centre Cx in the first direction X and the first end section Ex, the widths in the first direction X of the lenses 3310 gradually increase from the centre Cx in the first direction X toward the first end section Ex. In addition, the widths in the first direction X of the lenses 3320 are equivalent to the widths in the first direction X of the pixel electrodes 3009a at the centre Cx in the first direction X, but the widths in the first direction X of the lenses 3320 that are positioned on the first end section Ex side are greater than the widths in the first direction X of the lenses 3320 that are positioned on the centre Cx side in the first direction X. In addition, between the centre Cx and in the first direction X the first end section Ex, the widths in the first direction X of the lenses 3320 gradually increase from the centre Cx in the first direction X toward the first end section Ex. However, the widths in the first direction X of the lenses 3320 are smaller than the widths in the first direction X of the lenses 3310 further on the first end section Ex side than the centre Cx in the first direction X.

Therefore, even if the second substrate 3020 is pasted together with the first substrate 3010 in a state of being shifted in the first direction X, the lenses 3310 and the second lenses 3320 overlap with the pixel electrodes 3009a over a wide range on the centre Cx side in the first direction X and at the first end section Ex. Accordingly, it is easy for light that is incident in an oblique manner from the inner side and the outer side in the first direction X to be transmitted through the lenses 3310 and incident to the pixel electrodes 3009a. For this reason, an effect of the luminance being high in the entirety of projected images is exhibited.

In addition, the widths in the second direction Y of the lenses 3310 (the optical elements 3025) are equivalent to the widths in the second direction Y of the pixel electrodes 3009a at the centre Cy in the second direction Y, but the widths in the second direction Y of the lenses 3310 that are positioned on the second end section Ey side are greater than the widths in the second direction Y of the lenses 3310 that are positioned on the centre Cy side in the second direction Y. In addition, between the centre Cy in the second direction Y and the second end section Ey, the widths in the second direction Y of the lenses 3310 gradually increase from the centre Cy in the second direction Y toward the second end section Ey. In addition, the widths in the second direction Y of the lenses 3320 are equivalent to the widths in the second direction Y of the pixel electrodes 3009a at the centre Cy in the second direction Y, but the widths in the second direction Y of the lenses 3320 that are positioned on the second end section Ey side are greater than the widths in the second direction Y of the lenses 3320 that are positioned on the centre Cy side in the second direction Y. In addition, between the centre Cy in the second direction Y and the second end section Ey, the widths in the second direction Y of the lenses 3320 gradually increase from the centre Cy in the second direction Y toward the second end section Ey. However, the widths in the second direction Y of the lenses 3320 are smaller than the widths in the second direction Y of the lenses 3310 further on the second end section Ey side than the centre Cy in the second direction Y.

Therefore, even if the second substrate 3020 is pasted together with the first substrate 3010 in a state of being shifted in the second direction Y, the lenses 3310 and the lenses 3320 overlap with the pixel electrodes 3009a over a wide range on the centre Cy side in the second direction Y and at the second end section Ey. Accordingly, it is easy for light that is incident in an oblique manner from the inner side and the outer side in the second direction Y to be transmitted through the lenses 3310 and incident to the pixel electrodes 3009a. For this reason, an effect of the luminance being high in the entirety of projected images is exhibited.

Embodiment 9

Figure 42:
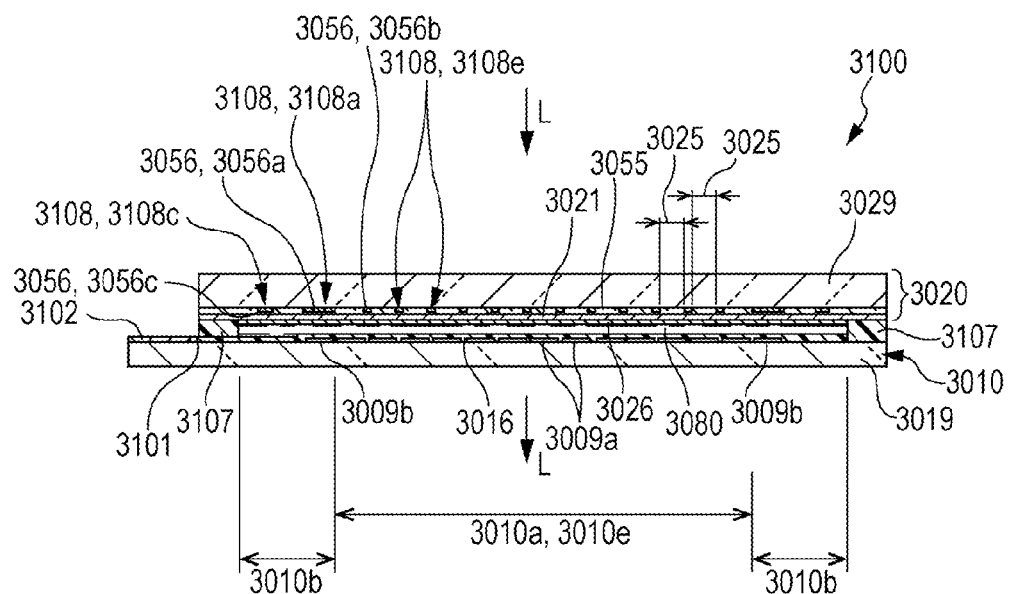
FIG. 42 is a cross-sectional view of an electro-optical device according to Embodiment 9 of the invention.

FIG. 42 is a cross-sectional view of an electro-optical device 3100 according to Embodiment 9 of the invention. In Embodiments 7 and 8, the optical elements 3025 of the second substrate 3020 are stipulated by formation regions of the lenses 3310 as the focusing elements 3030a. In contrast to this, in the present embodiment, as shown in FIG. 42, the lenses 3310 are not formed on the second substrate 3020, and the optical elements 3025, which oppose the pixel electrodes 3009a, are formed on the second substrate 3020 from light shielding layers 3108e that are formed as black matrices. The black matrices (the light shielding layers 3108e) shield a portion of incidence light, and incidence light is transmitted in a region that is surrounded by the black matrices (the light shielding layers 3108e).

In a case of this configuration, as long as the optical elements 3025 (regions that are surrounded by the light shielding layers 3108e) are set to the layouts that are described in Embodiments 7 and 8, it is also possible to suppress the occurrence of luminance unevenness that is caused by positional shift between the first substrate 3010 and the second substrate 3020.

Embodiment 10

Figure 43:
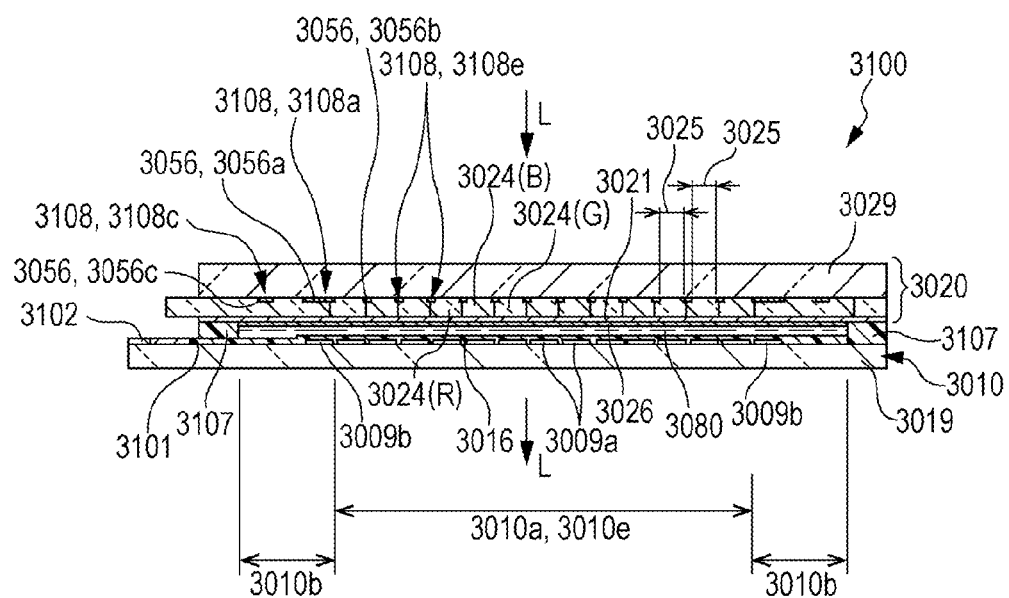
FIG. 43 is a cross-sectional view of an electro-optical device according to Embodiment 10 of the invention.

FIG. 43 is a cross-sectional view of an electro-optical device 3100 according to Embodiment 10 of the invention. In Embodiments 7 and 8, the optical elements 3025 of the second substrate 3020 are stipulated by formation regions of the lenses 3310 as the focusing elements 3030a. In contrast to this, in the present embodiment, as shown in FIG. 43, the lenses 3310 are not formed on the second substrate 3020, and the optical elements 3025, which oppose the pixel electrodes 3009a, are formed on the second substrate 3020 from a region in which color filters 3024 (R), 3024 (G), and 3024 (B), which correspond to red (R), green (G), and blue (B), are formed. The color filters 3024 (R), 3024 (G), and 3024 (B) transmit light of a portion of wavelengths among incidence light. Additionally, in the state that is shown in FIG. 43, on the second substrate 3020, in the optical elements 3025, which oppose the pixel electrodes 3009a, the light shielding layers 3108e are formed as black matrices.

In a case of this configuration, as long as the optical elements 3025 (formation regions of the color filters 3024 (R), 3024 (G), and 3024 (B)) are set to the layouts that are described in Embodiments 7 and 8, it is also possible to suppress the occurrence of luminance unevenness that is caused by positional shift between the first substrate 3010 and the second substrate 3020.

Embodiment 11

In Embodiments 7 and 8, the optical elements 3025 of the second substrate 3020 are stipulated by formation regions of the lenses 3310 as the focusing elements 3030a, but in a case in which a prism is formed on the second substrate 3020 as the focusing elements 3030a, the layouts that are described in Embodiments 7 and 8 may be set with region in which the prisms are formed set as the optical elements 3025.

Application Example in Other Electro-Optical Devices

In the abovementioned embodiments, a liquid crystal device was given as an example of an electro-optical device, but the invention is not limited thereto, and the invention may be used in an electro-optical device or the like that uses an electrophoretic display panel.

Other Projection Type Display Devices

In the abovementioned projection type display device, a transmission type electro-optical device 3100 is used, but the projection type display device may be configured using a reflection type electro-optical device 3100. In addition, in the projection type display device, a configuration in which LED light sources or the like that emit each color of light are used as a light source, and colored light that is emitted from the LED light sources is respectively supplied to separate liquid crystal devices, may be used.

Other Electronic Instruments

In addition to the abovementioned electronic instrument, the electro-optical device 3100 to which the invention is applied, may be used as a direct-view type display device in electronic instruments such as a cellular phone, a personal digital assistant (PDA), a digital camera, a liquid crystal television, a car navigation system, a video telephone, a POS terminal, and an instrument that is provided with a touch panel.

The entire disclosure of Japanese Patent Application No.: 2014-210520, filed Oct. 15, 2014, 2015-085674, filed Apr. 20, 2015 and 2015-111971, filed Jun. 2, 2015 are expressly incorporated by reference herein.

What is claimed is:

1. An electro-optical device comprising:
    a pair of substrates;
    first opening components that stipulate sizes and positions of opening sections of pixels in one of the pair of substrates; and
    second opening components that stipulate sizes and positions of opening sections of the pixels in the other of the pair of substrates,
    wherein positions of the second opening components of the other substrate are corrected with positions of the first opening components of the one substrate set as references, so as to gradually become more shifted in a direction that runs from a core of a pixel region, in which a plurality of pixels are arranged, toward an edge section of the pixel region, in accordance with separation from a core side of the pixel region.

2. The electro-optical device according to claim 1, wherein the pixel region is divided into a plurality of correction regions, and correction values, in which correction amounts of positions of the second opening components of predetermined pixels, which are in positions that are most separated from the core of the pixel region, are distributed to positions of a plurality of correction regions, are applied to the second opening components of pixels that are included in the correction regions, in the one direction.

3. The electro-optical device according to claim 2, wherein, among the plurality of correction regions, a correction value of the second opening components of pixels in a correction region that includes the core of the pixel region is zero.

4. The electro-optical device according to claim 1, wherein the first opening components and the second opening components are respectively any one of microlenses, prisms, color filters, and black matrixes.

5. An electronic instrument comprising the electro-optical device according to claim 1.

6. An electronic instrument comprising:
    the electro-optical device according to claim 1;
    a light source section that outputs light that is supplied to the electro-optical device; and
    a projection optical system that projects light that is modulated by the electro-optical device.

* * * * *